(12) United States Patent
Orhan et al.

(10) Patent No.: US 11,956,104 B2
(45) Date of Patent: Apr. 9, 2024

(54) EQUALIZATION AND ESTIMATION PROCESSING IN WIRELESS DEVICES

(71) Applicant: Intel Corporation, Santa Clara, CA (US)

(72) Inventors: Oner Orhan, San Jose, CA (US); Hosein Nikopour, San Jose, CA (US); Mehnaz Rahman, San Jose, CA (US); Ivan Simoes Gaspar, Portland, CA (US); Shilpa Talwar, Cupertino, CA (US); Stefano Pellerano, Beaverton, OR (US); Claudio Da Silva, Portland, OR (US); Namyoon Lee, Austin, TX (US); Yo Seb Jeon, Gyeongbuk (KR); Eren Sasoglu, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/642,118

(22) PCT Filed: Dec. 26, 2019

(86) PCT No.: PCT/US2019/068574
§ 371 (c)(1),
(2) Date: Mar. 10, 2022

(87) PCT Pub. No.: WO2021/133396
PCT Pub. Date: Jul. 1, 2021

(65) Prior Publication Data
US 2022/0393913 A1    Dec. 8, 2022

(51) Int. Cl.
*H04L 25/03*     (2006.01)
*H04B 1/12*      (2006.01)

(52) U.S. Cl.
CPC ....... *H04L 25/03057* (2013.01); *H04B 1/123* (2013.01)

(58) Field of Classification Search
CPC ......... H04L 25/03057; H04L 25/03038; H04L 25/06; H04L 27/2657; H04L 27/2675;
(Continued)

(56) References Cited

U.S. PATENT DOCUMENTS 5,539,774 A * 7/1996 Nobakht ........... H04L 25/03267
375/232
5,692,011 A    11/1997 Nobakht et al.
(Continued)

FOREIGN PATENT DOCUMENTS

KR    101783745        10/2017
KR    101783745 B1     10/2017
WO    WO-2021133396 A1  7/2021

OTHER PUBLICATIONS

"Indian Application Serial No. 202247016044, First Examination Report dated Jan. 30, 2023", 5 pgs.
(Continued)

*Primary Examiner* — Dac V Ha
(74) *Attorney, Agent, or Firm* — Schwegman Lundberg & Woessner, P.A.

(57) ABSTRACT

Millimeter-wave (mmWave) and sub-mmWave technology, apparatuses, and methods that relate to transceivers and receivers for wireless communications are described. The various aspects include an apparatus of a communication device including one or more antennas configured to receive an RF signal and an ADC system. The ADC system includes a 1-bit ADC configured to receive the RF signal, and an ADC controller circuitry configured to measure a number of positive samples in the received RF signal for a plurality of thresholds of the 1-bit ADC, estimate receive signal power associated with the received RF signal based on the mea-
(Continued)

sured number of positive samples, determine a direct current (DC) offset in the received RF signal using the estimated received signal power, and adjust the received RF signal based on the determined DC offset.

24 Claims, 40 Drawing Sheets

(58) Field of Classification Search
CPC ..... H04L 27/2695; H04L 27/34; H04B 1/123; Y02D 30/70
See application file for complete search history.

(56) References Cited

U.S. PATENT DOCUMENTS

| | | | |
|---|---|---|---|
| 6,205,170 B1* | 3/2001 | Nunez Leon De Santos | ............. H04L 27/2017 375/232 |
| 8,571,146 B1* | 10/2013 | Eliaz | ................. H04L 25/03949 375/340 |
| 8,599,914 B1 | 12/2013 | Eliaz | |
| 10,742,453 B1* | 8/2020 | Wu | ................... H04L 25/03057 |
| 2004/0028159 A1* | 2/2004 | Abdelilah | ............. H04L 7/0062 375/350 |
| 2004/0120412 A1* | 6/2004 | Banerjea | ............. H04L 27/2679 375/350 |
| 2006/0203926 A1 | 9/2006 | Chiodini | |
| 2008/0024337 A1 | 1/2008 | Marsili et al. | |
| 2009/0110047 A1* | 4/2009 | Lai | ........................ H04L 27/183 375/232 |
| 2010/0014873 A1 | 1/2010 | Bulow | |

OTHER PUBLICATIONS

"International Application Serial No. PCT US2019 068574, International Preliminary Report on Patentability dated Jul. 7, 2022", 8 pgs.

"International Application Serial No. PCT/US2019/068574, International Search Report dated Sep. 3, 2020", 3 pgs.

"International Application Serial No. PCT/US2019/068574, Written Opinion dated Sep. 3, 2020", 6 pgs.

Dohl, Jan, et al., "Iterative Blind Estimation of Nonlinear Channels", IEEE International Conference on Acoustic, Speech and Signal Processing (ICASSP), (2014), 3923-3927.

Jun, Liu, et al., "Low-Resolution ADCs for Wireless Communication: A Comprehen sive Survey", IEEE vol. 7, (Jul. 10, 2019).

Landau, Lukas, et al., "1-Bit Quantization and Oversampling at the Receiver-Communication Over Bandlimited Channels With Noise", IEEE Communications Letters, vol. 21, No. 5, (May 2017), 1007-1010.

Myers, Jonathan, et al., "Message passing-based joint CFO and channel estimation in millimeter wave systems with one-bit ADCs", arXiv:1803.09012v2 [cs.IT], (Jun. 2018), 30 pgs.

Myers, Nitin, et al., "Joint CFO and Channel Estimation in Millimeter Wave Systems with One-Bit ADCs", arXiv:1803.09012v2 [cs.IT], (Jul. 2017), 4 pgs.

Wadhwa, Aseem, et al., "Blind phase/frequency synchronization with low-precision ADC: a Bayesian approach", Fifty-first Annual Allerton Conference, (2013), 181-188.

Ye, Dawei, "A 915 MHz 175 µW Receiver Using Transmitted-Reference and Shifted Limiters for 50 dB In-Band Interference Tolerance", IEEE Journal of Solid-State Circuits, vol. 51, No. 12, (Dec. 2016), 3114-3124.

Jun, Liu, "Low-Resolution ADCs for Wireless Communication: A Comprehen sive Survey", IEEE vol. 7, (Jul. 10, 2019).

"European Application Serial No. 19957561.4, Extended European Search Report dated Aug. 16, 2023", 10 pgs.

"Indian Application Serial No. 202247016044, Response filed Jul. 28, 2023 to First Examination Report dated Jan. 30, 2023", w/ English claims, 26 pgs.

Maiti, Deepyaman, et al., "Modified Nonlinear Decision Feedback Equalizer for Long-Haul Fiber-Optic Communications", Journal Of Lightwave Technology, IEEE, USA, vol. 33 3763- 3772, (Sep. 15, 2015), 10 pgs.

* cited by examiner

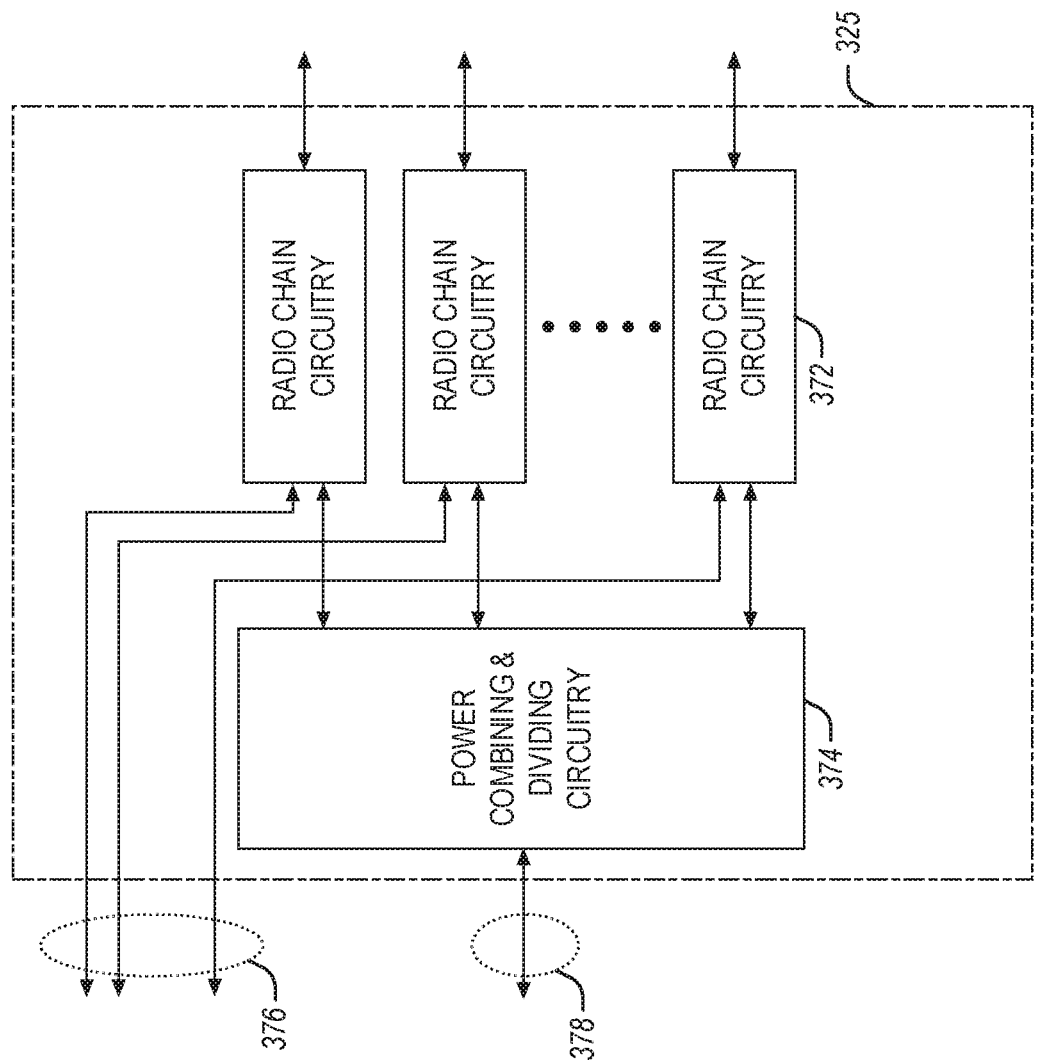

EQUALIZATION AND ESTIMATION PROCESSING IN WIRELESS DEVICES

This application is a U.S. National Stage Filing under 35 U.S.C. 371 from International Application No. PCT/US2019/0685741, filed Dec. 26, 2019 and published in English as WO 2021/133396 on Jul. 1, 2021 which is incorporated herein by reference in its entirety.

TECHNICAL FIELD

Some aspects of the present disclosure pertain to wireless communication devices (e.g., mobile devices and base stations) that use antennas and antenna structures for communication of wireless signals. Some aspects of the present disclosure relate to devices that operate in accordance with 5th Generation (5G) wireless systems. Some aspects of the present disclosure relate to devices that operate in accordance with the Wireless Gigabit Alliance (WiGig) (e.g., IEEE 802.11ad) protocols or other 802.x protocols. Some aspects of the present disclosure relate to joint carrier frequency offset and channel estimation for wideband wireless communications with low-precision analog-to-digital converters (ADCs). Some aspects of the present disclosure relate to direct current (DC) offset and power estimation with threshold adjustable 1-bit ADCs. Some aspects of the present disclosure relate to joint equalization and non-linearity mitigation at the receiver with mixed-signal processing. Some aspects of the present disclosure relate to low-power single-carrier waveform solution with baseband processing methods for DC nulling.

BACKGROUND

Physical space in mobile devices for wireless communication is usually at a premium because of the amount of functionality that is included within the form factor of such devices. Challenging issues arise, among other reasons, because of need for spatial coverage of radiated radio waves, and of maintaining signal strength as the mobile device is moved to different places, or because a user may orient the mobile device differently from time to time. This can lead to the need, in some aspects, for a large number of antennas, varying polarities, directions of radiation, varying spatial diversity of the radiated radio waves at the varying time, and related needs.

The ubiquity of wireless communication has continued to raise a host of challenging issues. In particular, challenges have evolved with the advent of mobile communication systems, such as 5G communications systems due to both the wide variety of devices with different needs and the spectrum to be used. In particular, the ranges of frequency bands used in communications have increased, most recently due to the incorporation of carrier aggregation of licensed and unlicensed bands and the upcoming use of the mmWave and sub-mmWave bands.

A challenge in mmWave and sub-mmWave radio front end modules (RFEMs) is increased power consumption of signal conversion systems. In this regard, the use of low-precision ADCs has been considered as a promising architecture to reduce the power consumption induced by high-speed and high-precision ADCs for wideband communication systems. The strong nonlinearity by the use of low-precision ADCs makes the tasks of carrier-frequency-offset (CFO) estimation and channel estimation very difficult. In particular, conventional techniques for the CFO estimation may not function in wideband communication systems because the distribution of the received signal and the effect of the synchronization imperfection are very different from those of conventional systems that ignore the quantization error due to the ADCs. To enable wideband communication systems operating with low-precision ADCs in practice, techniques may be developed for both CFO and channel estimation for different communication scenarios, including wireless chip-to-chip communications.

Other issues of increasing concern associated with chip-to-chip communication systems operating in, e.g., sub-terahertz bands is estimation and correction of DC offset to avoid receiver saturation and improve received signal power estimation, as well as non-linearity mitigation at receivers using mixed-signal processing.

BRIEF DESCRIPTION OF THE DRAWINGS

FIG. 3D illustrates aspects of exemplary radio frequency circuitry illustrated in FIG. 3A according to some aspects.

DETAILED DESCRIPTION

Figure 1:
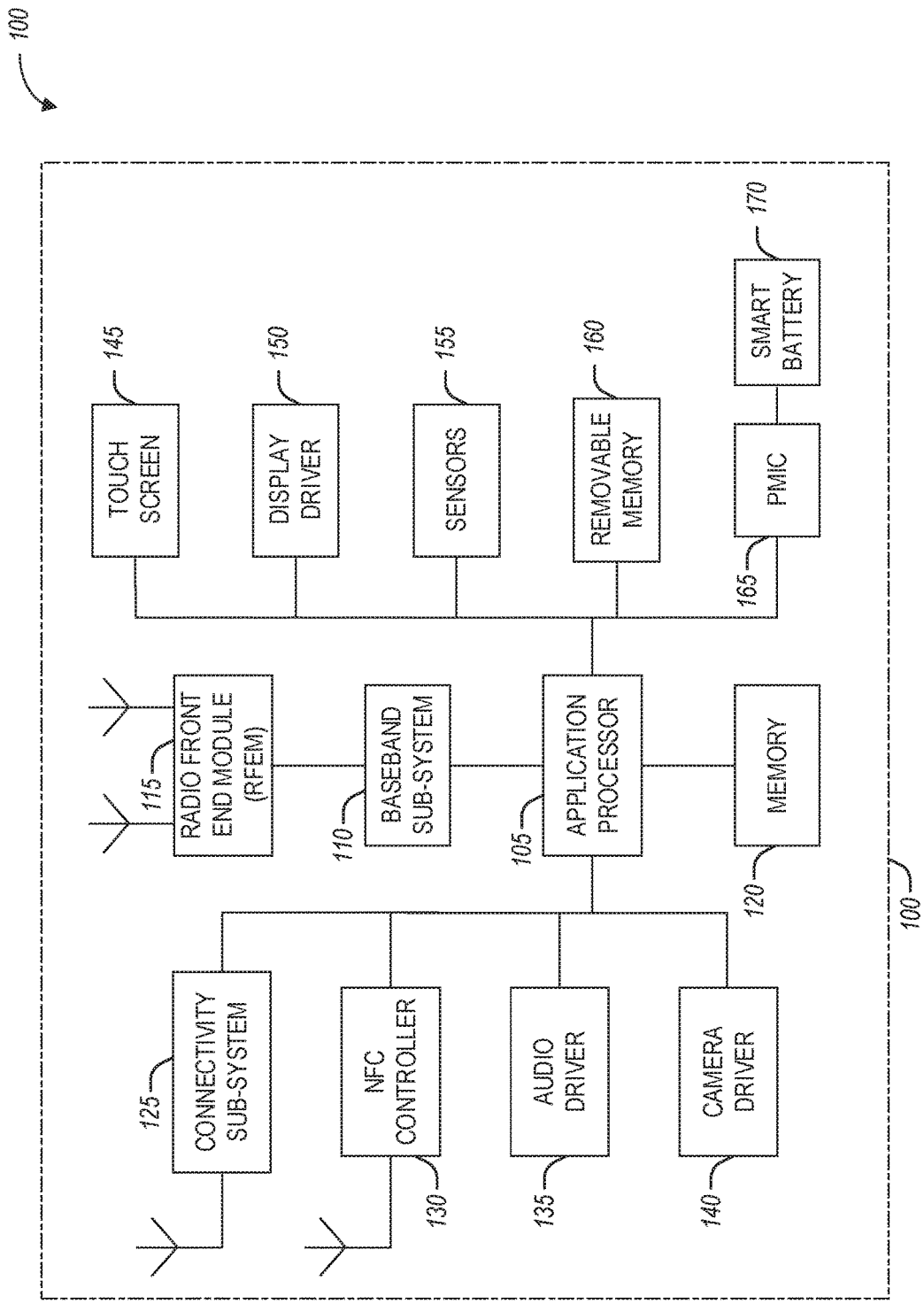
FIG. 1 illustrates an exemplary user device according to some aspects.

With the advancement of 5G mmWave and sub-mm-Wave-based communications, several challenges have evolved, such as increased power consumption of signal conversion systems, limited communications range, the directionality of the antenna systems, signal attenuation due to atmospheric attenuation loss and high attenuation through solid materials. Techniques described herein can be used in connection with digital baseband circuitry, transmit circuitry, receive circuitry, radio frequency circuitry, protocol processing circuitry, and antenna arrays to address the challenges associated with the 5G mmWave and sub-mm-Wave-based communications.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "an example aspect", "some aspects", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to and are not intended to imply that the objects so described must be in a given sequence, either temporally, spatially, in ranking, or in any other manner.

Some aspects may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a sensor device, an Internet of Things (IoT) device, a wearable device, a hand-held device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may, for example, be used in conjunction with devices and/or networks operating in accordance with existing IEEE 802.11 standards (including IEEE 802.11-2016 (IEEE 802.11-2016, IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016); IEEE802.11ay (P802.11ay Standard for Information Technology—Telecommunications and Information Exchange Between Systems Local and Metropolitan Area Networks-Specific Requirements Part 11: Wireless LAN Medium Access Control (MAC) and Physical Layer (PHY) Specifications-Amendment: Enhanced Throughput for Operation in License-Exempt Bands Above 45 GHz)) and/or future versions and/or derivatives thereof, devices and/or networks operating in accordance with existing WiFi Alliance (WFA) Peer-to-Peer (P2P) specifications (including WiFi P2P technical specification, version 1.5, Aug. 4, 2015) and/or future versions and/or derivatives thereof, devices and/or networks operating in accordance with existing Wireless-Gigabit-Alliance (WGA) specifications (including Wireless Gigabit Alliance, Inc WiGig MAC and PHY Specification Version 1.1, April 2011, Final specification) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some aspects may be used in conjunction with one way and/or two-way radio communication systems, cellular radiotelephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other aspects may be used in various other devices, systems and/or networks associated with, e.g., mmWave and sub-mmWave-based communications.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that is integrated with a computer, or a peripheral that is attached to a computer. In some demonstrative aspects, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting and/or the action of receiving. In one example, the phrase "communicating a signal" may refer to the action of transmitting the signal by a first device and may not necessarily include the action of receiving the signal by a second device. In another example, the phrase "communicating a signal" may refer to the action of receiving the signal by a first device and may not necessarily include the action of transmitting the signal by a second device.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN and the like.

Some demonstrative aspects may be used in conjunction with a wireless communication network communicating over a frequency band above Gigahertz (GHz), e.g., 60 GHz or within a terahertz frequency band (e.g., between 300 GHz and 10 THz). However, other aspects may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a frequency band above 45 GHz, a frequency band below 20 GHz, e.g., a Sub 1 GHz (SIG) band, a 2.4 GHz band, a 5 GHz band, a WLAN frequency band, a WPAN frequency band, a frequency band according to the WGA specification, and the like.

As used herein, the term "circuitry" may, for example, refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, the circuitry may include logic, at least partially operable in hardware. In some aspects, the circuitry may be implemented as part of and/or in the form of a radio virtual machine (RVM), for example, as part of a Radio processor (RP) configured to execute code to configured one or more operations and/or functionalities of one or more radio components.

The term "logic" may refer, for example, to computing logic embedded in the circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read-only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

The phrase "peer to peer (PTP) communication", as used herein, may relate to device-to-device communication over a wireless link ("peer-to-peer link") between devices. The PTP communication may include, for example, a WiFi Direct (WFD) communication, e.g., a WFD Peer to Peer (P2P) communication, wireless communication over a direct link within a Quality of Service (QoS) basic service set (BSS), a tunneled direct-link setup (TDLS) link, a STA-to-STA communication in an independent basic service set (IBSS), or the like.

Some demonstrative aspects are described herein with respect to WiFi communication. However, other aspects may be implemented with respect to any other communication scheme, network, standard and/or protocol.

In some demonstrative aspects, a wireless communication device may implement a millimeter-wave (mmWave) or sub-mmWave radio front-end module (RFEM), e.g., as described below.

Millimeter-wave may be defined as a frequency range spanning about 30 GHz to about 300 GHz, and in practice currently covers several discrete licensed and unlicensed frequency bands. Sub-millimeter wave may be defined as a frequency range spanning in the terahertz band (0.3 THz to 10 THz). Similar to mmWave communications, sub-mm-Wave communications in the terahertz bands can be used as mobile backhaul for transferring large bandwidth signals between base stations as well as chip-to-chip communications.

The unlicensed mmWave frequency band currently available is in the vicinity of 60 GHz. Licensed frequency bands are likely to include 28 GHz, 39 GHz, 73 GHz, and 120 GHz. The availability of these bands and the specific frequency range of each varies by regulatory jurisdiction, and in some cases (specifically for licensed band operation) there is still significant uncertainty as to regulations in some countries. Communication trials using sub-mmWave communications in the terahertz bands are ongoing. Challenges associated with mmWave-based and sub-mmWave-based communications include increased power consumption, limited range, signal loss because of the use of regular cables instead of traces, and challenges with integrating multiple antennas for beamforming. Some of these challenges (e.g., as relating to increased power consumption of sub-mmWave communication systems operating in the terahertz bands) are addressed in the present disclosure as discussed below in accordance with some aspects and may include use of joint carrier frequency offset and channel estimation for wideband wireless communications with low-precision ADCs, DC offset and power estimation with threshold adjustable 1-bit ADCs, joint equalization and non-linearity mitigation at the receiver with mixed-signal processing, and low-power single-carrier waveform solution with baseband processing methods for DC nulling.

FIG. 1 illustrates an exemplary user device according to some aspects. The user device 100 may be a mobile device in some aspects and includes an application processor 105, baseband processor 110 (also referred to as a baseband sub-system), radio front end module (RFEM) 115, memory 120, connectivity sub-system 125, near field communication (NFC) controller 130, audio driver 135, camera driver 140, touch screen 145, display driver 150, sensors 155, removable memory 160, power management integrated circuit (PMIC) 165, and smart battery 170.

In some aspects, application processor 105 may include, for example, one or more central processing unit (CPU) cores and one or more of cache memory, low drop-out voltage regulators (LDOs), interrupt controllers, serial interfaces such as SPI, I2C or universal programmable serial interface sub-system, real-time clock (RTC), timer-counters including interval and watchdog timers, general-purpose IO, memory card controllers such as SD/MMC or similar, USB interfaces, MIPI interfaces, and/or Joint Test Access Group (JTAG) test access ports.

In some aspects, baseband processor 110 may be implemented, for example, as a solder-down substrate including one or more integrated circuits, a single packaged integrated circuit soldered to the main circuit board, and/or a multi-chip module including two or more integrated circuits.

Applications of mmWave and sub-mmWave technology can include, for example, WiGig and future 5G, but the mmWave and sub-mmWave technology can be applicable to a variety of telecommunications systems. The mmWave and sub-mmWave technology can be especially attractive for short-range telecommunications systems. WiGig devices operate in the unlicensed 60 GHz band, whereas 5G mmWave is expected to operate initially in the licensed 28 GHz and 39 GHz bands. A block diagram of an example baseband sub-system 110 and RFEM 115 in a mmWave/sub-mmWave system is shown in FIG. 1A.

Figure 1A:
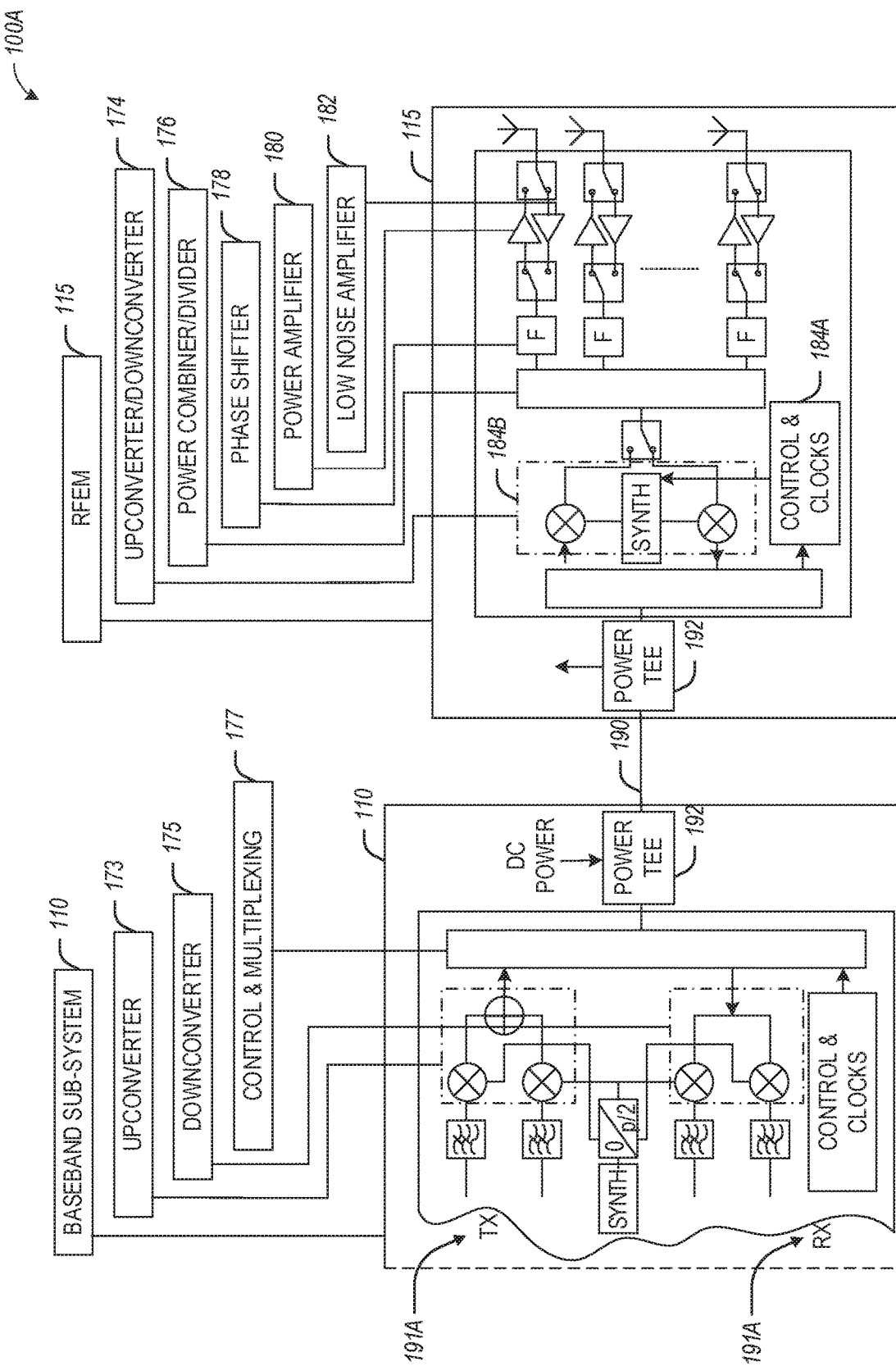
FIG. 1A illustrates a mmWave system, which can be used in connection with the device of FIG. 1 according to some aspects.

FIG. 1A illustrates a mmWave/sub-mmWave system 100A, which can be used in connection with the device 100 of FIG. 1 according to some aspects of the present disclosure. The system 100A includes two components: a baseband sub-system 110 and one or more radio front end modules (RFEMs) 115. The RFEM 115 can be connected to the baseband sub-system 110 by a single coaxial cable 190, which supplies a modulated intermediate frequency (IF) signal, DC power, clocking signals and control signals.

The baseband sub-system 110 is not shown in its entirety, but FIG. 1A rather shows an implementation of the analog front end. This includes a transmitter (TX) section 191A with an upconverter 173 to intermediate frequency (IF) (around 10 GHz in current implementations), a receiver (RX) section 191B with downconversion 175 from IF to baseband, control and multiplexing circuitry 177 including a combiner to multiplex/demultiplex transmit and receive signals onto a single cable 190. In addition, power tee circuitry 192 (which includes discrete components) is included on the baseband circuit board to provide DC power for the RFEM 115. In some aspects, the combination of the TX section and RX section may be referred to as a transceiver, to which may be coupled one or more antennas or antenna arrays of the types described herein.

The RFEM 115 can be a small circuit board including a number of printed antennas and one or more RF devices containing multiple radio chains, including upconversion/downconversion 174 to millimeter-wave frequencies, power combiner/divider 176, programmable phase shifting 178 and power amplifiers (PA) 180, low noise amplifiers (LNA) 182, as well as control and power management circuitry 184A and 184B. This arrangement can be different from Wi-Fi or cellular implementations, which generally have all RF and baseband functionality integrated into a single unit and only antennas connected remotely via coaxial cables.

This architectural difference can be driven by the very large power losses in coaxial cables at millimeter-wave frequencies. These power losses can reduce the transmit power at the antenna and reduce receive sensitivity. In order to avoid this issue, in some aspects, PAs 180 and LNAs 182 may be moved to the RFEM 115 with integrated antennas. In addition, the RFEM 115 may include upconversion/downconversion 174 so that the IF signals over the coaxial cable 190 can be at a lower frequency. Additional system context for mmWave/sub-mmWave 5G apparatuses, techniques and features are discussed hereinbelow.

Figure 2:
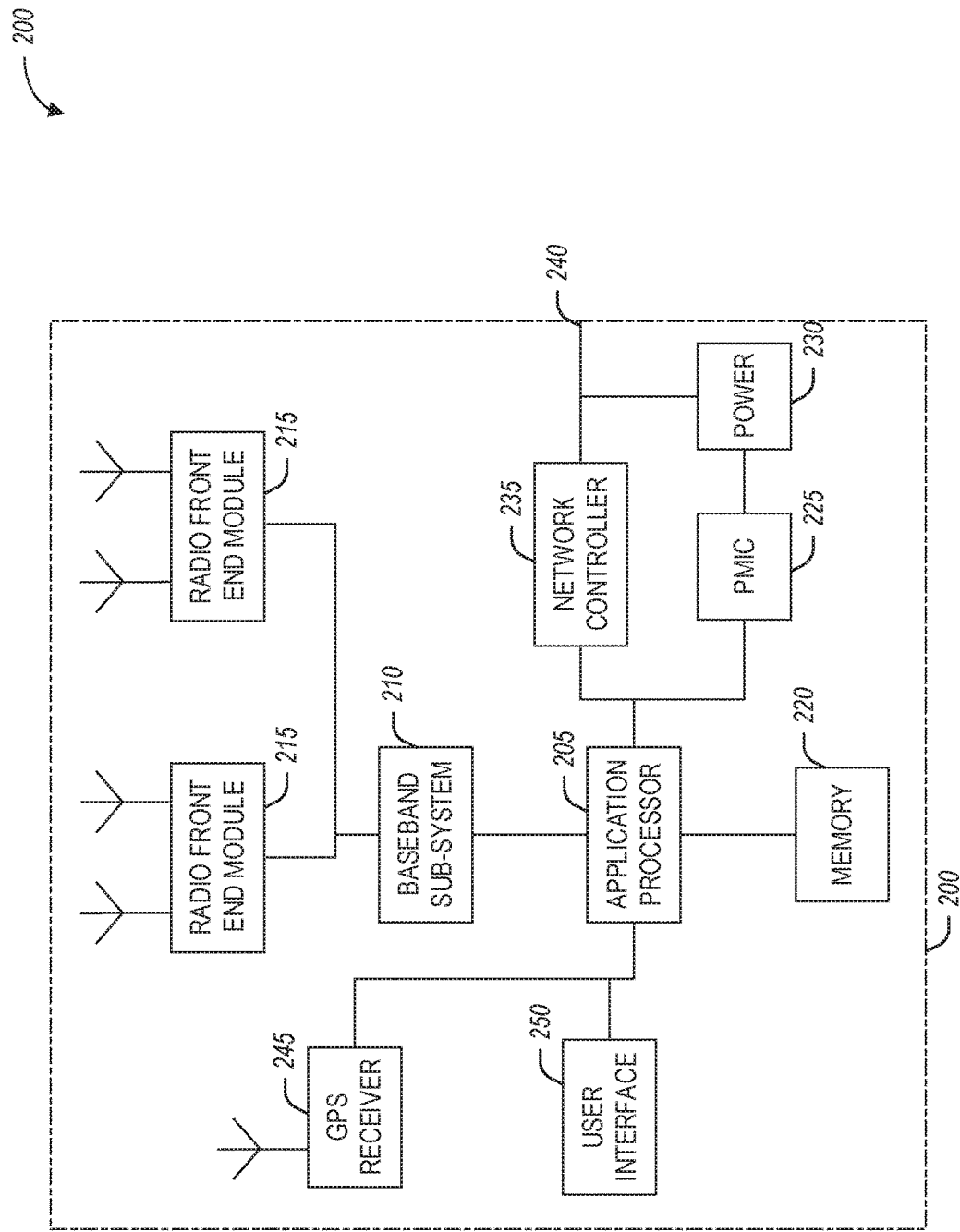
FIG. 2 illustrates an exemplary base station radio head according to some aspects.

FIG. 2 illustrates an exemplary base station or infrastructure equipment radio head according to some aspects. The base station radio head 200 may include one or more of application processor 205, baseband processors 210, one or more radio front end modules 215, memory 220, power management integrated circuitry (PMIC) 225, power tee circuitry 230, network controller 235, network interface connector 240, satellite navigation receiver (e.g., GPS receiver) 245, and user interface 250.

In some aspects, application processor 205 may include one or more CPU cores and one or more of cache memory, low drop-out voltage regulators (LDOs), interrupt controllers, serial interfaces such as SPI, I$^2$C or universal programmable serial interface, real-time clock (RTC), timer-counters including interval and watchdog timers, general-purpose IO, memory card controllers such as SD/MMC or similar, USB interfaces, MIPI interfaces and Joint Test Access Group (JTAG) test access ports.

In some aspects, baseband processor 210 may be implemented, for example, as a solder-down substrate including one or more integrated circuits, a single packaged integrated circuit soldered to the main circuit board or a multi-chip sub-system including two or more integrated circuits.

In some aspects, memory 220 may include one or more of volatile memory including dynamic random access memory (DRAM) and/or synchronous DRAM (SDRAM), and non-volatile memory (NVM) including high-speed electrically erasable memory (commonly referred to as Flash memory), phase-change random access memory (PRAM), magnetoresistive random access memory (MRAM), and/or a three-dimensional cross-point memory. Memory 220 may be implemented as one or more of solder down packaged integrated circuits, socketed memory modules and plug-in memory cards.

In some aspects, power management integrated circuitry 225 may include one or more voltage regulators, surge protectors, power alarm detection circuitry and one or more backup power sources such as a battery or capacitor. Power alarm detection circuitry may detect one or more of brown-out (under-voltage) and surge (over-voltage) conditions.

In some aspects, power tee circuitry 230 may provide for electrical power drawn from a network cable. Power tee circuitry 230 may provide both power supply and data connectivity to the base station radio head 200 using a single cable.

In some aspects, network controller 235 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver 245 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 245 may provide, to application processor 205, data which may include one or more of position data or time data. Time data may be used by application processor 205 to synchronize operations with other radio base stations or infrastructure equipment.

In some aspects, user interface 250 may include one or more buttons. The buttons may include a reset button. User interface 250 may also include one or more indicators such as LEDs and a display screen.

Figure 3A:
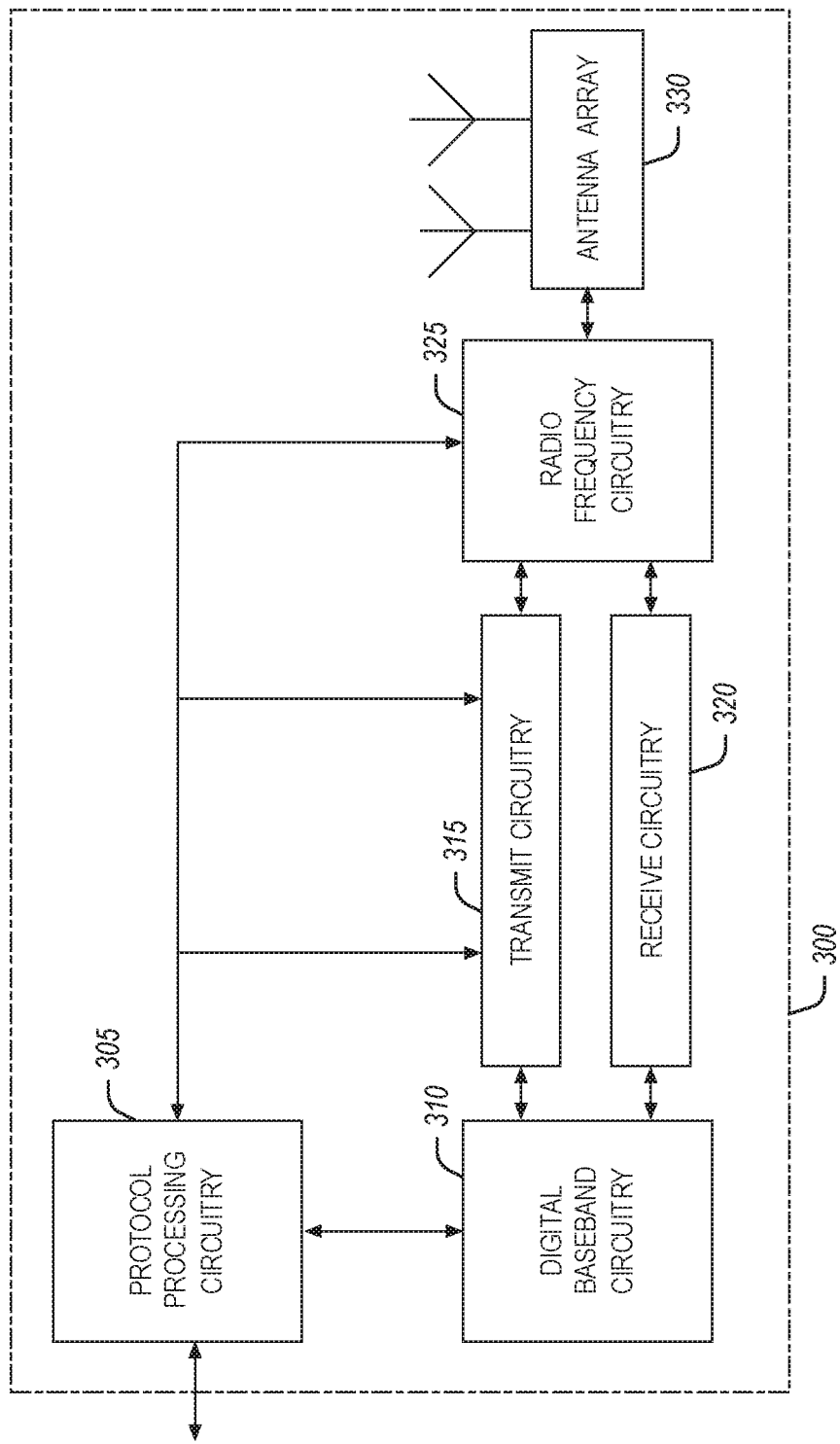
FIG. 3A illustrates exemplary millimeter-wave communication circuitry according to some aspects.
Figure 3B:
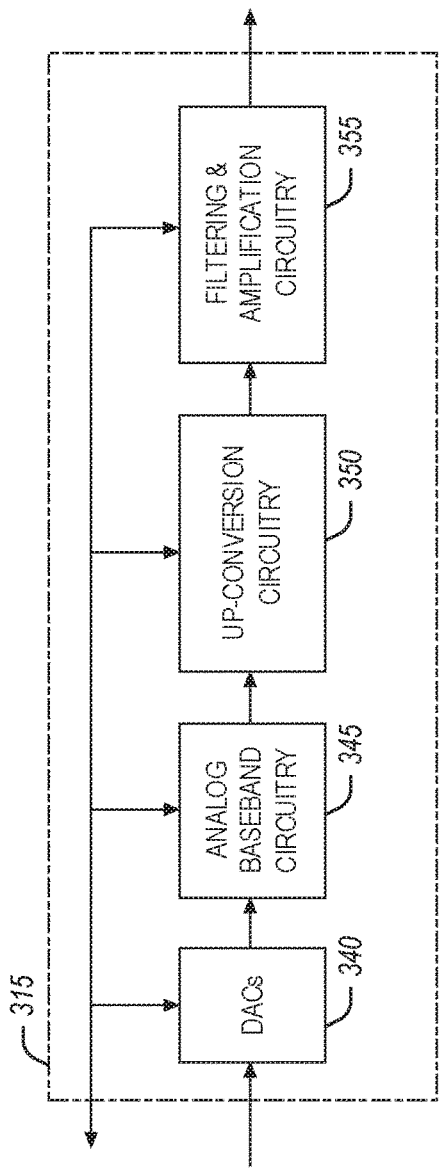
FIG. 3B illustrates aspects of exemplary transmit circuitry illustrated in FIG. 3A according to some aspects.
Figure 3C:
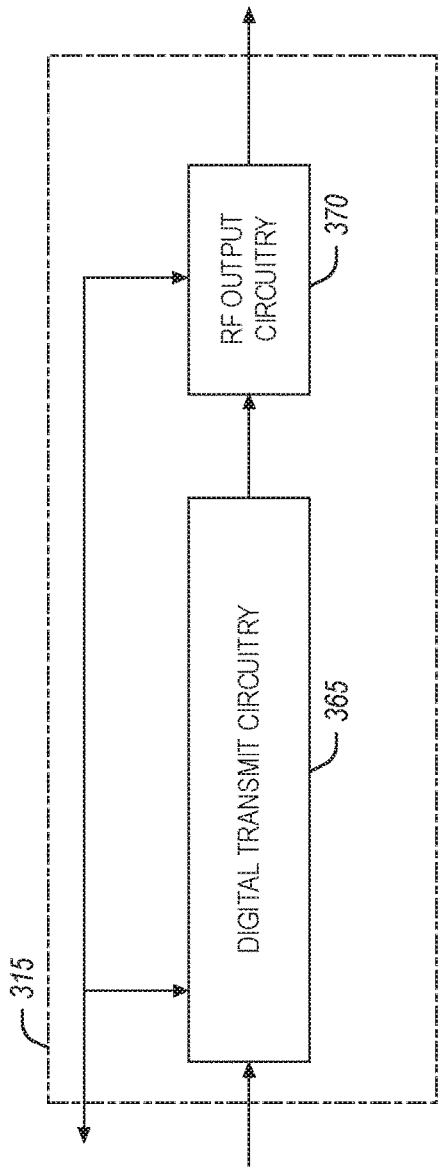
FIG. 3C illustrates aspects of exemplary transmit circuitry illustrated in FIG. 3A according to some aspects.
Figure 3E:
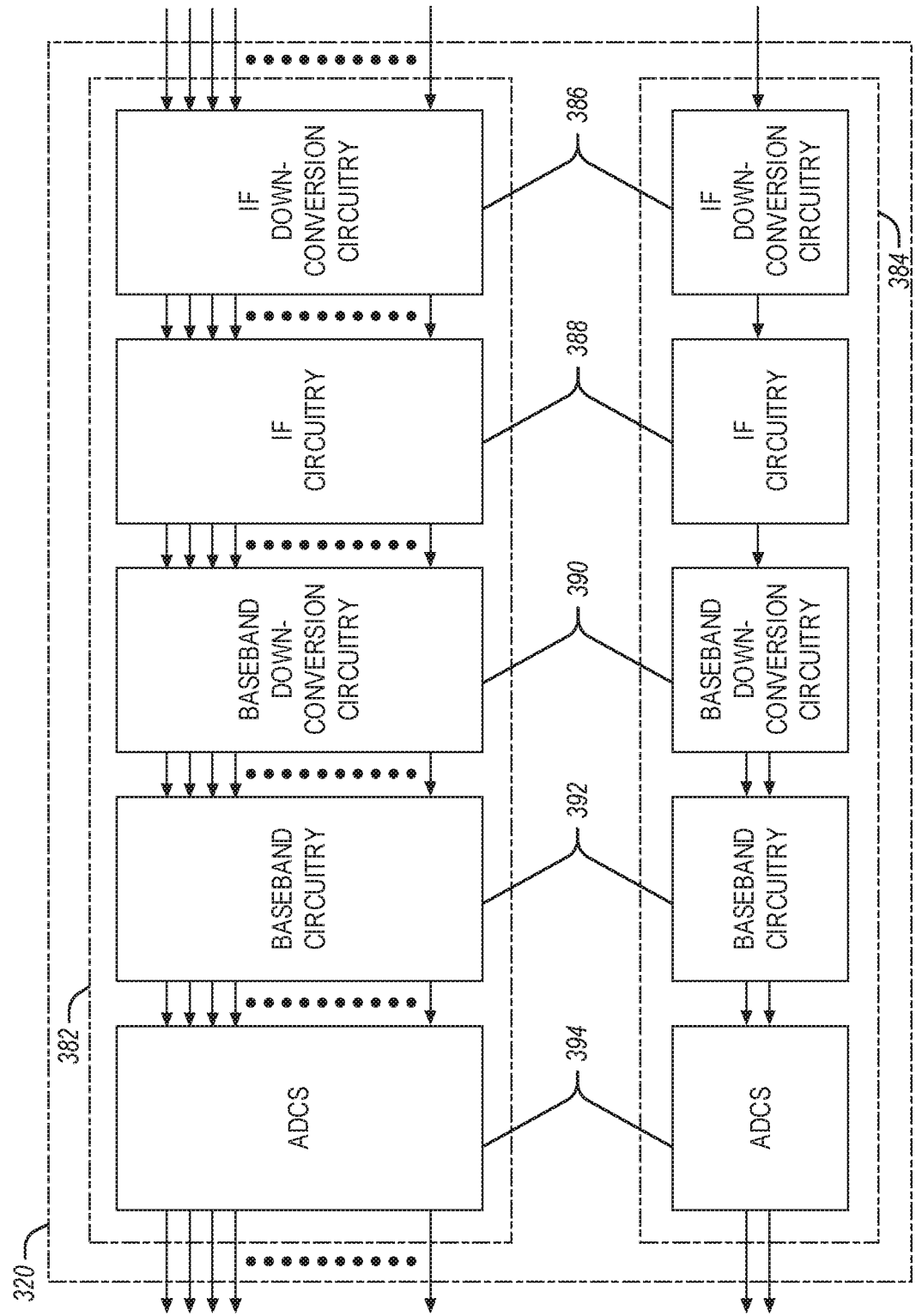
FIG. 3E illustrates aspects of exemplary receive circuitry in FIG. 3A according to some aspects.

FIG. 3A illustrates exemplary mmWave/sub-mmWave communication circuitry according to some aspects; FIGS. 3B and 3C illustrate aspects of transmit circuitry shown in FIG. 3A according to some aspects; FIG. 3D illustrates aspects of radio frequency circuitry shown in FIG. 3A according to some aspects; FIG. 3E illustrates aspects of receive circuitry in FIG. 3A according to some aspects. Millimeter-wave communication circuitry 300 shown in FIG. 3A may be alternatively grouped according to functions. Components illustrated in FIG. 3A are provided here for illustrative purposes and may include other components not shown in FIG. 3A.

Millimeter-wave communication circuitry 300 may include protocol processing circuitry 305 (or processor) or other means for processing. Protocol processing circuitry 305 may implement one or more medium access control (MAC), radio link control (RLC), packet data convergence protocol (PDCP), radio resource control (RRC) and non-access stratum (NAS) functions, among others. Protocol processing circuitry 305 may include one or more processing cores to execute instructions and one or more memory structures to store program and data information.

Millimeter-wave communication circuitry 300 may further include digital baseband circuitry 310. Digital baseband circuitry 310 may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

Millimeter-wave communication circuitry 300 may further include transmit circuitry 315, receive circuitry 320 and/or antenna array circuitry 330. Millimeter-wave communication circuitry 300 may further include RF circuitry 325. In some aspects, RF circuitry 325 may include one or multiple parallel RF chains for transmission and/or reception. Each of the RF chains may be connected to one or more antennas of antenna array circuitry 330.

In some aspects, protocol processing circuitry 305 may include one or more instances of control circuitry. The control circuitry may provide control functions for one or more of digital baseband circuitry 310, transmit circuitry 315, receive circuitry 320, and/or RF circuitry 325.

FIGS. 3B and 3C illustrate aspects of transmit circuitry shown in FIG. 3A according to some aspects. Transmit circuitry 315 shown in FIG. 3B may include one or more of digital to analog converters (DACs) 340, analog baseband circuitry 345, up-conversion circuitry 350 and/or filtering and amplification circuitry 355. DACs 340 may convert digital signals into analog signals. Analog baseband circuitry 345 may perform multiple functions as indicated below. Up-conversion circuitry 350 may up-convert baseband signals from analog baseband circuitry 345 to RF frequencies (e.g., mmWave/sub-mmWave frequencies). Filtering and amplification circuitry 355 may filter and amplify analog signals. Control signals may be supplied between protocol processing circuitry 305 and one or more of DACs 340, analog baseband circuitry 345, up-conversion circuitry 350 and/or filtering and amplification circuitry 355.

Transmit circuitry 315 shown in FIG. 3C may include digital transmit circuitry 365 and RF circuitry 370. In some aspects, signals from filtering and amplification circuitry 355 may be provided to digital transmit circuitry 365. As above, control signals may be supplied between protocol processing circuitry 305 and one or more digital transmit circuitry 365 and RF circuitry 370.

FIG. 3D illustrates aspects of radio frequency circuitry shown in FIG. 3A according to some aspects. Radio frequency circuitry 325 may include one or more instances of radio chain circuitry 372, which in some aspects may include one or more filters, power amplifiers, low noise amplifiers, programmable phase shifters and power supplies.

Radio frequency circuitry 325 may also in some aspects include power combining and dividing circuitry 374. In some aspects, power combining and dividing circuitry 374 may operate bidirectionally, such that the same physical circuitry may be configured to operate as a power divider when the device is transmitting, and as a power combiner when the device is receiving. In some aspects, power combining and dividing circuitry 374 may include one or more wholly or partially separate circuitries to perform power dividing when the device is transmitting and power combining when the device is receiving. In some aspects, power combining and dividing circuitry 374 may include passive circuitry including one or more two-way power divider/combiners arranged in a tree. In some aspects, power combining and dividing circuitry 374 may include active circuitry including amplifier circuits.

In some aspects, radio frequency circuitry 325 may connect to transmit circuitry 315 and receive circuitry 320 in FIG. 3A. Radio frequency circuitry 325 may connect to transmit circuitry 315 and receive circuitry 320 via one or more radio chain interfaces 376 and/or a combined radio chain interface 378. In some aspects, one or more radio chain interfaces 376 may provide one or more interfaces to one or more receive or transmit signals, each associated with a single antenna structure. In some aspects, the combined radio chain interface 378 may provide a single interface to one or more receive or transmit signals, each associated with a group of antenna structures.

FIG. 3E illustrates aspects of receive circuitry in FIG. 3A according to some aspects. Receive circuitry 320 may include one or more of parallel receive circuitry 382 and/or one or more of combined receive circuitry 384. In some aspects, the one or more parallel receive circuitry 382 and one or more combined receive circuitry 384 may include one or more Intermediate Frequency (IF) down-conversion circuitry 386, IF processing circuitry 388, baseband down-conversion circuitry 390, baseband processing circuitry 392 and analog-to-digital converter (ADC) circuitry 394. As used herein, the term "intermediate frequency" refers to a frequency to which a carrier frequency (or a frequency signal) is shifted as in intermediate step in transmission, reception, and/or signal processing. IF down-conversion circuitry 386 may convert received RF signals to IF. IF processing circuitry 388 may process the IF signals, e.g., via filtering and amplification. Baseband down-conversion circuitry 390 may convert the signals from IF processing circuitry 388 to baseband. Baseband processing circuitry 392 may process the baseband signals, e.g., via filtering and amplification. ADC circuitry 394 may convert the processed analog baseband signals to digital signals.

Figure 4:
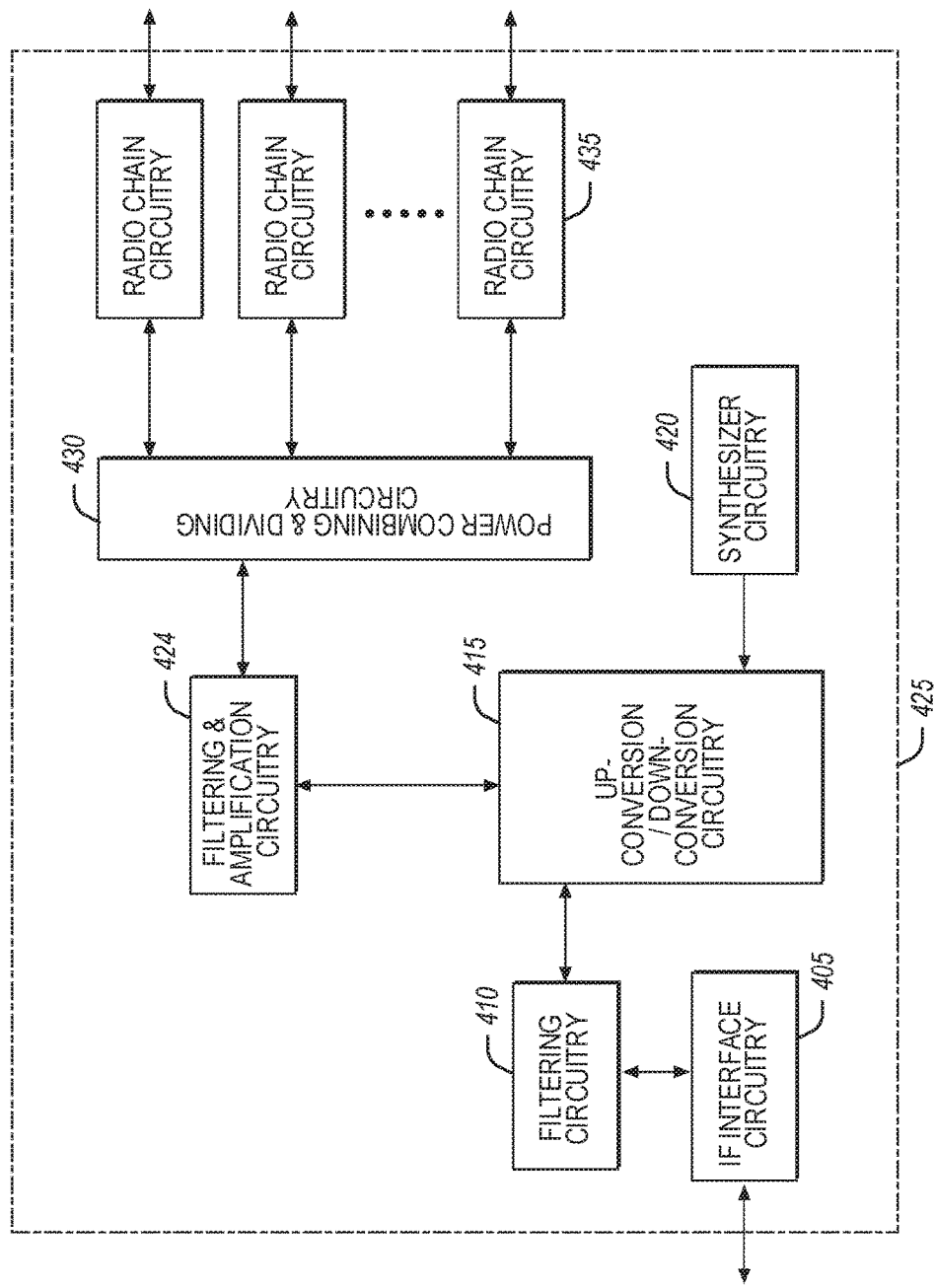
FIG. 4 illustrates exemplary useable RF circuitry in FIG. 3A according to some aspects.

FIG. 4 illustrates exemplary RF circuitry of FIG. 3A according to some aspects. In an aspect, RF circuitry 325 in FIG. 3A (depicted in FIG. 4 using reference number 425) may include one or more of the IF interface circuitry 405, filtering circuitry 410, up-conversion and down-conversion circuitry 415, synthesizer circuitry 420, filtering and amplification circuitry 424, power combining and dividing circuitry 430, and radio chain circuitry 435.

Figure 5B:
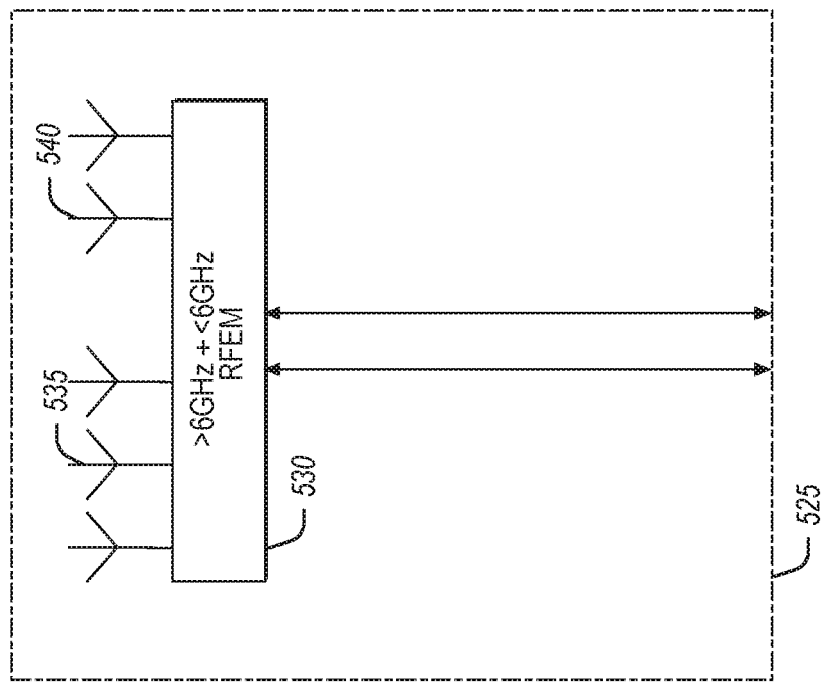
FIG. 5B illustrates an alternate aspect of an exemplary radio front end module, according to some aspects.
Figure 5A:
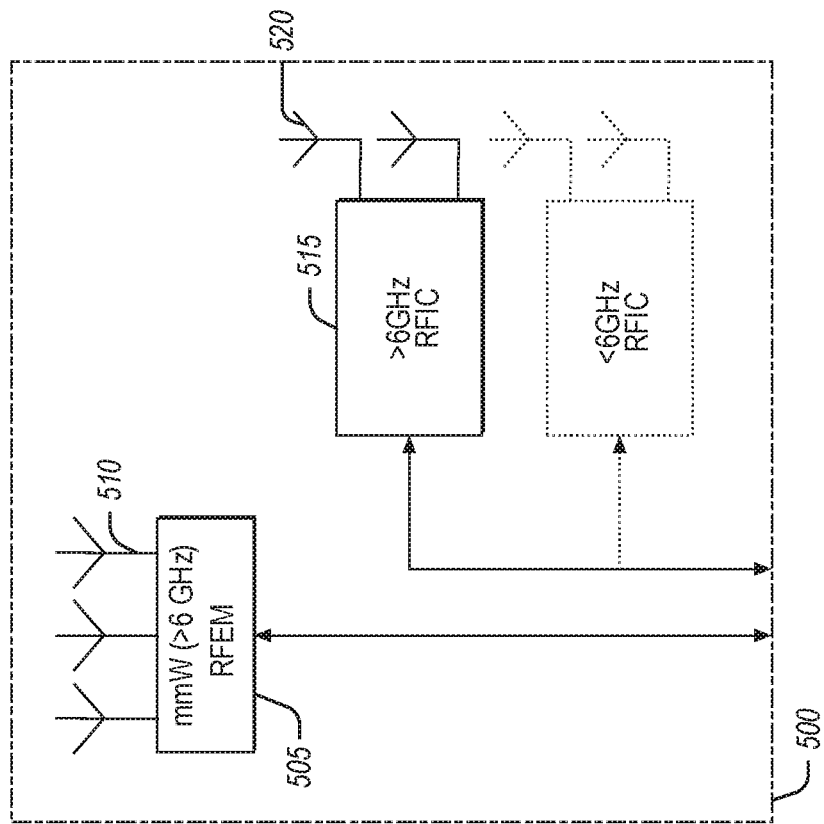
FIG. 5A illustrates an aspect of an exemplary radio front end module (RFEM) according to some aspects.

FIG. 5A and FIG. 5B illustrate aspects of a radio front end module useable in the circuitry shown in FIG. 1 and FIG. 2, according to some aspects. FIG. 5A illustrates an aspect of a radio front end module (RFEM) according to some aspects. RFEM 500 incorporates a millimeter-wave RFEM 505 and one or more above-six gigahertz radio frequency integrated circuits (RFIC) 515 and/or one or more sub-six gigahertz RFICs 522. In this aspect, the one or more sub-six gigahertz RFICs 515 and/or one or more sub-six gigahertz RFICs 522 may be physically separated from millimeter wave RFEM 505. RFICs 515 and 522 may include connection to one or more antennas 520. RFEM 505 may include multiple antennas 510.

FIG. 5B illustrates an alternate aspect of a radio front end module, according to some aspects. In this aspect, both millimeter-wave and sub-six gigahertz radio functions may be implemented in the same physical radio front end module (RFEM) 530. RFEM 530 may incorporate both millimeter-wave antennas 535 and sub-six gigahertz antennas 540.

Figure 6:
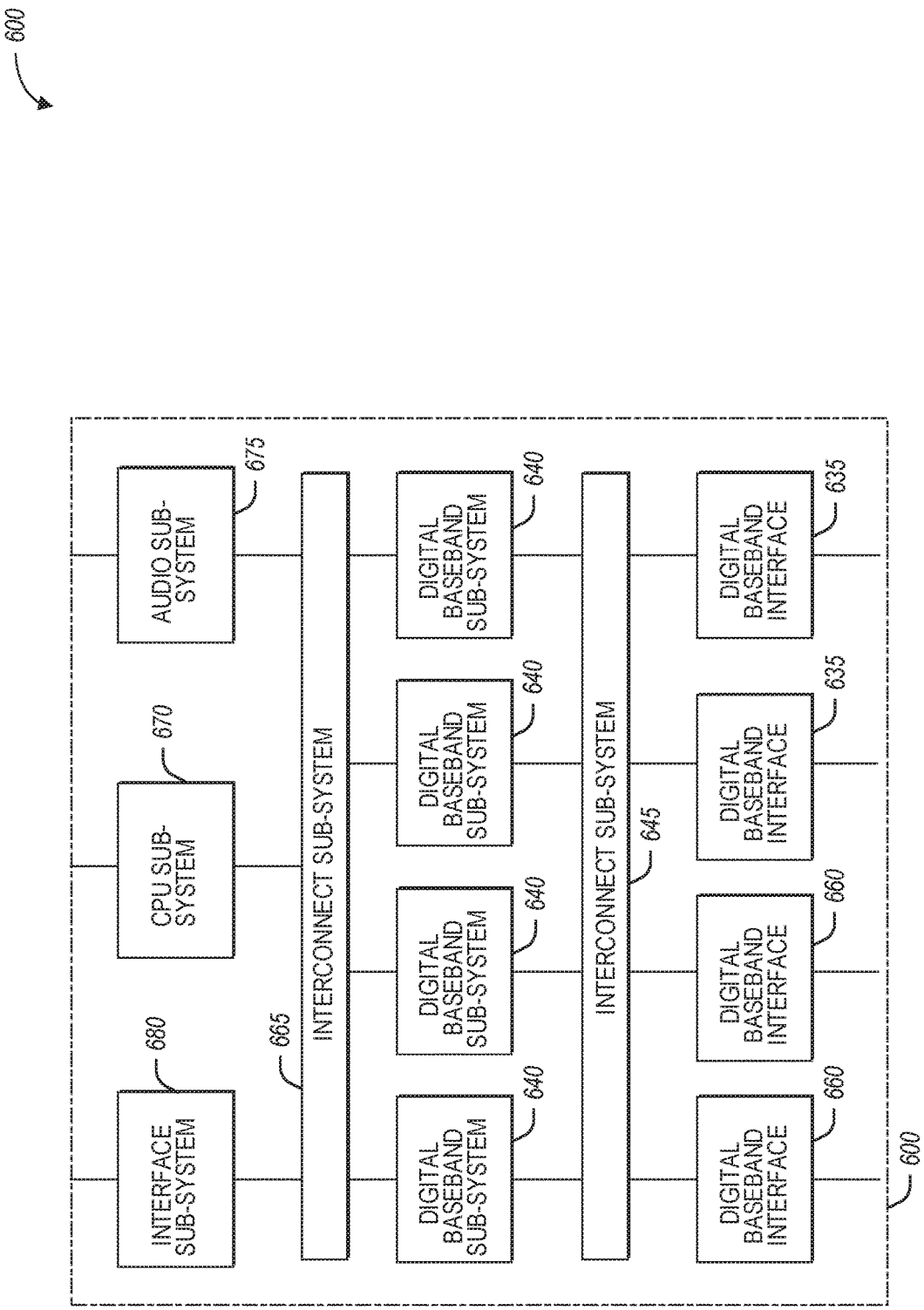
FIG. 6 illustrates an exemplary multi-protocol baseband processor useable in FIG. 1 or FIG. 2, according to some aspects.

FIG. 6 illustrates a multi-protocol baseband processor 600 useable in the system and circuitry is shown in FIG. 1 or FIG. 2, according to some aspects. In an aspect, the baseband processor may contain one or more digital baseband subsystems 640A, 640B, 640C, 640D, also herein referred to collectively as digital baseband subsystems 640.

In an aspect, the one or more digital baseband subsystems 640A, 640B, 640C, 640D may be coupled via interconnect subsystem 665 to one or more of the CPU subsystem 670, audio subsystem 675 and interface subsystem 680. In an aspect, the one or more digital baseband subsystems 640 may be coupled via interconnect subsystem 645 to one or more of each of digital baseband interface 660A, 660B and mixed-signal baseband subsystem 635A, 635B.

In an aspect, interconnect subsystem 665 and 645 may each include one or more of each of buses point-to-point connections and network-on-chip (NOC) structures. In an aspect, audio subsystem 675 may include one or more of digital signal processing circuitry, buffer memory, program memory, speech processing accelerator circuitry, data converter circuitry such as analog-to-digital and digital-to-analog converter circuitry and analog circuitry including one or more of amplifiers and filters.

Figure 7:
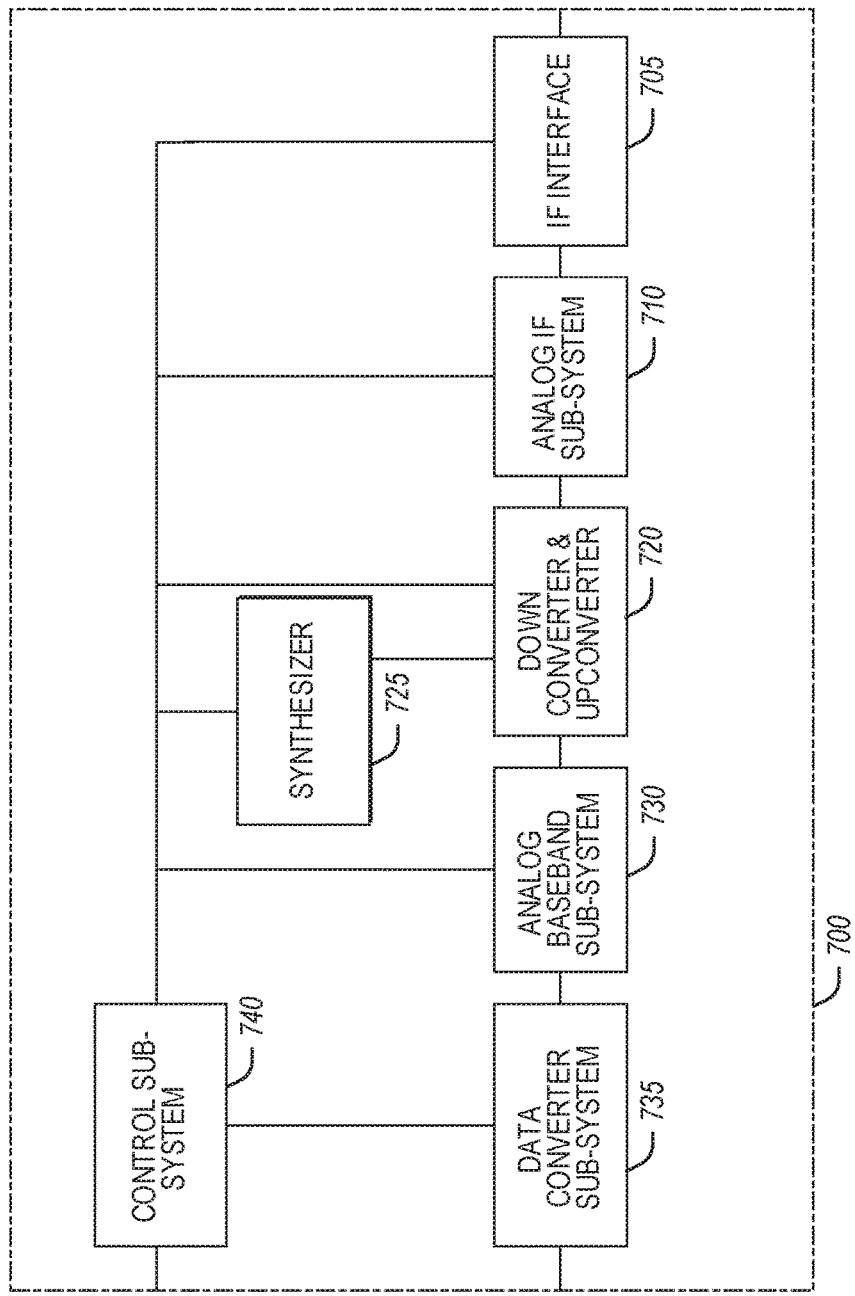
FIG. 7 illustrates an exemplary mixed-signal baseband subsystem, according to some aspects.

FIG. 7 illustrates an exemplary of a mixed-signal baseband subsystem 700, according to some aspects. In an aspect, mixed-signal baseband subsystem 700 may include one or more of IF interface 705, analog IF subsystem 710, down-converter and up-converter subsystem 720, analog baseband subsystem 730, data converter subsystem 735, synthesizer 725 and control subsystem 740.

Figure 8A:
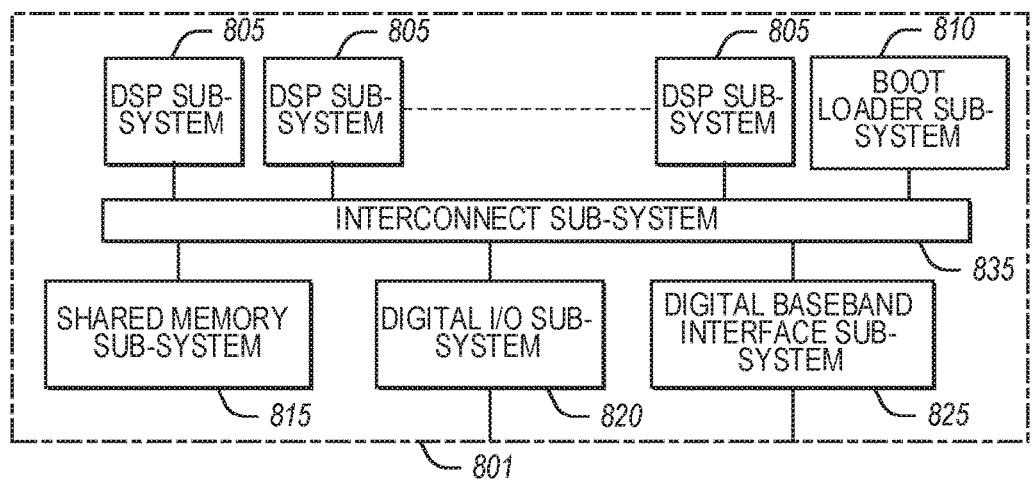
FIG. 8A illustrates an exemplary digital baseband subsystem, according to some aspects.
Figure 8B:
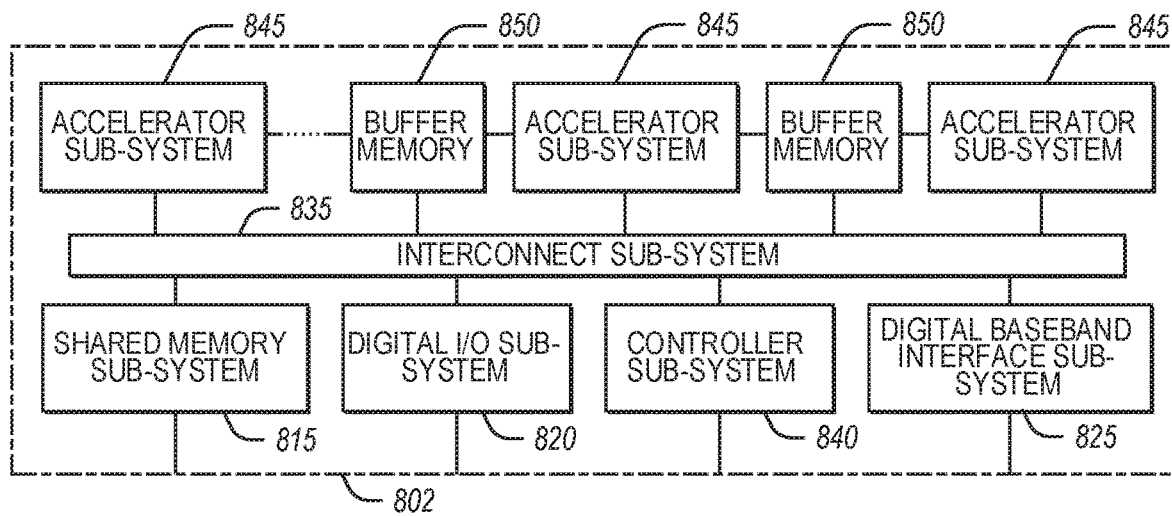
FIG. 8B illustrates an alternate aspect of an exemplary baseband processing subsystem, according to some aspects.

FIG. 8A illustrates a digital baseband processing subsystem 801, according to some aspects. FIG. 8B illustrates an alternate aspect of a digital baseband processing subsystem 802, according to some aspects.

In an aspect of FIG. 8A, the digital baseband processing subsystem 801 may include one or more of each of digital signal processor (DSP) subsystems 805A, 805B, . . . 805N, interconnect subsystem 835, boot loader subsystem 810, shared memory subsystem 815, digital I/O subsystem 820, and digital baseband interface subsystem 825.

In an aspect of FIG. 8B, digital baseband processing subsystem 802 may include one or more of each of accelerator subsystem 845A, 845B, . . . 845N, buffer memory 850A, 850B, . . . 850N, interconnect subsystem 835, shared memory subsystem 815, digital I/O subsystem 820, the controller subsystem 840 and digital baseband interface subsystem 825.

In an aspect, boot loader subsystem 810 may include digital logic circuitry configured to perform configuration of the program memory and running state associated with each of the one or more DSP subsystems 805. Configuration of the program memory of each of the one or more DSP subsystems 805 may include loading executable program code from storage external to digital baseband processing subsystems 801 and 802. Configuration of the running state associated with each of the one or more DSP subsystems 805 may include one or more of the steps of setting the state of at least one DSP core which may be incorporated into each of the one or more DSP subsystems 805 to a state in which it is not running and setting the state of at least one DSP core which may be incorporated into each of the one or more DSP subsystems 805 into a state in which it begins executing program code starting from a predefined memory location.

In an aspect, shared memory subsystem 815 may include one or more of read-only memory (ROM), static random access memory (SRAM), embedded dynamic random access memory (eDRAM) and/or non-volatile random access memory (NVRAM).

In an aspect, digital I/O subsystem 820 may include one or more of serial interfaces such as Inter-Integrated Circuit ($I^2C$), Serial Peripheral Interface (SPI) or other 1, 2 or 3-wire serial interfaces, parallel interfaces such as general-purpose input-output (GPIO), register access interfaces and direct memory access (DMA). In an aspect, a register access interface implemented in digital I/O subsystem 820 may permit a microprocessor core external to digital baseband processing subsystem 801 to read and/or write one or more of control and data registers and memory. In an aspect, DMA logic circuitry implemented in digital I/O subsystem 820 may permit the transfer of contiguous blocks of data between memory locations including memory locations internal and external to digital baseband processing subsystem 801.

In an aspect, digital baseband interface subsystem 825 may provide for the transfer of digital baseband samples between the baseband processing subsystem and mixed-signal baseband or radio-frequency circuitry external to digital baseband processing subsystem 801. In an aspect, digital baseband samples transferred by digital baseband interface subsystem 825 may include in-phase and quadrature (I/Q) samples.

In an aspect, controller subsystem 840 may include one or more of each of control and status registers and control state machines. In an aspect, control and status registers may be accessed via a register interface and may provide for one or more of starting and stopping operation of control state machines, resetting control state machines to a default state, configuring optional processing features, and/or configuring the generation of interrupts and reporting the status of operations. In an aspect, each of the one or more control state machines may control the sequence of operation of each of the one or more accelerator subsystems 845. There may be examples of implementations of both FIG. 8A and FIG. 8B in the same baseband subsystem.

Figure 9:
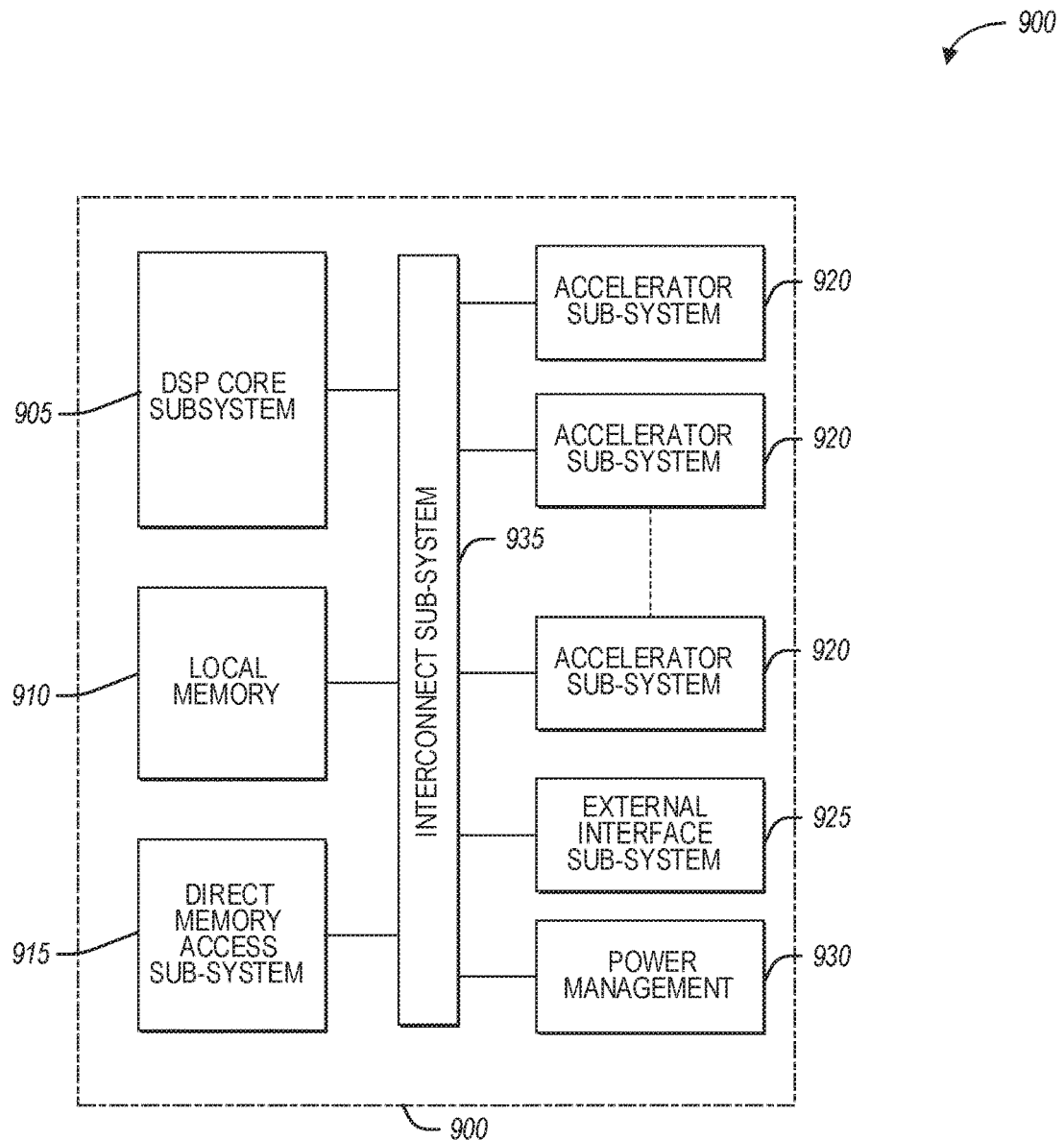
FIG. 9 illustrates an exemplary digital signal processor subsystem, according to some aspects.

FIG. 9 illustrates a digital signal processor (DSP) subsystem 900 according to some aspects.

In an aspect, DSP subsystem 900 may include one or more of each of DSP core subsystem 905, local memory 910, direct memory access (DMA) subsystem 915, accelerator subsystem 920A, 920B . . . 920N, external interface subsystem 925, power management circuitry 930 and interconnect subsystem 935.

In an aspect, local memory 910 may include one or more of each of read-only memory, static random access memory or embedded dynamic random access memory.

In an aspect, the DMA subsystem 915 may provide registers and control state machine circuitry adapted to transfer blocks of data between memory locations including memory locations internal and external to DSP subsystem 900.

In an aspect, external interface subsystem 925 may provide for access by a microprocessor system external to DSP subsystem 900 to one or more of memory, control registers and status registers which may be implemented in DSP subsystem 900. In an aspect, the external interface subsystem 925 may provide for the transfer of data between local memory 910 and storage external to DSP subsystem 900 under the control of one or more of the DMA subsystem 915 and the DSP core subsystem 905.

Figure 10A:
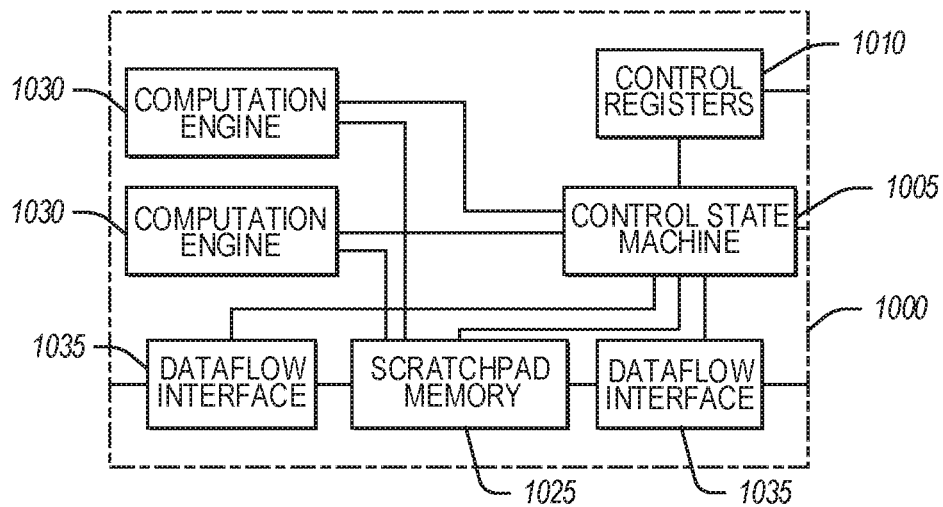
FIG. 10A illustrates an example of an accelerator subsystem, according to some aspects.
Figure 10B:
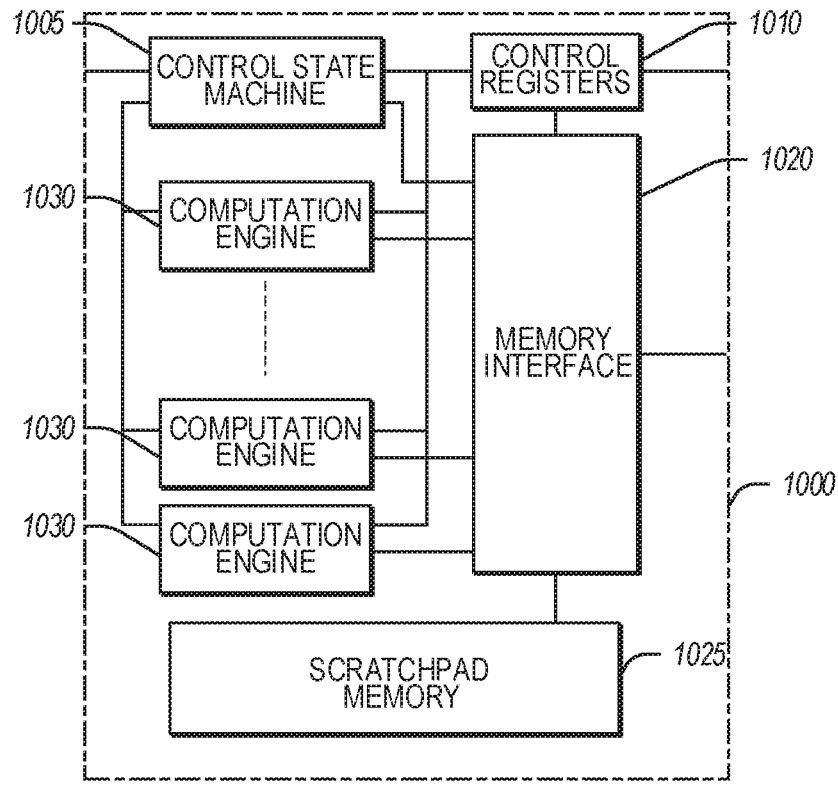
FIG. 10B illustrates an alternate exemplary accelerator subsystem, according to some aspects.

FIG. 10A illustrates an example of an accelerator subsystem 1000 according to some aspects. FIG. 10B illustrates an example of an accelerator subsystem 1000 according to some aspects.

In an aspect, accelerator subsystem 1000 may include one or more of each of the control state machine 1005, control registers 1010, a memory interface 1020, scratchpad memory 1025, computation engine 1030A . . . 1030N and dataflow interface 1035A, 1035B.

In an aspect, control registers 1010 may configure and control the operation of accelerator subsystem 1000, which may include one or more of enabling or disabling operation by means of an enable register bit, halting an in-process operation by writing to a halt register bit, providing parameters to configure computation operations, providing memory address information to identify the location of one or more control and data structures, configuring the generation of interrupts, or other control functions.

In an aspect, control state machine 1005 may control the sequence of operation of accelerator subsystem 1000.

FIGS. 11A-11D illustrate frame formats, according to some aspects.

Figure 11A:
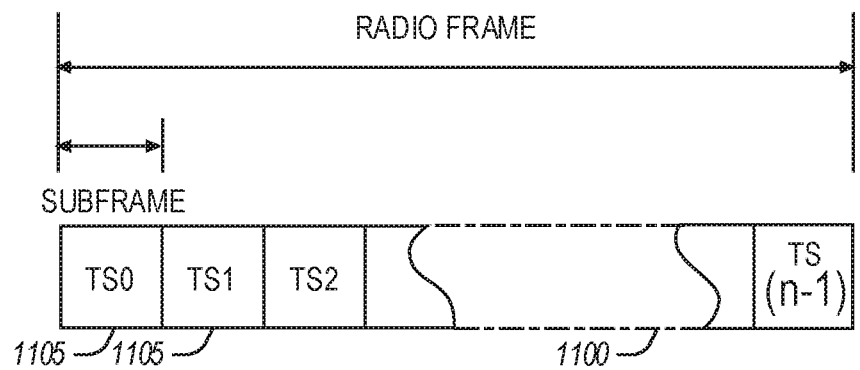
FIGS. 11A to 11E illustrate exemplary periodic radio frame structures, according to some aspects.

FIG. 11A illustrates a periodic radio frame structure 1100, according to some aspects. Radio frame structure 1100 has a predetermined duration and repeats in a periodic manner with a repetition interval equal to the predetermined duration. Radio frame structure 1100 is divided into two or more subframes 1105. In an aspect, subframes 1105 may be of predetermined duration which may be unequal. In an alternative aspect, subframes 1105 may be of a duration that is determined dynamically and varies between subsequent repetitions of radio frame structure 1100.

Figure 11B:
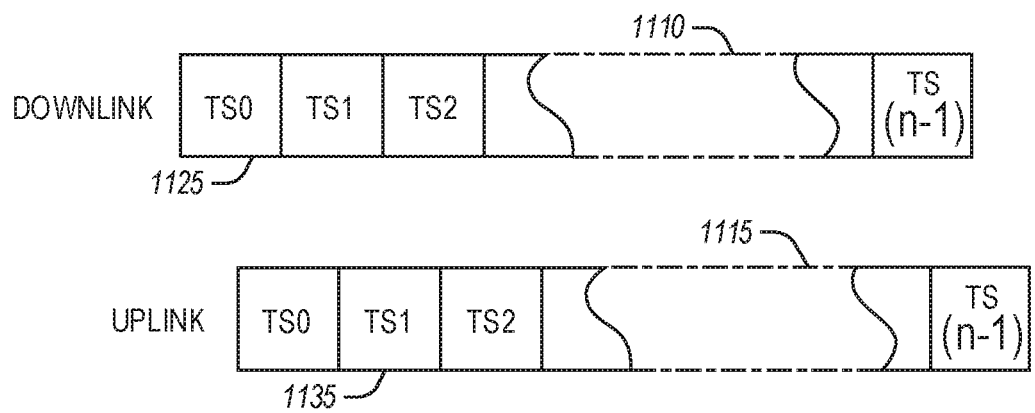
Figure 11C:
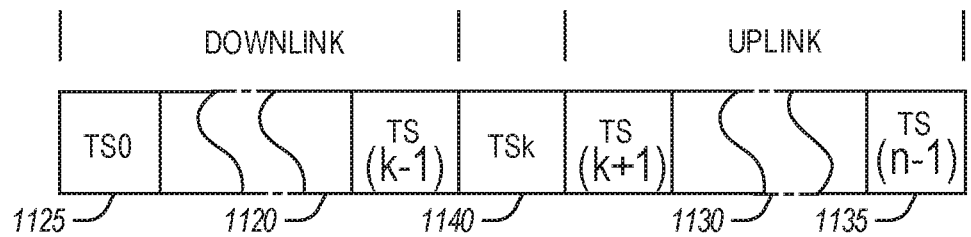

FIG. 11B illustrates a periodic radio frame structure using frequency division duplexing (FDD) according to some aspects. In an aspect of FDD, downlink radio frame structure 1110 is transmitted by a base station or infrastructure equipment to one or more mobile devices, and uplink radio frame structure 1115 is transmitted by a combination of one or more mobile devices to a base station.

Figure 11D:
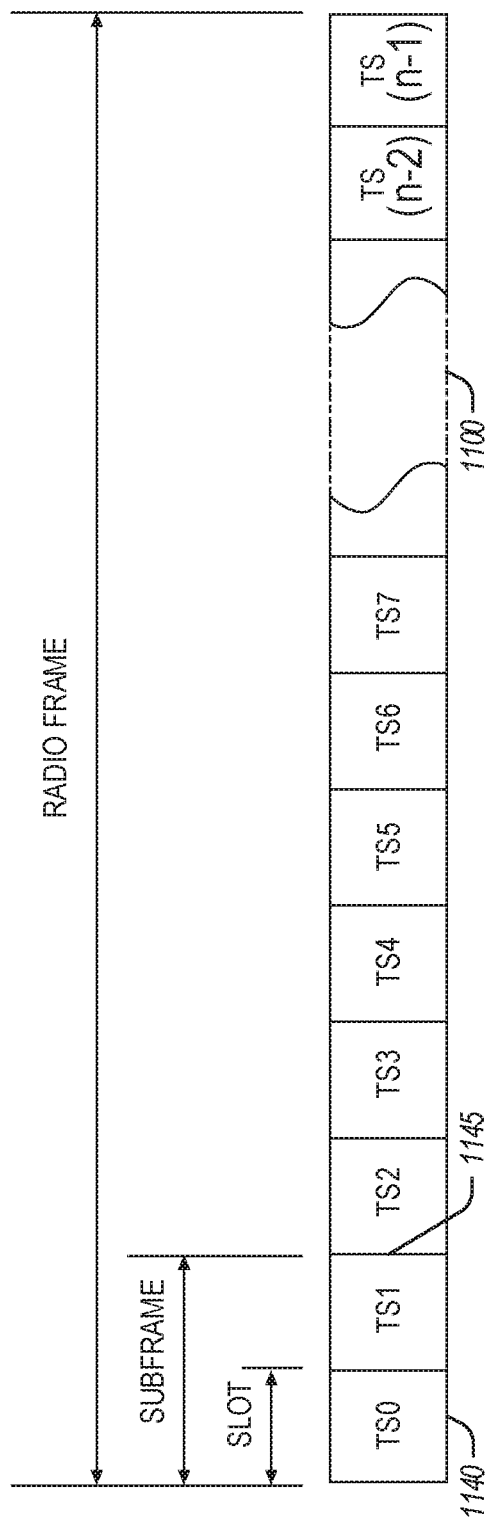

A further example of a radio frame structure that may be used in some aspects is shown in FIG. 11D. In this example, radio frame 1100 has a duration of 10 ms. Radio frame 1100 is divided into slots 1125, 1135 each of duration 0.1 ms, and numbered from 0 to 99. Additionally, each pair of adjacent slots 1125, 1135 numbered 2i and 2i+1, where i is an integer, is referred to as a subframe.

In some aspects, time intervals may be represented in units of $T_s$, where $T_s$ is defined as $1/(75,000 \times 2048)$ seconds. In FIG. 11D, a radio frame is defined as having a duration $1,536,600 \times T_s$, and a slot is defined as having a duration of $15,366 \times T_s$.

In some aspects using the radio frame format of FIG. 11D, each subframe may include a combination of one or more of downlink control information, downlink data information, uplink control information and/or uplink data information. The combination of information types and directions may be selected independently for each subframe.

Figure 11E:
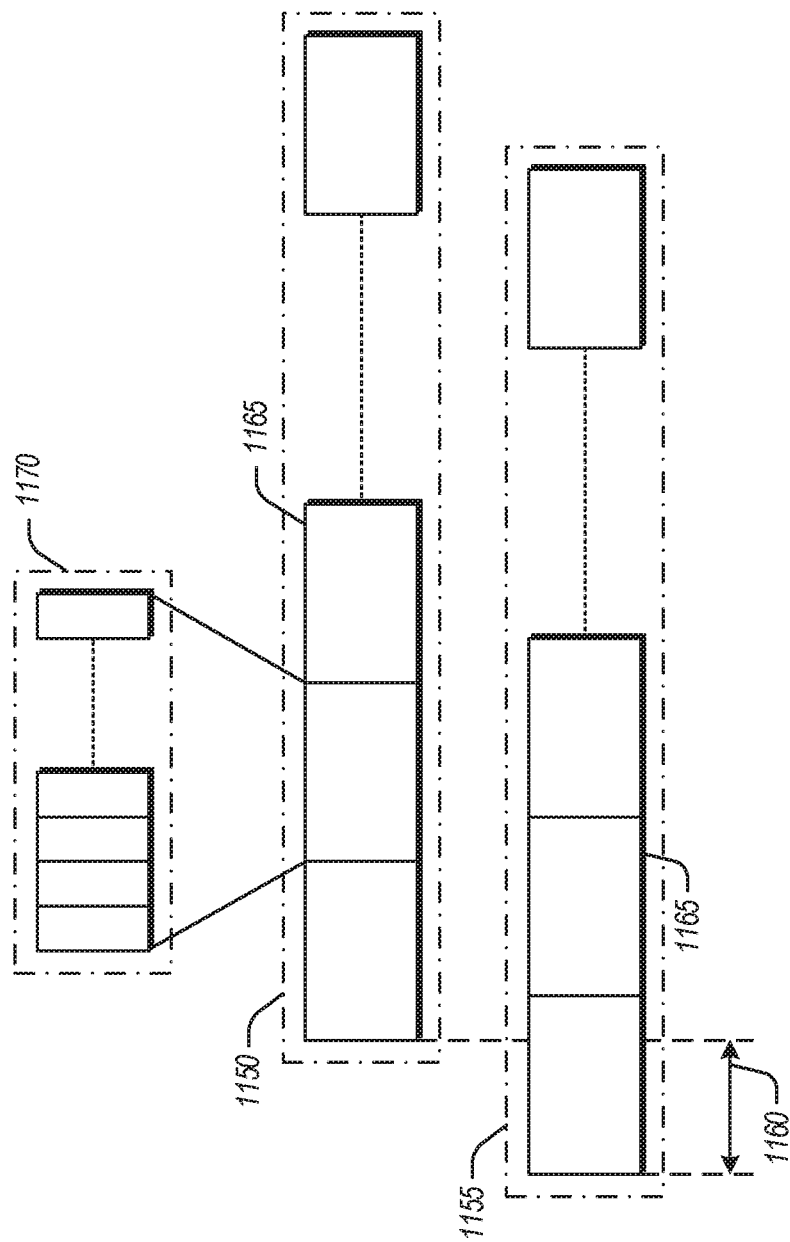

An example of a radio frame structure that may be used in some aspects is shown in FIG. 11E, illustrating downlink frame 1150 and uplink frame 1155. According to some aspects, downlink frame 1150 and uplink frame 1155 may have a duration of 10 ms, and uplink frame 1155 may be transmitted with a timing advance 1160 with respect to downlink frame 1150.

According to some aspects, downlink frame 1150 and uplink frame 1155 may each be divided into two or more subframes 1165, which may be 1 ms in duration. According to some aspects, each subframe 1165 may consist of one or more slots in 1170.

In some aspects, according to the examples of FIG. 11D and FIG. 11E, time intervals may be represented in units of Ts.

According to some aspects of the example illustrated in FIG. 11D, Ts may be defined as $1/(30, 720 \times 1000)$ seconds. According to some aspects of FIG. 11D, a radio frame may be defined as having a duration of 30,720. Ts, and a slot may be defined as having a duration of 15,360. Ts.

According to some aspects of the example illustrated in FIG. 11E, Ts may be defined as $Ts=1/(\Delta f_{max} \cdot N_f)$, where $\Delta f_{max}$ 480×10³ and $N_f$=4,096.

According to some aspects of the example illustrated in FIG. 11E, the number of slots may be determined based on a numerology parameter, which may be related to a frequency spacing between subcarriers of a multicarrier signal used for transmission.

Figure 12A:
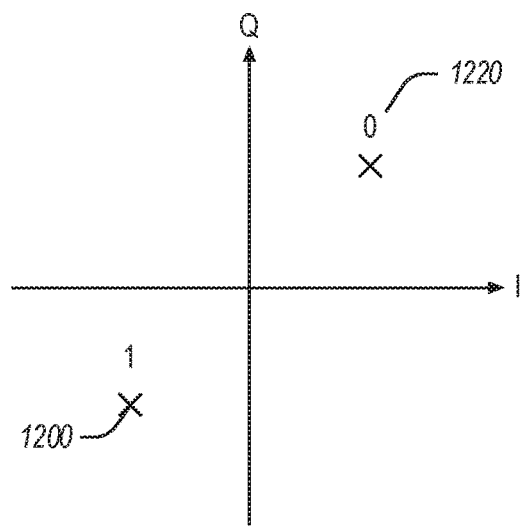
FIGS. 12A to 12C illustrate examples of constellation designs of a single carrier modulation scheme that may be transmitted or received, according to some aspects.
Figure 12B:
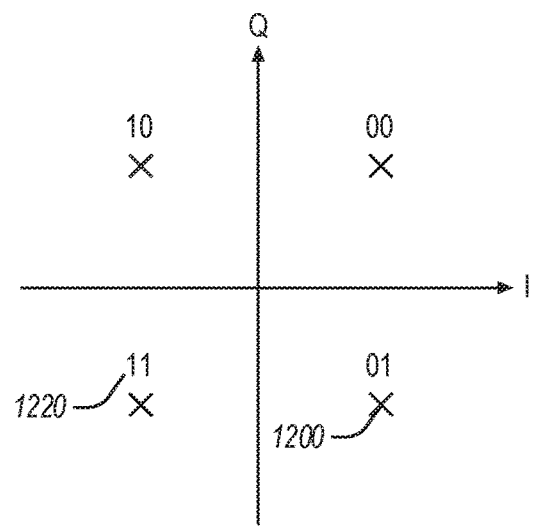
Figure 12C:
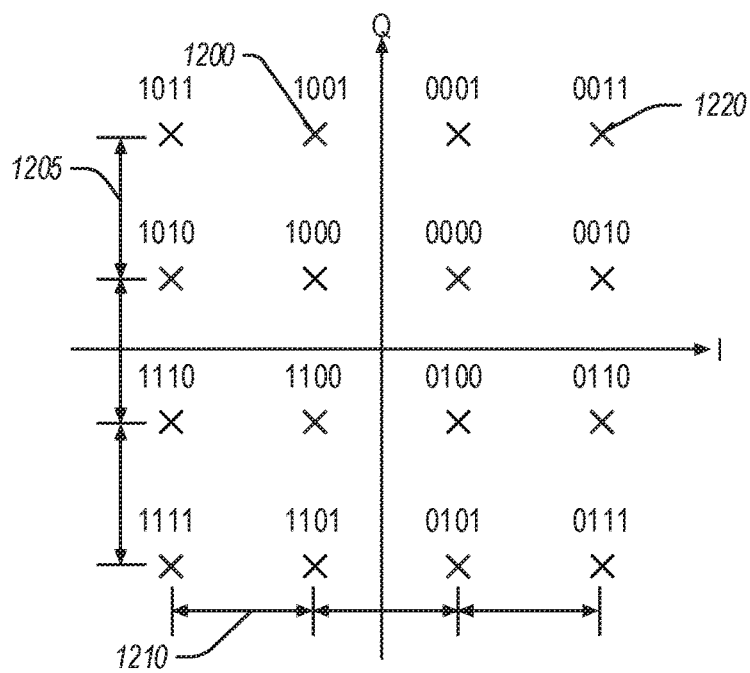

FIGS. 12A to 12C illustrate examples of constellation designs of a single carrier modulation scheme that may be transmitted or received according to some aspects. Constellation points 1200 are shown on orthogonal in-phase and quadrature axes, representing, respectively, amplitudes of sinusoids at the carrier frequency and separated in phase from one another by 90 degrees.

FIG. 12A represents a constellation including two points 1200, known as binary phase-shift keying (BPSK). FIG. 12B represents a constellation including four points 1200, known as quadrature phase-shift keying (QPSK). FIG. 12C represents a constellation including 16 points 1200, known as quadrature amplitude modulation (QAM) with 16 points (16QAM or QAM16). Higher-order modulation constellations, comprising for example 64, 256 or 1024, points may be similarly constructed.

In the constellations depicted in FIGS. 12A-12C, binary codes 1220 are assigned to the points 1200 of the constellation using a scheme such that nearest-neighbor points 1200, that is, pairs of points 1200 separated from each other by the minimum Euclidian distance, have an assigned binary code 1220 differing by only one binary digit. For example, in FIG. 12C the point assigned code 1000 has nearest neighbor points assigned codes 1001 (e.g., reference 1200), 0000, 1100 and 1010, each of which differs from 1000 by only one bit.

Figure 13A:
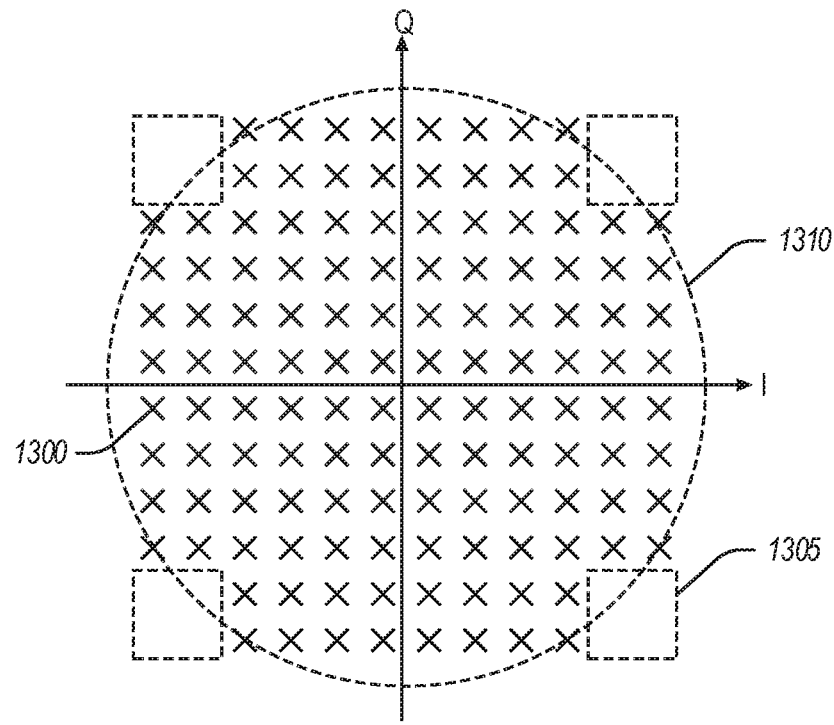
FIGS. 13A and 13B illustrate alternate exemplary constellation designs of a single carrier modulation scheme that may be transmitted and received, according to some aspects.
Figure 13B:
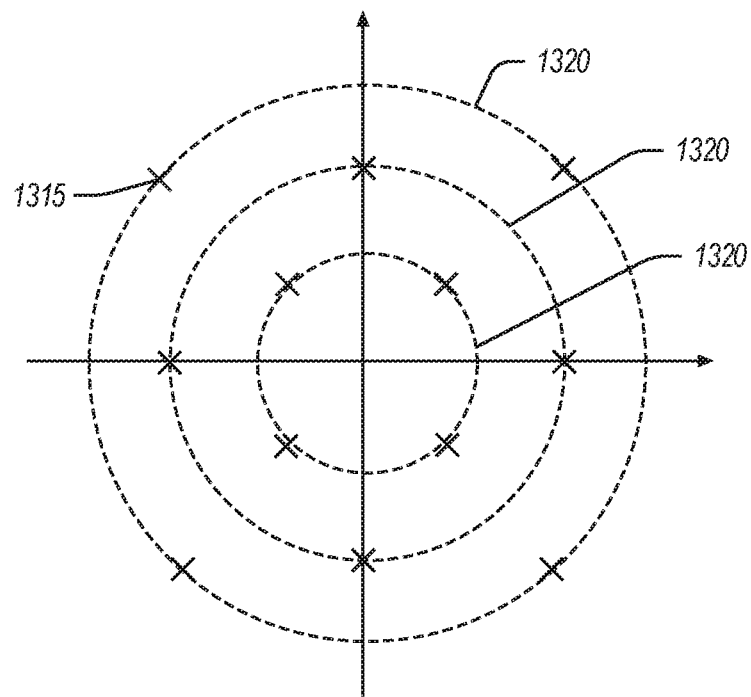

FIGS. 13A and 13B illustrate examples of alternate constellation designs of a single carrier modulation scheme that may be transmitted and received, according to some aspects. Constellation points 1300 and 1315 of FIG. 13A are shown on orthogonal in-phase and quadrature axes, representing, respectively, amplitudes of sinusoids at the carrier frequency and separated in phase from one another by 90 degrees.

In an aspect, the constellation points 1300 of the example illustrated in FIG. 13A may be arranged in a square grid and may be arranged such that there is an equal distance on the in-phase and quadrature plane between each pair of nearest-neighbor constellation points. In an aspect, the constellation points 1300 may be chosen such that there is a pre-determined maximum distance from the origin of the in-phase and quadrature plane of any of the allowed constellation points, the maximum distance represented by a circle 1310. In an aspect, the set of allowed constellation points may exclude those that would fall within square regions in 1305 at the corners of a square grid.

Constellation points 1300 and 1315 of FIG. 13B are shown on orthogonal in-phase and quadrature axes, representing, respectively, amplitudes of sinusoids at the carrier frequency and separated in phase from one another by 90 degrees. In an aspect, constellation points 1315 are grouped into two or more sets of constellation points, the points of each set arranged to have an equal distance to the origin of the in-phase and quadrature plane and lying on one of a set of circles 1320 centered on the origin.

Figure 14:
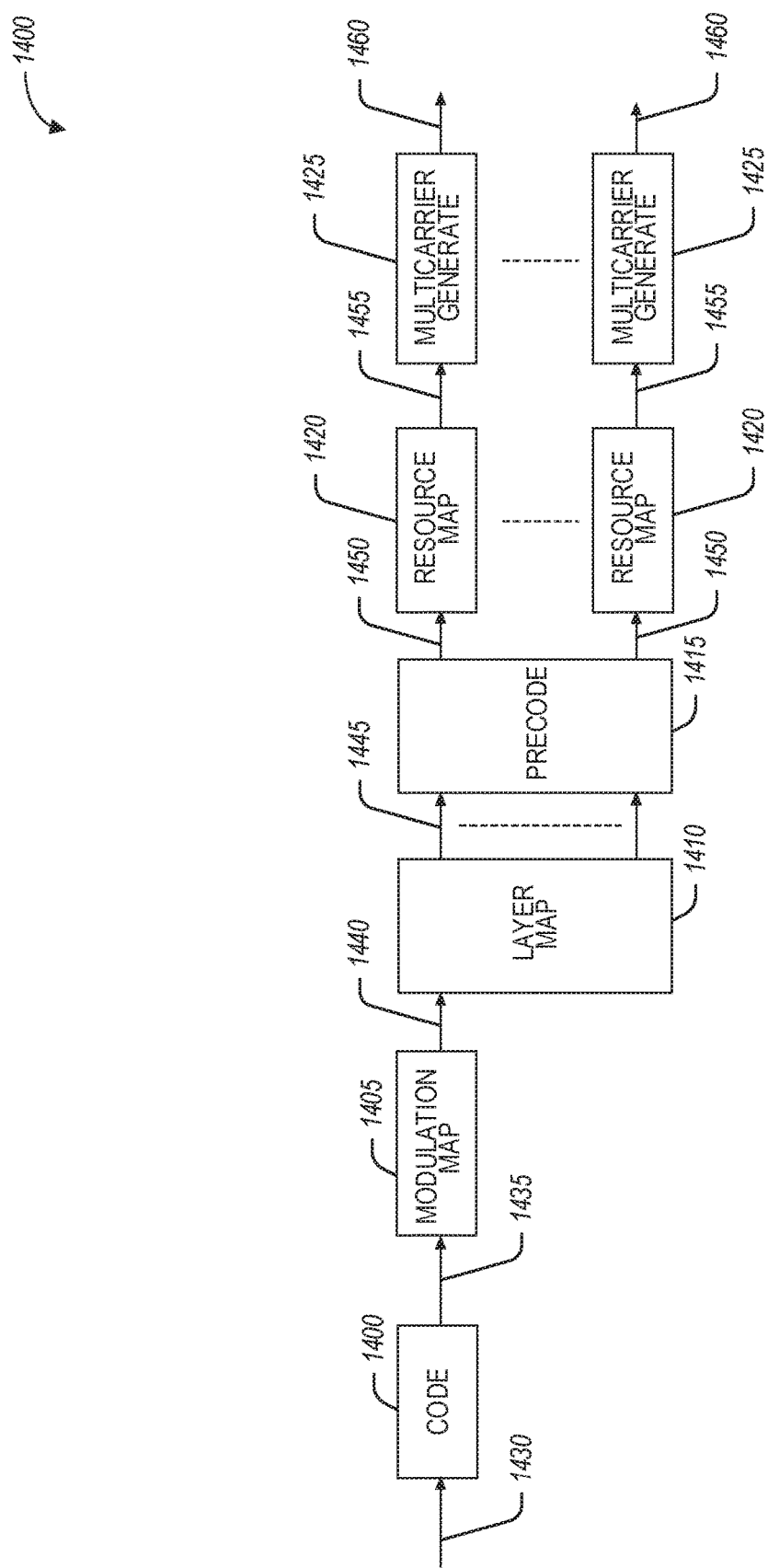
FIG. 14 illustrates an exemplary system for generating multicarrier baseband signals for transmission, according to some aspects.

FIG. 14 illustrates an example of a system for generating multicarrier baseband signals for transmission according to some aspects. In this aspect, data 1430 may be input to an encoder 1400 to generate encoded data 1435. Encoder 1400 may perform a combination of one or more of error detecting, error-correcting, rate matching, and interleaving. Encoder 1400 may further perform a step of scrambling.

In an aspect, encoded data 1435 may be input to a modulation mapper 1405 to generate complex-valued modulation symbols 1440. Modulation mapper 1405 may map groups including one or more binary digits, selected from encoded data 1435 to complex-valued modulation symbols according to one or more mapping tables.

In an aspect, complex-valued modulation symbols 1440 may be input to layer mapper 1410 to be mapped to one or more layer mapped modulation symbol streams 1445. Representing a stream of complex-valued modulation symbols 1440 as d(i) where i represents a sequence number index, and the one or more streams 1445 of layer mapped symbols as $x^{(k)}(i)$ where k represents a stream number index and i represents a sequence number index, the layer mapping function for a single layer may be expressed as:

$$x^{(0)}(i) = d(i)$$

and the layer mapping for two layers may be expressed as:

$$x^{(0)}(i)=d(2i)$$

$$x^{(1)}(i)=d(2i+1)$$

Layer mapping may be similarly represented for more than two layers.

In an aspect, one or more streams of layer mapped modulation symbol streams 1445 may be input to precoder 1415, which generates one or more streams of precoded symbols 1450. Representing the one or more streams 1445 of layer mapped symbols as a block of vectors:

$$[x^{(0)}(i) \ldots x^{(v-1)}(i)]^T$$

where i represents a sequence number index in the range 0 to $M_{symb}^{layer}-1$ the output is represented as a block of vectors:

$$[z^{(0)}(i) \ldots z^{(P-1)}(i)]^T$$

where i represents a sequence number index in the range 0 to $M_{symb}^{ap}-1$.

The precoding operation may be configured to include one of direct mapping using a single antenna port, transmit diversity using space-time block coding, or spatial multiplexing.

In an aspect, each stream of precoded symbols 1450 may be input to a resource mapper 1420, which generates a stream of resource mapped symbols 1455. The resource mapper 1420 may map precoded symbols to frequency domain subcarriers and time-domain symbols according to a mapping which may include contiguous block mapping, randomized mapping or sparse mapping according to a mapping code.

In an aspect, resource mapped symbols 1455 may be input to multicarrier generator 1425 which generates time-domain baseband symbol 1460. Multicarrier generator 1425 may generate time-domain symbols using, for example, an inverse discrete Fourier transform (DFT), commonly implemented as an inverse fast Fourier transform (FFT) or a filter bank including one or more filters. In an aspect, where resource mapped symbols 1455 are represented as $s_k(i)$, where k is a subcarrier index and i is a symbol number index, a time-domain complex baseband symbol x(t) may be represented as $x(t)=\Sigma_k s_k (i) p_T (t-T_{sym}) \exp[2\pi f_k (t-T_{sym}-\tau_k)]$, where $p_T(t)$ is a prototype filter function, $T_{sym}$ is the start time of the symbol period, $\tau_k$ is a subcarrier dependent time offset, and $f_k$ is the frequency of subcarrier k.

Prototype functions $p_T(t)$ may be, for example, rectangular time-domain pulses, Gaussian time-domain pulses or any other suitable function.

In some aspects, a sub-component of a transmitted signal including a subcarrier in the frequency domain and a symbol interval in the time domain may be termed a resource element.

Figure 15:
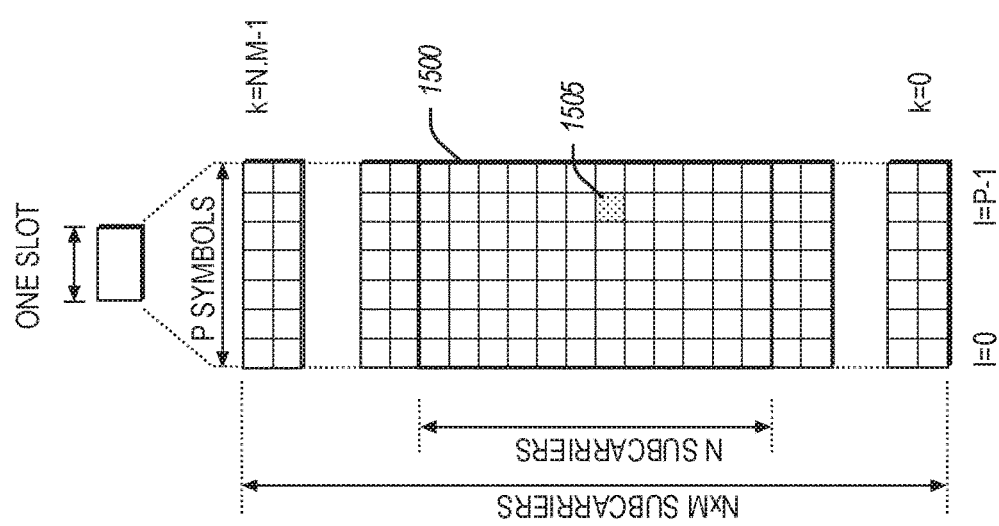
FIG. 15 illustrates exemplary resource elements depicted in a grid form, according to some aspects.

FIG. 15 illustrates resource elements 1505 depicted in a grid form, according to some aspects. In some aspects, resource elements may be grouped into rectangular blocks including a plurality of subcarriers (e.g., 12 subcarriers) in the frequency domain and the number, P, of symbols contained in one slot in the time domain. The number P may be 6, 7, or any other suitable number of symbols. In the depiction of FIG. 15, each resource element 1505 within resource block 1500 can be indexed as (k, l) where k is the index number of the subcarrier, in the range 0 to N×M−1, where N is the number of subcarriers in a resource block, and M is the number of resource blocks.

Figure 16A:
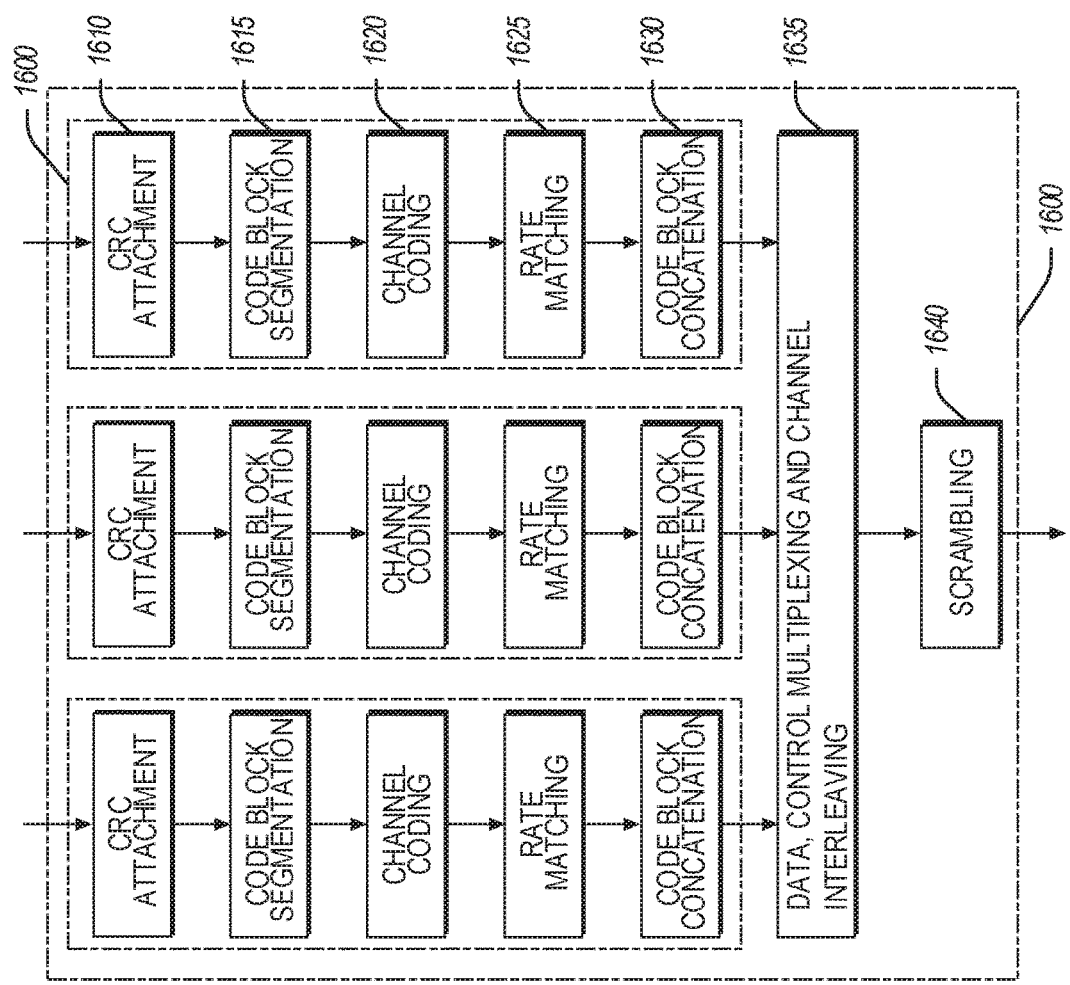
FIG. 16A, FIG. 16B, FIG. 16C, and FIG. 16D illustrate examples of coding, according to some aspects.

FIG. 16A, FIG. 16B, FIG. 16C, and FIG. 16D illustrate example of coding, according to some aspects. FIG. 16A illustrates an example of a coding process 1600 that may be used in some aspects. The coding process 1600 may include one or more physical coding processes 1605 that may be used to provide coding for a physical channel that may encode data or control information. The coding process 1600 may also include multiplexing and interleaving 1635 that generates combined coded information by combining information from one or more sources, which may include one or more of data information and control information, and which may have been encoded by one or more physical coding processes 1605. Combined coded information may be input to scrambler 1640 which may generate scrambled coded information.

Physical coding process 1605 may include one or more of CRC attachment block 1610, code block segmentation 1615, channel coding 1620, rate matching 1625, and code block concatenation 1630. CRC attachment block 1610 may calculate parity bits denoted $\{p_0, p_1, \ldots, p_{L-1}\}$ from input bits denoted $\{a_0, a_1, \ldots a_{A-1}\}$ to generate a sequence of output bits $\{b_0, b_1, \ldots, b_{A+L-1}\}$, such that the polynomial over the finite field GF(2) in the variable D using the output sequence bits as coefficients (i.e., polynomial $b_0 D^{A+L-1} + b_1 D^{A+L-2} + \ldots + b_{A+L-2} D^1 + b_{A+L-1}$), has a predetermined remainder when divided by a predetermined generator polynomial g(D) of order L. In an aspect, the predetermined remainder may be zero, L may be 24 and the predetermined polynomial g(D) may be $D^{24}+D^{23}+D^{18}+D^{17}+D^{14}+D^{11}+D^{10}+D^7+D^6+D^5+D^4+D^3+D+1$.

In some aspects, the process of code block segmentation 1615 may generate one or more segmented code blocks, each including a portion of the data input to code segmentation 1615. Code block segmentation 1615 may have minimum and maximum block size constraints as parameters, determined according to a selected channel coding scheme. Code block segmentation 1615 may add filler bits to one or more output segmented code blocks, in order to ensure that the minimum block size constraint is met. Code block segmentation 1615 may divide data input to the process into blocks in order to ensure that the maximum block size constraint is met. In some aspects, code block segmentation 1615 may append parity bits to each segmented code block. Such appending of parity bits may be determined based on one or more of the selected coding scheme and whether the number of segmented code blocks to be generated is greater than one.

In some aspects, the process of channel coding 1620 may generate code words from segmented code blocks according to one or more of a number of coding schemes. As an example, channel coding 1620 may make use of one or more of convolutional coding, tail-biting convolutional coding, parallel concatenated convolutional coding and polar coding.

Figure 16B:
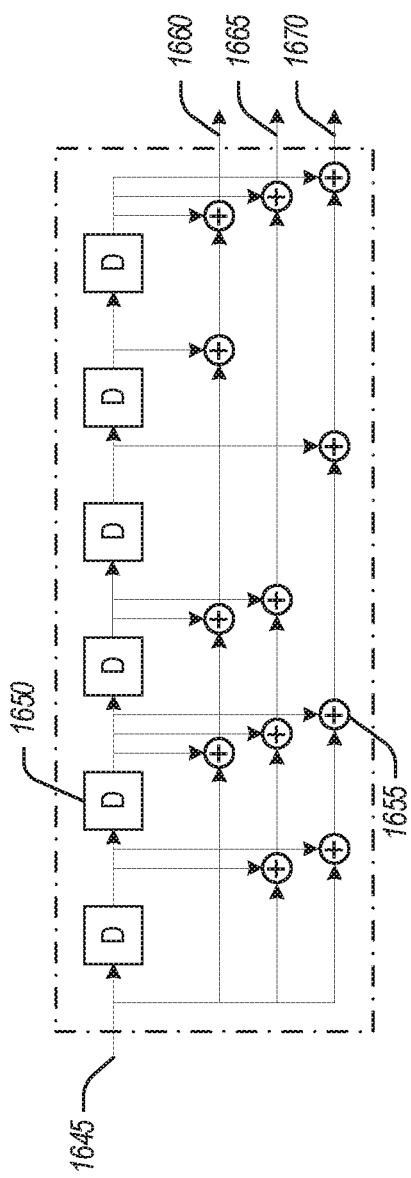

An encoder 1620 that may be used to encode data according to one of a convolutional code and a tail-biting convolutional code according to some aspects is illustrated in FIG. 16B.

According to some aspects, input data 1645 may be successively delayed by each of two or more delay elements 1650, generating a data word consisting of elements that include the current input data and two or more copies of the current input data, each copy delayed respectively by a different number of time units. According to some aspects, encoder 1620 may generate one or more outputs 1660, 1665 and 1670, each generated by calculating a linear combination of the elements of a data word generated by combining input data 1645 and the outputs of two or more delay elements 1650.

According to some aspects, the input data may be binary data and the linear combination may be calculated using one or more exclusive or functions 1655. According to some aspects, encoder 1620 may be implemented using software running on a processor and delay elements 1650 may be implemented by storing input data 1645 in memory.

According to some aspects, a convolutional code may be generated by using convolutional encoder 1620 and initializing delay elements 1650 to a predetermined value, which may be all zeros or any other suitable value. According to some aspects, a tail-biting convolutional code may be generated by using convolutional encoder 1620 and initializing delay elements 1650 to the last N bits of a block of data, where N is the number of delay elements 1650.

Figure 16C:
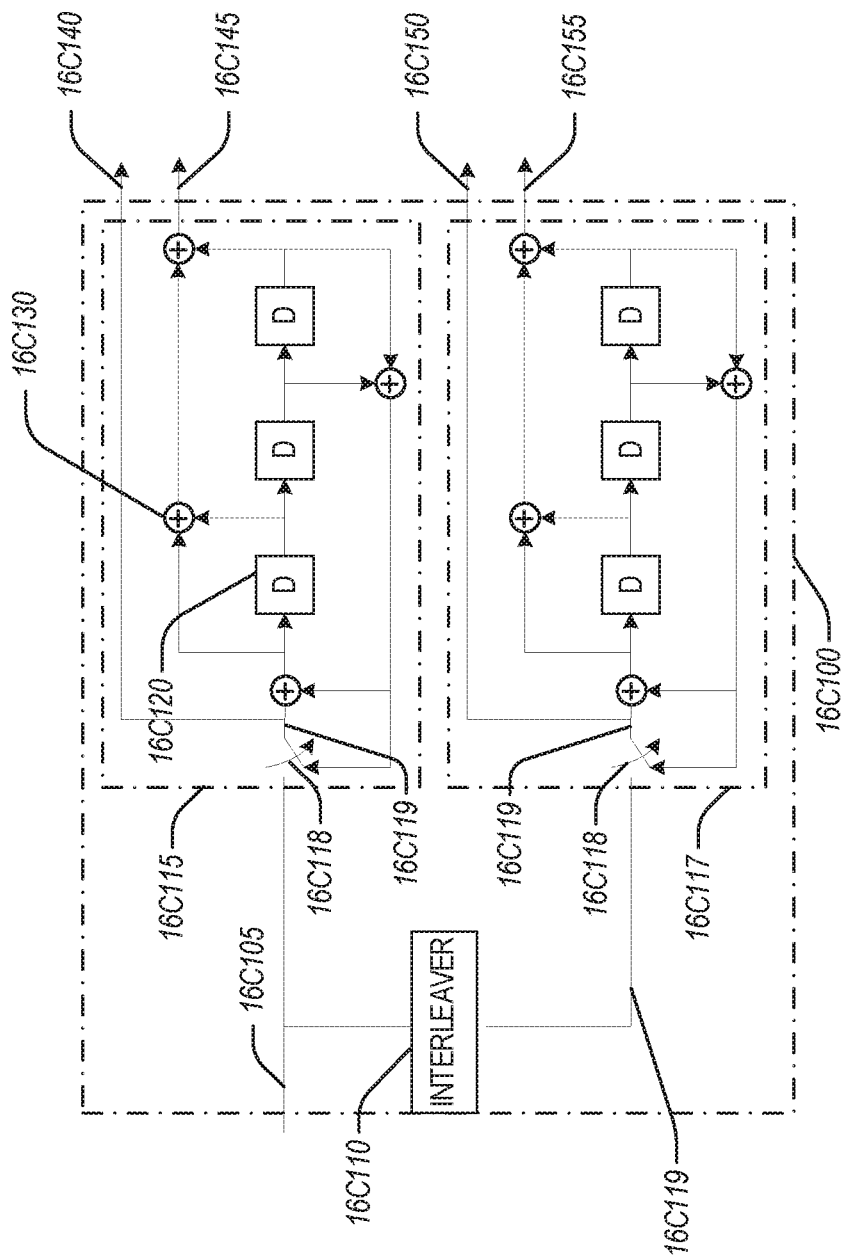

An encoder 16C100 that may be used to encode data according to a parallel concatenated convolutional code (PCCC) that may be referred to as a turbo code, according to some aspects is illustrated in FIG. 16C.

According to some aspects, encoder 16C100 may include an interleaver 16C110, upper constituent encoder 16C115, and lower constituent encoder 16C 117. According to some aspects, upper constituent encoder 16C115 may generate one or more encoded data streams 16C140 and 16C145 from input data 16C105. According to some aspects, interleaver 16C110 may generate interleaved input data 16C119 from input data 16C105. According to some aspects, lower constituent encoder 16C117 may generate one or more encoded data streams 16C150 and 16C155 from interleaved input data 16C105.

According to some aspects, interleaver 16C 110 may output interleaved output data 16C119 that has a one to one relationship with the data contained in input data 16C105, but with the data arranged in different time order. According to some aspects, interleaver 16C110 may be a block interleaver, taking as input one or more blocks of input data 16C105, which may be represented as $\{c_0, c_1, \ldots, c_{K-1}\}$, where each ci is an input data bit and K is the number of bits in each block, and generating an output corresponding to each of the one or more such input blocks, which may be represented as $\{c_{\Pi(1)}, c_{\Pi(2)}, \ldots, c_{\Pi(K-1)}\}$. $\Pi(i)$ is a permutation function, which may be of a quadratic form and which may be represented by $\Pi(i)=(f_1 i+f_2 i^2) \mod K$, where $f1$ and $f2$ are constants that may be dependent on the value of the block size K.

According to some aspects, each of upper constituent encoder 16C115 and lower constituent encoder 16C117 may include input bit selector 16C118 which may generate a selected input bitstream 16C119 that may be selected from one of an encoder input bitstream during a data encoding phase and a linear combination of stored bits during a trellis termination phase. According to some aspects, each of upper constituent encoder 16C115 and lower constituent encoder 16C117 may store bits in two or more delay elements 16C120 arranged to function as a shift register, the input to the shift register consisting of a linear combination of a bit from a selected input bitstream 16C119 and previously-stored bits, the stored bits being initialized to a predetermined value prior to an encoding phase, and having a predetermined value at the end of a trellis termination phase. According to some aspects, each of the upper constituent encoder 16C115 and lower constituent encoder 16C117 may generate one or more outputs 16C140 and 16C145, each of which may be a one of a selected input bitstream 16C 119 and a linear combination of stored bits.

According to some aspects, each ofupper constituent encoder 16C115 and lower constituent encoder 16C117 may have a transfer function during an encoding phase that may be represented as $$H(z) = \left[1, \frac{1+z^{-1}+z^{-3}}{1+z^{-2}+z^{-3}}\right].$$

According to some aspects, encoder 16C100 may be implemented as software instructions running on a processor in combination with memory to store data input to interleaver 16C 110 and stored bits of each of the upper constituent encoder 16C115 and lower constituent encoder 16C117.

Figure 16D:
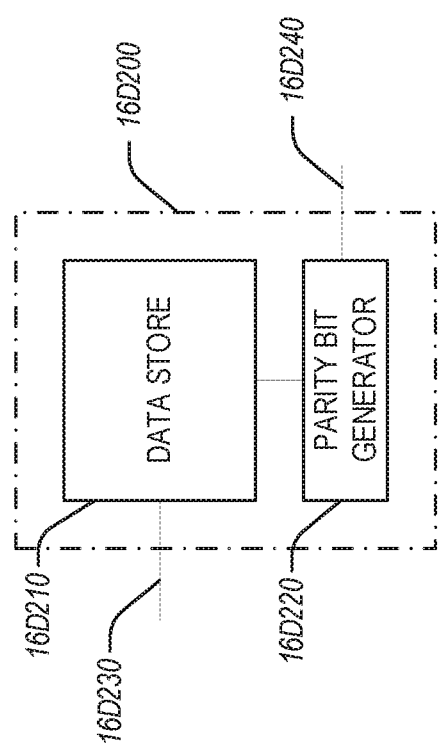

An encoder 16D200 that may be used to encode data bits according to a low-density parity-check (LDPC) code according to some aspects is illustrated in FIG. 16D.

According to some aspects, data bits 16D230 input to encoder 16D200 may be stored in data store 16D210, stored data bits may be input to parity bit generator 16D220 and encoded bits 16D240 may be output by parity bit generator 16D220.

According to some aspects, data bits input to LDPC encoder 16D200 may be represented as $c=\{c_0, c_1, \ldots, c_{K-1}\}$, encoded data bits 16D240 may be represented as $d=\{c_0, c_1, \ldots, c_{K-1}, p_0, p_1, \ldots, p_{D-K-1}\}$, and parity bits pi may be selected such that $H \cdot d^T = 0$, where H is a parity check matrix, K is the number of bits in the block to be encoded, D is the number of encoded bits and D-K is the number of parity check bits.

According to an aspect, parity check matrix H may be represented as:

$$H = \begin{bmatrix} p^{a_{0,0}} & p^{a_{0,1}} & p^{a_{0,2}} & & p^{a_{0,M-2}} & p^{a_{0,M-1}} \\ p^{a_{1,0}} & p^{a_{1,1}} & p^{a_{1,2}} & & p^{a_{1,M-2}} & p^{a_{1,M-1}} \\ p^{a_{2,0}} & p^{a_{2,1}} & p^{a_{2,2}} & \ldots & p^{a_{2,M-2}} & p^{a_{1,M-1}} \\ & & \vdots & \ddots & & \\ p^{a_{N-1,0}} & p^{a_{N-1,1}} & p^{a_{N-1,2}} & & p^{a_{N-1,M-2}} & p^{a_{N-1,M-1}} \end{bmatrix},$$

where $p^{\alpha_{i,j}}$ is one of a zero matrix or a cyclic permutation matrix obtained from the Z×Z identity matrix by cyclically shifting the columns to the right by ai,j, Z is the size of the constituent permutation matrix, the number of encoded bits D is equal to ZM and the number of bits K in the block to be encoded is equal to ZN.

Digital polar transmitters (DTxs), whose inputs may be amplitude and phase, may be a promising architecture for integrated Complementary Metal-Oxide-Semiconductor (CMOS) radios used in devices communicating through the next generation systems as such devices offer, for example, the potential for higher efficiency and system-on-a-chip (SoC) integration. DTxs may use amplitude variation and phase variation of an output signal to provide data. However, DTxs, like other transmitters, have been restricted to lower frequencies (typically <6 GHz) due to challenges of implementing wideband phase modulators at the mmWave/sub-mmWave frequencies used in the next generation systems as well as implementing DTxs at mmWave/sub-mmWave speeds. The channel bandwidth for the next generation systems may be in the order of 100 MHz-GHz and employ one or both single carrier (SC) and Orthogonal frequency-division multiplexing (OFDM)-based modulations. This is to say that while a fundamental oscillation may be produced over the various channel frequencies, adjusting the amplitude and phase at the higher frequencies is a consideration.

Additionally, with the use of mmWave/sub-mmWave frequencies, the power efficiency of the DTxs may be substantially reduced at such frequencies due to the discrepancy in amplitude variation and corresponding peak power efficiency between mmWave/sub-mmWave frequency signals and lower frequency signals. OFDM may impose additional spectral limitations on the phase modulation signals produced by the DTxs. In order to meet the link budget with the higher propagation losses at the higher mmWave/sub-mmWave frequencies, such links may rely on phased arrays and multi-user Multiple Input Multiple Output (MIMO) in order to optimize the use of spatial channels across multiple users. In practical terms, the use of phased arrays may mean that multiple transmit and receive chains are used on each device, further increasing the transmission power used in addition to encountering the above power inefficiencies. Therefore, it could be useful to improve the DTx efficiency at mmWave/sub-mmWave frequencies.

In an aspect, to help ameliorate these issues, a wideband phase modulator architecture is provided that may be suitable for both single-carrier and OFDM based-mmWave/sub-mmWave DTxs. The wideband phase modulator architecture may contain multiple parallel transmission chains for phased arrays and MIMO/MU-MIMO. Phase modulators can incorporate phase shifts for implementing the phased array.

In an aspect, the DTx may use phase and amplitude extraction that supports low operator-sum representation (OSR) polar decomposition of wide-bandwidth RF signals. A digital-to-time converter (DTC)-based phase modulator may be used that is clocked in the low-GHz frequency band for practical considerations (feasibility, timing margins, power dissipation etc.). Time interleaving may be used between multiple DTCs to increase the clock frequency to up to about 10 GHz. In addition, a sub-harmonic series injection into mmWave/sub-mmWave LC oscillators may be used to up-convert the modulation to RF frequencies.

RF communication systems often times utilize sub-systems (e.g., voltage-controlled oscillators (VCOs), power amplifiers) that are formed on a semiconductor die. More specifically, various electronic elements (e.g., capacitors and inductors) of such sub-systems are printed on the semiconductor die. However, the resistance that is inherent with the silicon of the semiconductor die significantly reduces the quality (Q) factor (ratio of inductance divided by resistance) of the inductors printed on the die.

Techniques discussed herein include carrier frequency offset (CFO) estimation techniques for wireless communication systems with low-precision ADCs. In some aspects, a blind CFO estimation technique may be developed based on a Bayesian algorithm that utilizes an analog preprocessor before ADCs. Estimation techniques may use Expectation-Maximization Gaussian-Mixture Approximate Message Passing (EM-GM-GAMP) for a joint CFO-and-channel estimation one-bit ADC case. A common deficiency of these methods is that they are only applicable to frequency-flat channels that do not capture the effect of channel dispersion. In some aspects, a joint CFO-and-channel estimation technique for wideband communication systems with one-bit ADCs is developed by a message-passing algorithm. These techniques, however, may not be extended to a multi-bit (e.g., 2~4-bit) ADC case. Additionally, conventional techniques for the CFO estimation do not work in low-power wideband communications systems because the distribution of the received signal and the effect of the synchronization imperfection are very different from those of conventional systems that ignore the quantization error due to the ADCs.

In some aspects, a joint carrier-frequency-offset (CFO) and channel estimation technique is discussed herein for a single-input-multiple-output (SIMO) wideband communication systems with low-precision ADCs. The principle of the proposed technique is to first estimate the CFO with a compressed channel and then estimate a full channel based on the estimated CFO. In some aspects, to obtain the compressed channel, a pilot frame is divided into two parts. The first part includes pilot signals with the same phase, which may be used for the CFO estimation only, while both parts may be used when estimating the channel. In some aspects, for the CFO estimation, a multi-stage candidate searching algorithm may be used to reduce computational complexity.

The proposed techniques enable wideband communication systems with low-precision (e.g., 1~3 precision bits) ADCs that provide a significant reduction in power consumption at a receiver, compared to conventional systems that operate with high-precision (e.g., 8~14 precision bits) ADCs. The proposed techniques may be applicable to wideband systems with multi-bit ADCs, while existing solutions have limited applicability such as narrowband channel or one-bit ADC. Furthermore, the proposed technique may be used to achieve optimal estimation performance (i.e., the minimum estimation error) by adjusting its design parameters. In addition, the performance-complexity tradeoff of the proposed method can be adjusted by the choice of the design parameters that may depend on hardware capabilities and the performance requirements.

Figure 17:
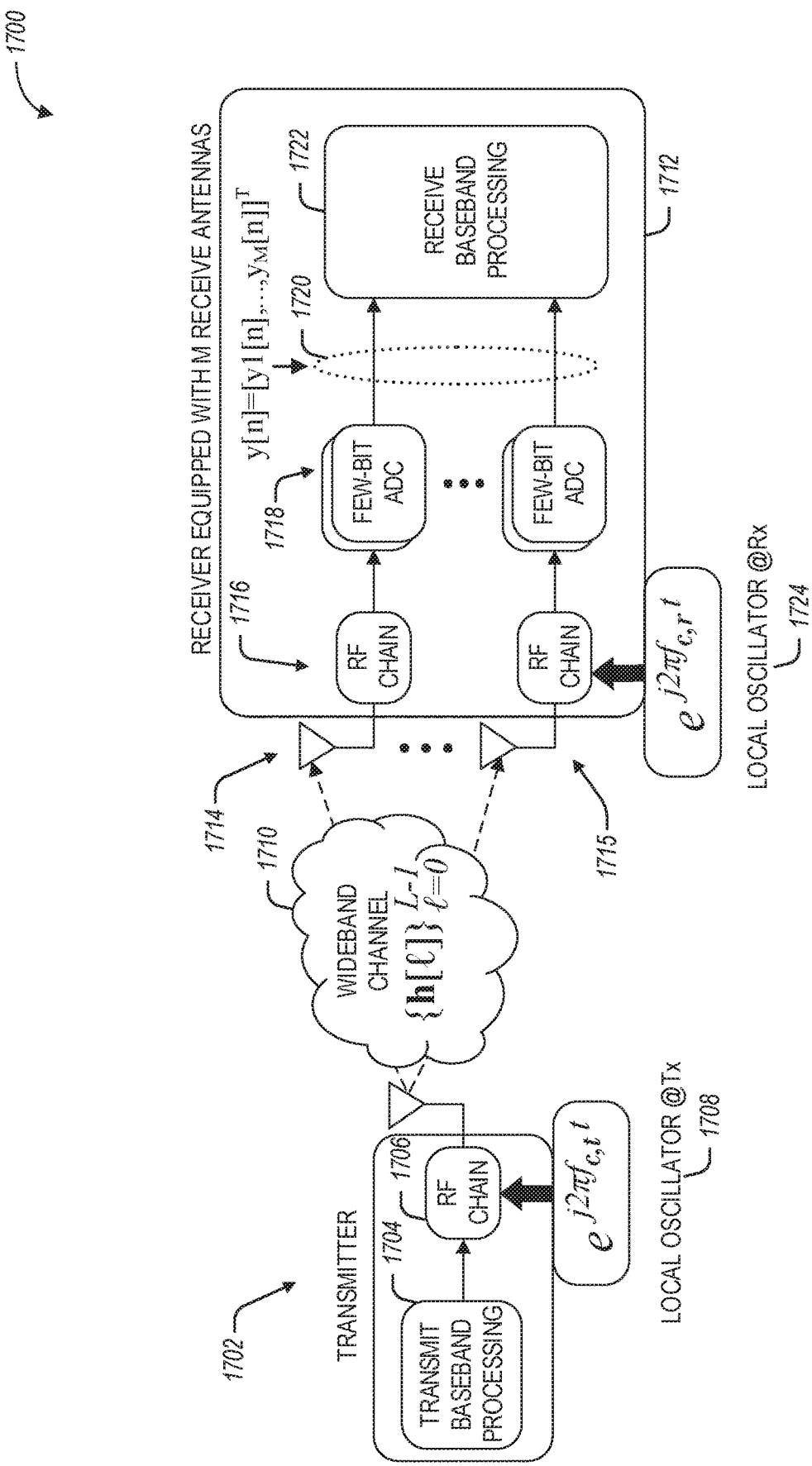
FIG. 17 illustrates a single input multiple outputs (SIMO) wideband communication system with low precision ADCs, in accordance with some aspects.

FIG. 17 illustrates a single input multiple outputs (SIMO) wideband communication system 1700 with low precision ADCs, in accordance with some aspects. Referring to FIG. 17, the SIMO wideband communication system 1700 includes a transmitter 1702 and a receiver 1712. The transmitter 1702 includes transmit baseband circuitry 1704 and RF front-end circuitry 1706 coupled to one or more transmit antennas for transmitting a wideband channel 1710. The RF front-end circuitry 1706 is configured to use a local oscillator 1708.

The receiver 1712 includes multiple processing chains 1715 where each chain is coupled to a receive antenna of a plurality of antennas 1714, an RF front-end circuitry (or RF chain) of a plurality of RF chains 1716, and a few bit ADC of a plurality of few bit ADCs 1718. The plurality of RF chains may use a local oscillator 1724. The wideband channel 1710 is received by the receive antenna 1714 and is processed by the RF chains and the few bit ADCs to generate quantized signal y(n) 1720 communicated for additional processing to the baseband circuitry 1722.

In some aspects, the wideband (frequency-selective) channel in the SIMO wideband communication system 1700 with low-precision ADCs is modeled by a L-tap channel-impulse-response (CIR) vector. The 1-th CIR tap between the transmitter and the m-th receive antenna is denoted by $h_m[l]$. Let $f_{c,t}$ and $f_{c,r}$ be the carrier frequency of the local oscillator at the transmitter and the receiver, respectively. Then the carrier-frequency-offset (CFO) of the system is given by $\Delta f_c = f_{c,r} - f_{c,t}$, which is due to the mismatch of the carrier frequencies of the two local oscillators—1708 at the transmitter and 1724 at the receiver. When the symbol duration is $T_s$, the normalized CFO is given by $\in = 2\pi \Delta f_c T_s$.

In some aspects, pilot signals with length $N_p$ are used to estimate both the CFO and the CIR vectors. A pilot signal transmitted at the n-th time slot of the pilot frame is denoted by p[n]. At the ADCs 1718, the real and imaginary parts of the received signal are quantized by two few-bit scalar quantizers, respectively. Therefore, the quantized signal of the m-th receive antenna after the ADCs is given by $$y_m[n] = Q\left(\sum_{\ell=1}^{L} h_m[\ell]x[n-\ell+1] + z_m[n]\right),$$

where $Q(\cdot)$ is the ADC function, and $z_m[n]$ is a noise of the m-th receive antenna at time slot n.

Figure 18:
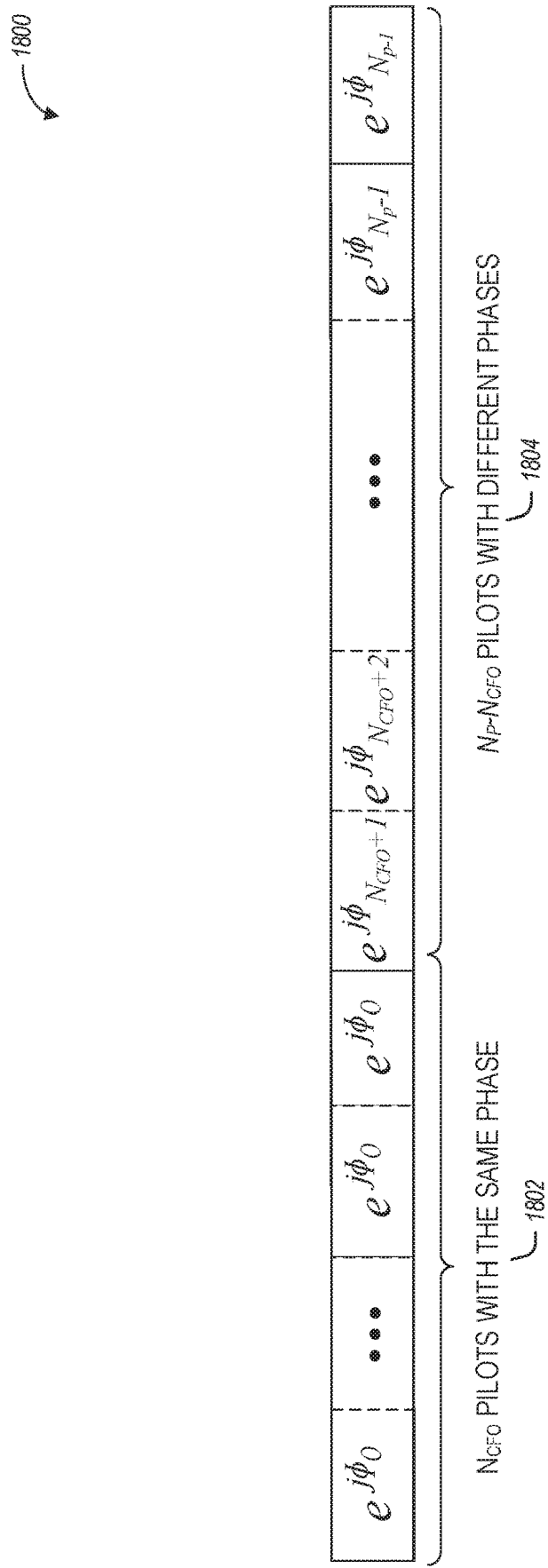
FIG. 18 illustrates the signal structure of an example pilot signal that can be used for joint carrier frequency offset and channel estimation, in accordance with some aspects.

FIG. 18 illustrates signal structure of an example pilot signal 1800 that can be used for joint carrier frequency offset and channel estimation, in accordance with some aspects. Referring to FIG. 18, pilot signal 1800 includes a first portion 1802 including pilots with the same phase and a second portion 1804 including pilots with different phases. For example, $N_{CFO}$ pilot signals 1802 are signals with the same phase, while the second part contains $N_p - N_{CFO}$ pilot signals 1804 with random phases.

Joint CFO-and-Channel Estimation

In some aspects, an estimation technique may be based on estimating the CFO using the first part of the pilot frame and then estimating the channel based on the CFO estimate using both parts of the pilot frame. The flow chart of the proposed method is illustrated in FIG. 19.

Figure 19:
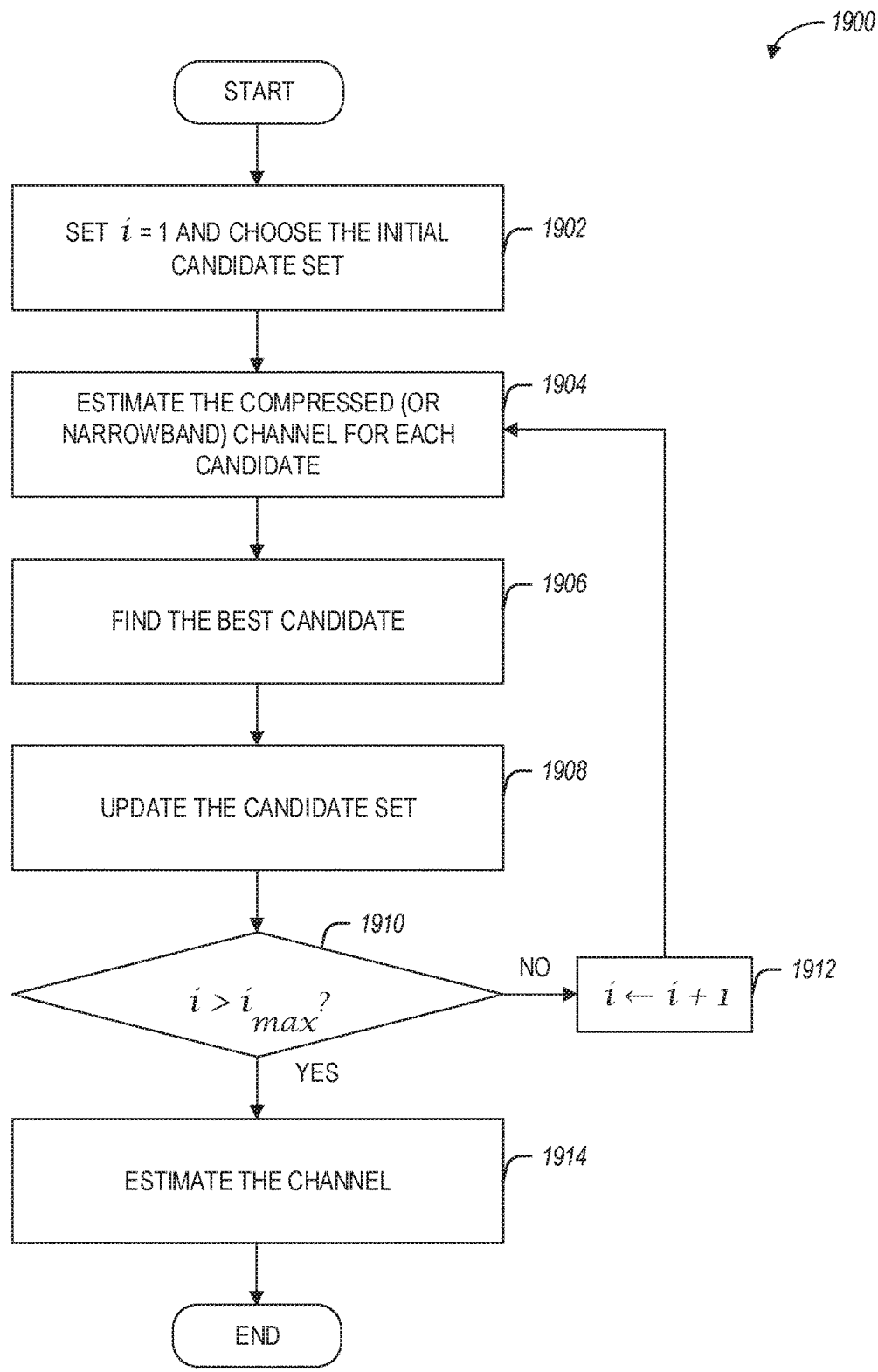
FIG. 19 is a flowchart of an example method for joint carrier frequency offset and channel estimation, in accordance with some aspects.

FIG. 19 is a flowchart of an example method 1900 for joint carrier frequency offset and channel estimation, in accordance with some aspects. Referring to FIG. 19, method 1900 includes operations 1902, 1904, 1906, 1908, 1910, 1912, and 1914, which can be performed by one or more processors within the receiver 1712.

At operation 1902, the initial CFO candidate set is determined, while a repetition count is initialized as i=1. Let K be the size of the candidate set which is a design parameter. Then the initial CFO candidate set is given by $S^{(1)} = \{\epsilon_k | \epsilon_{low} = \epsilon_1 < \epsilon_2 < \ldots < \epsilon_K = \epsilon_{upp}\}$, where $\epsilon_{upp}$ and $\epsilon_{low}$ are the upper and lower bounds of the normalized CFO, respectively. In some aspects, upper and lower bounds can be $2\pi$ and 0, but more specific bounds can be obtained according to a hardware specification.

At operation 1904, a compressed channel for each CFO candidate may be computed, which is given by $\tilde{h}_m = \sum_{l=1}^{L} h_m[l]$ for the m-th receive antenna. Let $\tilde{y}_m = [y_m[L], y_m[L+1], \ldots, y_m[N_{CFO}]]^T$. Then one possible estimate for the m-th compressed channel is $$\hat{h}_m(\epsilon_k) = \frac{1}{N_{CFO} - L + 1} s^H(\epsilon_k)\tilde{y}_m,$$

for each candidate $\epsilon_k \in S^{(1)}$, where $$s(\epsilon) = [e^{j(L-1)\epsilon}, e^{jL\epsilon}, \ldots, e^{j(N_{CFO}-1)\epsilon}]^T.$$

The above estimate is a least-squares (LS) estimate. A different estimate can also be used according to the system design.

At operation 1906, an optimal (or best) candidate CFO is determined among the elements in the CFO candidate set as follows:

$$\hat{\epsilon}^{(i)} = \arg\max_{\epsilon_k \in S(1)} f(\epsilon_k),$$

where $f(\epsilon)$ is an evaluation function. One possible evaluation function is the joint likelihood function:

$$f(\epsilon) = \prod_{m=1}^{M} \log Pr(\tilde{y}_m | \epsilon, \hat{h}_m(\epsilon)),$$

where $Pr(\tilde{y}_m | \epsilon, \tilde{h}_m)$ is the probability of observing $\tilde{y}_m$ for a given $\epsilon$ and $\tilde{h}_m$ when $\tilde{y}_m = Q(s(\epsilon)\tilde{h}_m + \tilde{z}_m)$, with $\tilde{z}_m = [z_m[L], z_m[L+1], \ldots, z_m[N_{CFO}]]^T$ being a noise vector. In some aspects, the probability depends on the distribution of the noise signal.

At operation 1908, the CFO candidate set may be updated using the best candidate determined from the previous step. The updated set can be obtained as follows:

$$S^{(i+1)} = \{\epsilon_k | \hat{\epsilon}^{(i)} - \Delta^{(i)} = \epsilon_1 < \epsilon_2 < \ldots < \epsilon_K = \hat{\epsilon}^{(i)} + \Delta^{(i)}\},$$

where $\Delta^{(i)}$ is the searching size at iteration i. The search size can be designed to be reduced as the iteration count (i) increases. The presented candidate update step is also illustrated in FIG. 20.

Figure 20:
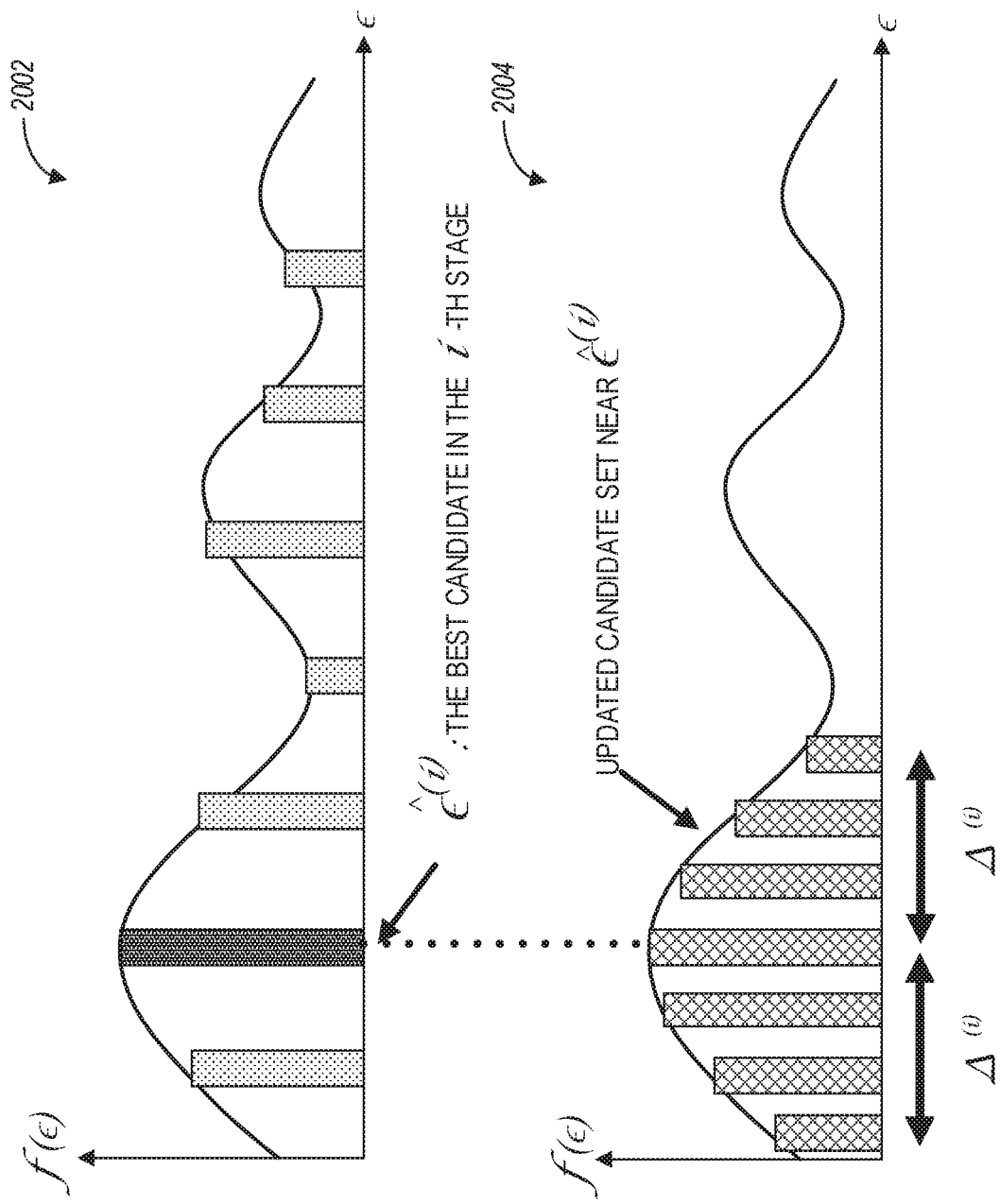
FIG. 20 illustrates a graphical representation of a carrier frequency offset candidate set update, in accordance with some aspects.

FIG. 20 illustrates a graphical representation of a carrier frequency offset candidate set update, in accordance with some aspects. Referring to FIG. 20, graphical representation 2002 indicates the determined optimal/best CFO candidate in the i-th stage. Graphical representation 2004 represents the updating of the CFO candidate set based on the determined optimal CFO candidate. More specifically, an updated candidate set is determined using CFO candidates that are in proximity to the previously determined optimal CFO candidate.

At operations 1910, the current iteration count (i) is compared with the maximum number of iterations ($i_{max}$) which is a design parameter. If the maximum number of iterations is not reached, the current iteration count is incremented by one in operation 1912.

At operation 1914, the channel is estimated based on the CFO estimate obtained determined from operations 1902-1910. The quantized signal vector of the m-th receive antenna is represented as $y_m = Q(D(\hat{\epsilon})Ph_m + z_m)$, where $y_m = [y_m[1], y_m[2], \ldots, y_m[N_p + L - 1]]^T$, $D(\epsilon)$ is the diagonal matrix defined as $D(\epsilon) = \text{diag}([1, e^{j\epsilon}, \ldots, e^{j(N_p + L - 2)\epsilon}])$, $\hat{\epsilon}$ is the final CFO estimate, P is a Toeplitz matrix formed by both types of pilot signals (e.g., 1802 and 1804), $h_m = [h_m[1], h_m[2], \ldots, h_m[L]]^T$, $z_m = [z_m[1], z_m[2], \ldots, z_m[N_p + L - 1]]^T$. One possible estimate for the m-th channel vector is $\hat{h}_m = (D(\epsilon)P)^\dagger y_m$, which is an LS estimate. In some aspects, one or more conventional channel estimation techniques can also be applied to estimate the channel.

In an example simulation setup, the following configurations may be used. A SIMO wideband communication system with low-precision ADCs is considered. The frequency-selective channel is modeled by L CIR taps that follow an exponentially-decaying power-delay profile with a decaying exponent of 0.5. The CFO may be assumed to be a random variable that follows a uniform distribution between $6.28 \times 10^{-4}$ and $6.28 \times 10^{-3}$, which corresponds to the case that the carrier frequency and the bandwidth of the system are 20 GHz and 1 GHz, respectively, and $\Delta f_c \sim \text{Uniform}[10 \text{ ppm}, 100 \text{ ppm}]$. 4-QAM is adopted for symbol modulation, and LS channel estimation is adopted with a pilot length of $N_p = 200$. A maximum-output-entropy quantizer is adopted as a quantization function of ADCs. A quantized Viterbi algorithm is adopted as a data detection method. For channel coding, a turbo code is adopted with the following configuration: Code rate: ⅔; Code length: 512;

Encoding: Parallel concatenated codes with feedforward and feedback polynomial (15,13) in octal notation; Decoding: 6 iterations; The design parameters of the proposed method are chosen as follows: $N_{CFO}$=180, K=100, $i_{max}$=2.

Figure 21:
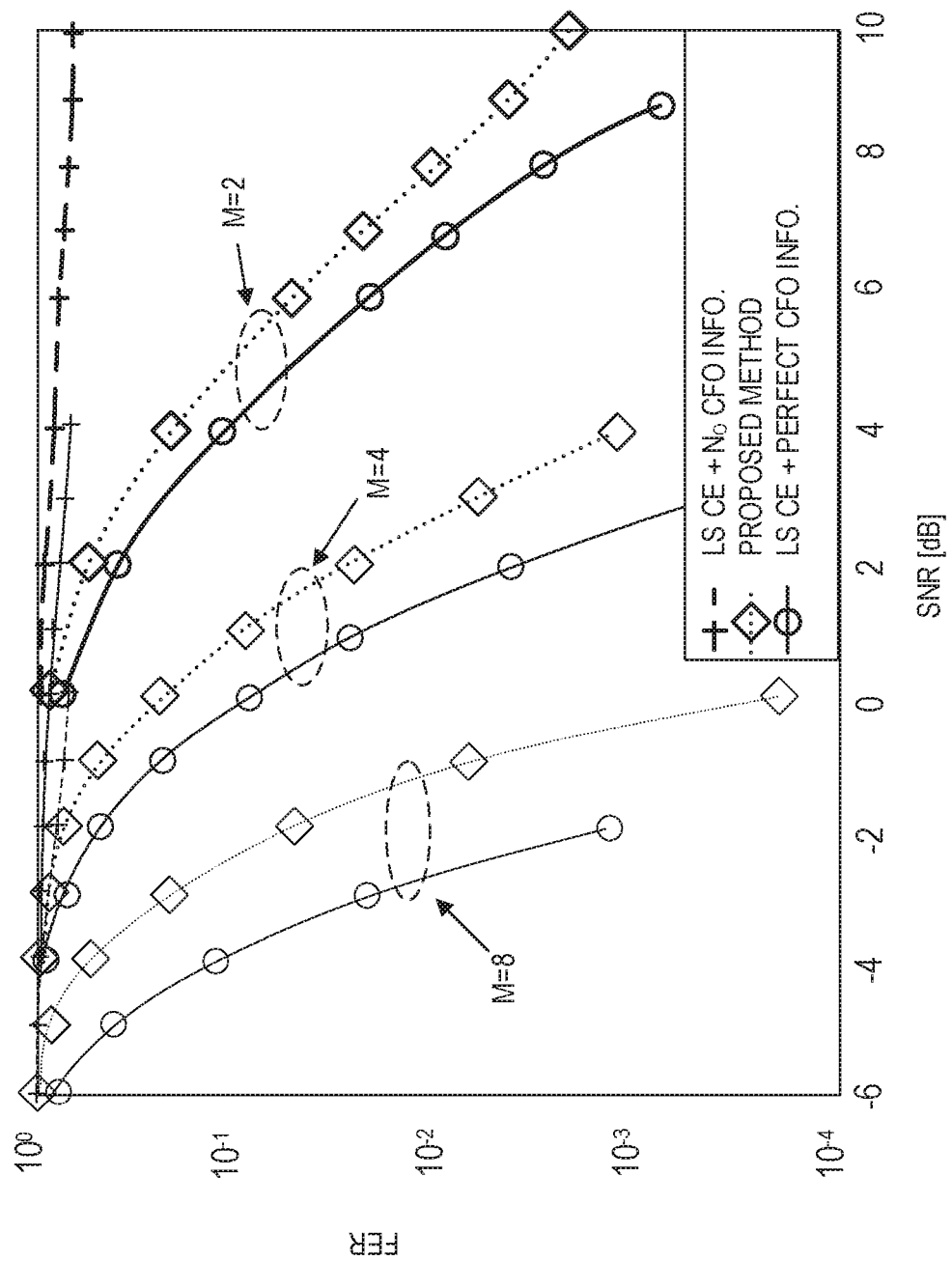
FIG. 21 and FIG. 22 illustrates graphical representations of frame error rates associated with carrier frequency offset channel estimation techniques, in accordance with some aspects.
Figure 22:
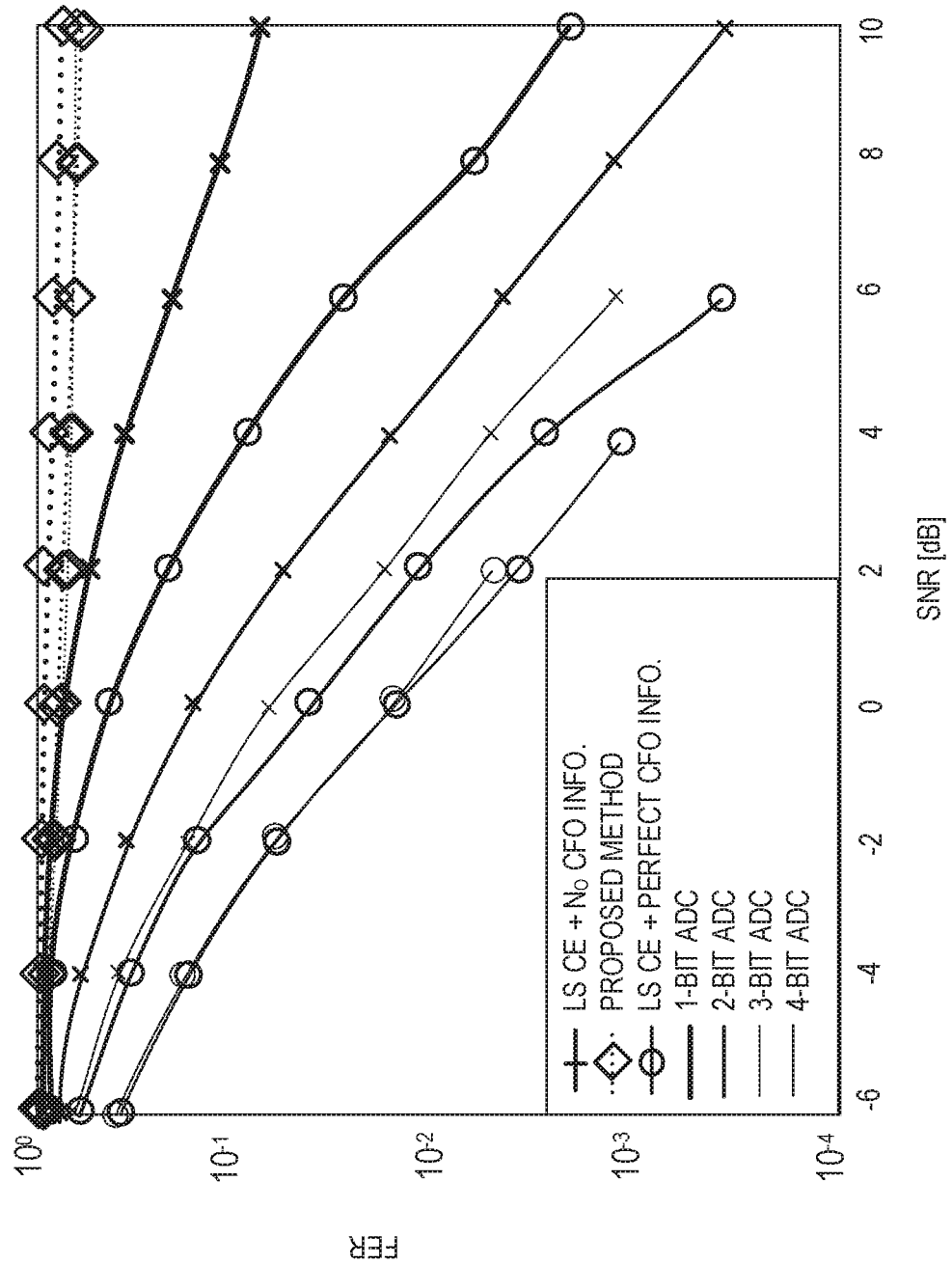

FIG. 21 and FIG. 22 illustrates graphical representations 2100 and 2200 of frame error rates associated with carrier frequency offset channel estimation techniques and using the above simulation setup, in accordance with some aspects.

FIG. 21 compares the frame-error-rates (FERs) of three different cases: 1) both CFO and channel information are obtained by the proposed method; 2) LS channel estimation with perfect CFO information; and 3) LS channel estimation with no CFO information, when 3-bit ADCs are employed at the receiver (B=3). FIG. 21 shows that the proposed method achieves a less than 2-dB SNR gap to perfect CFO information case, regardless of the number of receive antennas, M. When no CFO information is available, the FER performance is severely degraded for all values of M.

FIG. 22 compares the frame-error-rates (FERs) of three different cases: 1) both CFO and channel information are obtained by the proposed method; 2) LS channel estimation with perfect CFO information; and 3) LS channel estimation with no CFO information, when the number of receive antennas is 4 (M=4). FIG. 22 shows that the SNR gap between the proposed method and the perfect CFO information case reduces as the number of ADC-precision bits increases. When employing 4-bit ADCs (B=4), the proposed technique shows a less than 1-dB SNR gap to the perfect CFO information case. When no CFO information is available, the FER performance is severely degraded for all values of B.

In some aspects, a method for a wireless communication system operating with low-precision ADCs is disclosed. In some aspects, a transmission frame contains a part that consists of the repetition of a constant signal that is known at a receiver. In some aspects, a receiver uses a portion of the output signals of the ADCs associating with the repetition of the constant signal. In some aspects, a transmitter for a wireless communication system operates with low-precision ADCs and includes a (pilot) signal generator that generates a repetition of a constant signal. A receiver for a wireless communication system operating with low-precision ADCs includes a carrier synchronization processor (or a frequency-offset estimator) that generates multiple values and outputs one of them according to the evaluation using the output signals of the ADCs.

In some aspects, wireless chip-to-chip communication systems over sub-terahertz bands are disclosed. The available bandwidth at these frequencies is very large which enables ultra-wideband communications. However, power consumption at high-resolution ADCs with a high sampling rate makes the system prohibitive in terms of energy efficiency. Therefore, techniques discussed herein consider receiver architectures with 1-bit ADC for power efficiency. One of the challenges for 1-bit ADCs is the estimation and correction of DC offset to avoid receiver saturation and received signal power estimation. In some aspects, a method for DC offset and power estimation with threshold adjustable 1-bit ADCs is used.

Existing solutions consider higher resolution ADCs. However, the following drawbacks are associated with the existing solutions. For example, a threshold adjustable 1-bit ADCs for in-band interference mitigation may be considered but such does not estimate DC offset and power directly. Instead, the threshold is adjusted to fit the received signal in the linear region of LNA to avoid interference blocking. Additionally, high-resolution ADCs have high power consumption.

In some aspects, the discussed techniques are based on the following two parts: (a) received signal power estimation, and (b) DC offset estimation and correction. In some aspects, received signal power may be estimated by counting a number of positive samples over a total number of samples with different thresholds and using a look-up table (e.g., inverse Q-function) to obtain a threshold. Then using estimated received signal power (variance of signal), DC offset (mean) of the received signal may be estimated. The signal may then be corrected by adjusting the threshold of the 1-bit ADC. In this regard, proposed techniques enable DC offset estimation, DC offset correction and received signal power estimation with 1-bit ADCs. The techniques can be used for removing one of the roadblocks of 1-bit communication systems and enable the application of the techniques in wireless chip-to-chip communications.

Figure 23:
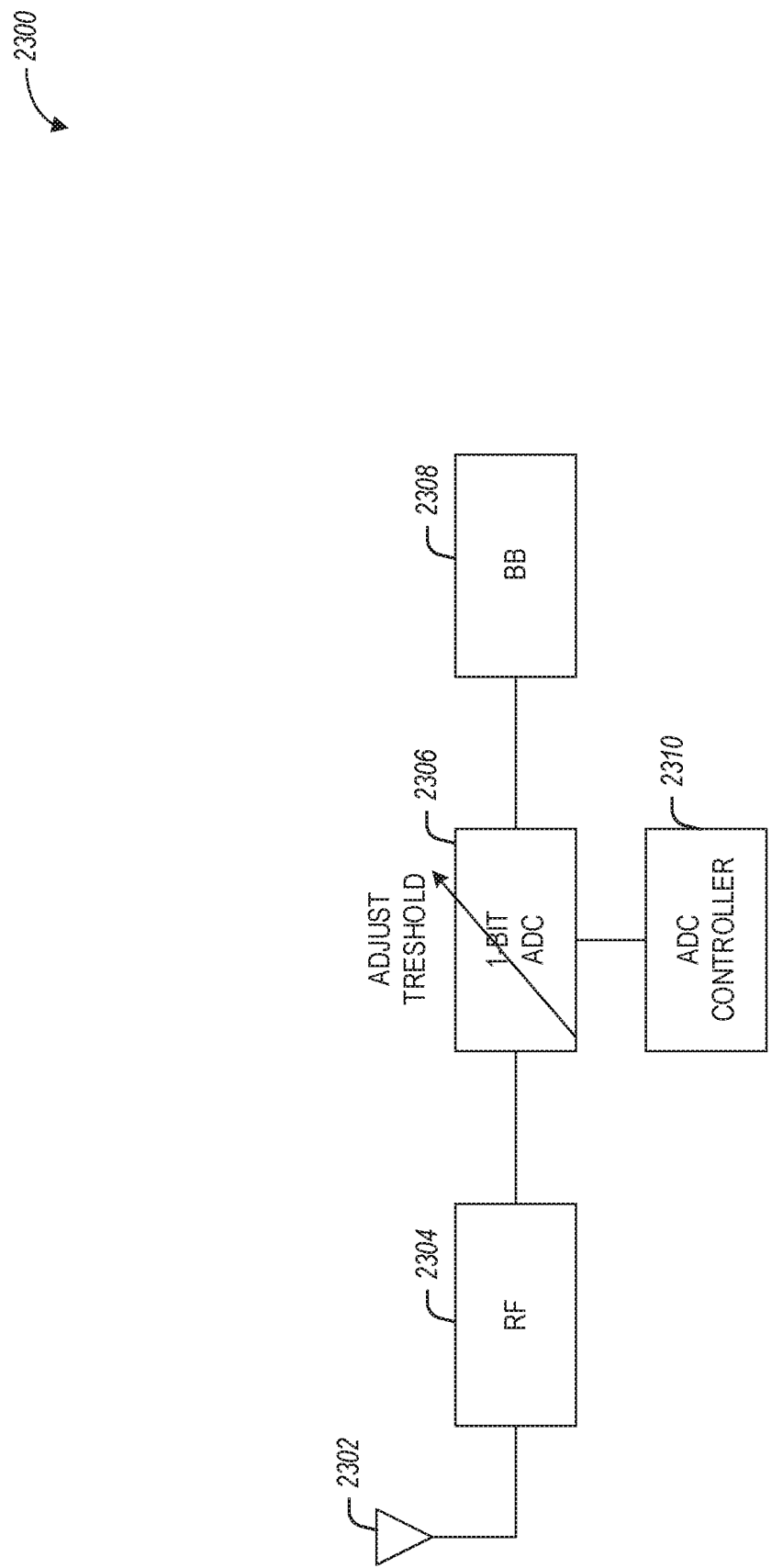
FIG. 23 illustrates a 1-bit ADC receiver architecture, in accordance with some aspects.

In some aspects, techniques for received power estimation, DC offset estimation, and correction for 1-bit receivers are disclosed. A receiver architecture with 1-bit quantization as shown in FIG. 23 may be used. However, the techniques discussed herein are not limited in this regard and can be extended to multiple antenna systems.

FIG. 23 illustrates a 1-bit ADC receiver architecture 2300, in accordance with some aspects. Referring to FIG. 23, the receiver architecture 2300 includes an antenna 2302, RF circuitry 2304 which can include an RF front-end module, a quantizer such as 1-bit ADC 2306, and baseband circuitry 2308. The one bit ADC 2306, or any of the other circuitry within the receiver architecture 2300 can include a controller configured to perform the techniques discussed herein, such as ADC controller 2310.

A transmitted signal is denoted by $x(t) \sim \mathcal{N}(0, P_{av})$. Then the received signal over an adaptive white Gaussian noise (AWGN) channel at antenna 2302 can be written as $r(t)=x(t)+n(t)+d_{dc}$, where n(t) is the Gaussian noise with distribution $\mathcal{N}(0, \sigma^2)$, and $d_{dc}$ is DC offset at the input of 1-bit ADC.

The received signal power may be estimated using the following functionalities. In some aspects, two arbitrary threshold values are considered, namely, $\mu_1$ and $\mu_2$. When we set the 1-bit ADC 2306 threshold to $\mu_1$, the probability of a positive signal can be determined as follows:

$$P(\text{sign}_{\mu_1}(r(t)) > 0) = \frac{\#\left[\text{sign}_{\mu_1}(r(t)) > 0\right]}{N},$$

where N is the number of samples and $\text{sign}_{\mu_1}(.)$ Is 1-bit ADC with threshold $\mu_1$. Since noise is Gaussian, the following equation follows:

$$\mu_1 - d_{dc} = \sqrt{P_{av} + \sigma^2}\, Q^{-1}\left(\frac{\#\left[\text{sign}_{\mu_1}(r(t)) > 0\right]}{N}\right),$$

where $Q^{-1}(.)$ is an inverse Q-function of a standard normal distribution. Similarly, when the 1-bit ADC threshold is set to $\mu_2$, the following equation results:

$$\mu_2 - d_{dc} = \sqrt{P_{av} + \sigma^2}\, Q^{-1}\left(\frac{\#\left[\text{sign}_{\mu_2}(r(t)) > 0\right]}{N}\right).$$

Combining these two equations, the following equation results for the received signal power (which is composed of signal power and noise power):

$$\sqrt{P_{av}+\sigma^2} = \frac{\mu_1 - \mu_2}{Q^{-1}\left(\frac{\#\ [\text{sign}_{\mu_1}(r(t))>0]}{N}\right) - Q^{-1}\left(\frac{\#\ [\text{sign}_{\mu_2}(r(t))>0]}{N}\right)}.$$

In this regard, received a signal estimation $\sqrt{P_{av}+\sigma^2}$ depends on the difference of thresholds $\mu_1-\mu_2$. The complexity of the power estimation can be defined as counting the number of positive samples and then referencing a look-up table (LUT) for the inverse Q-function.

In some aspects, the DC offset estimation can be performed using the following techniques. After estimating the received signal power, the DC-offset $d_{dc}$, may be estimated by setting the threshold of the 1-bit ADC to zero, $\mu=0$, i.e., $\text{sign}_0(.)$. The following equation may result:

$$d_{dc} = -\sqrt{P_{av}+\sigma^2}\, Q^{-1}\left(\frac{\#\ [\text{sign}_0(r(t))>0]}{N}\right).$$

After estimating the DC offset, the threshold may be set as $\mu=d_{dc}$ for data detection. In some aspects, if the DC offset is severe as compared to received signal amplitude, an iterative estimate of received signal power and DC offset can be useful for fast convergence.

Figure 24:
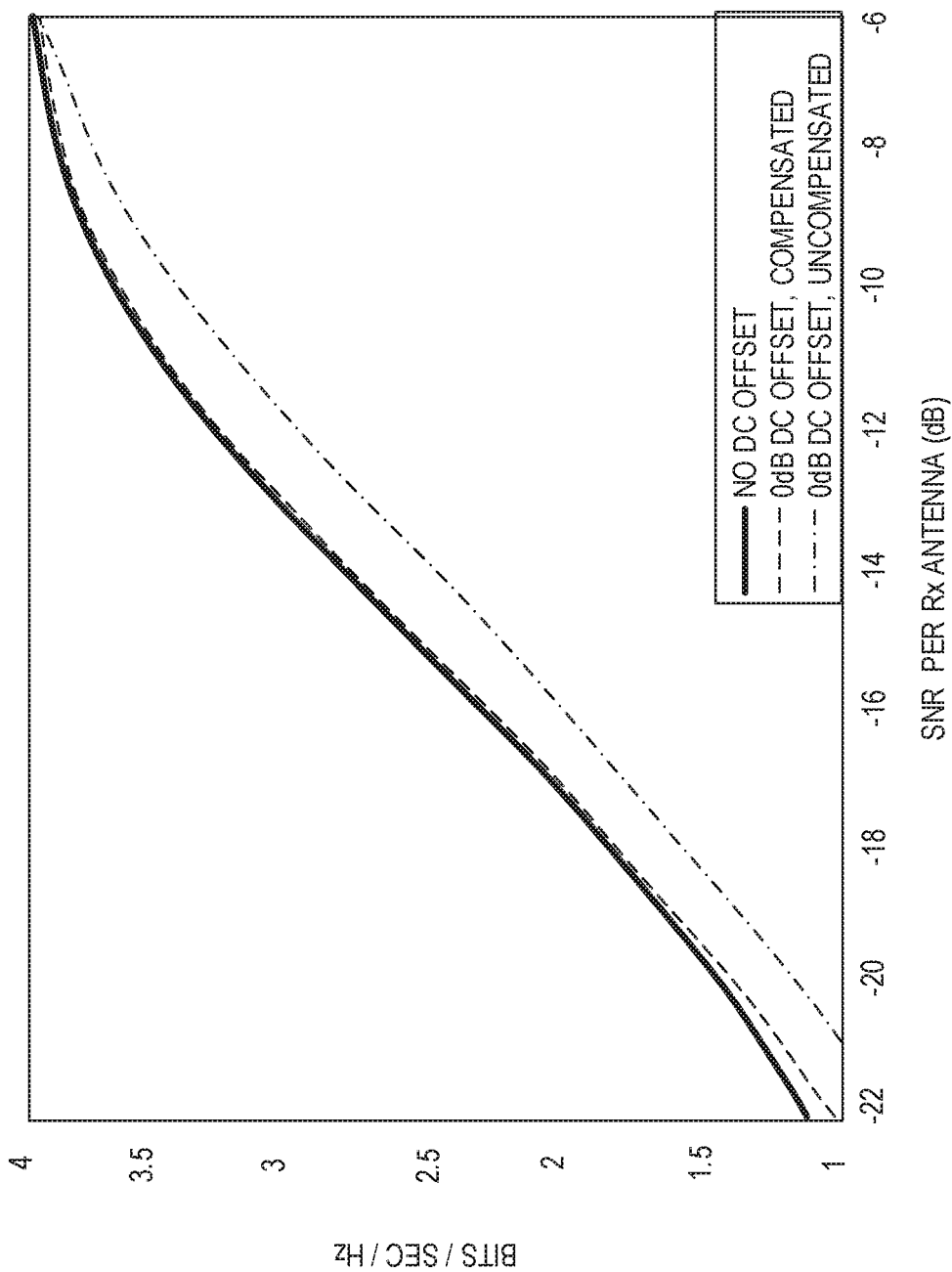
FIG. 24 illustrates a graphical representation of simulation results four DC offset estimation, in accordance with some aspects.

FIG. 24 illustrates a graphical representation 2400 of simulation results four DC offset estimation, in accordance with some aspects. More specifically, FIG. 24 considers a single carrier system with −10 dB dc-offset as compared to signal power $P_{av}$. At the receiver, received signal power may be estimated initially, followed by estimation of the DC offset. As shown in FIG. 24, DC offset may be estimated and corrected successfully.

In some aspects, a receiver with an adjustable threshold 1-bit ADC architecture is disclosed, where the received signal power is estimated by adjusting thresholds to two levels. In some aspects, the probability of positive signals is estimated by counting positive samples. In some aspects, a look-up table is used to convert probability to DC signal estimate. In some aspects, DC offset is estimated by using received signal power. In some aspects, the DC offset is corrected by adjusting a threshold.

Techniques discussed herein consider wireless chip-to-chip communications with very low power consumption and high energy efficiency. Such energy efficiency may utilize the transceiver components (e.g., power amplifiers and low noise amplifiers) in a high-performance configuration. To improve the efficiency of the components, relaxation of the linearity requirements may be considered. For example, the transmitter may be operated at a smaller back-off from saturated power.

In relation to digital pre-distortion at the power amplifier, a non-linear function may be applied at the transmitter to mitigate non-linearity at power amplifier (PA) such that after the signal passes the PA, a linear signal is obtained. In relation to non-linearity mitigation with high oversampling in the digital domain, non-linear interference at the receivers is mitigated to improve EVM.

Existing solutions associated with digital pre-distortion at the power amplifier require high dynamic range DAC to apply pre-distortion. However, wireless chip-to-chip indications cannot afford high dynamic range DACs for digital predistortion. In addition, transmitter digital pre-distortion (DPD) may require a feedback loop in the transmitter which is costly, whereas with a mixed-signal co-design of the NL function and receiver equalizer, only 1 feedback loop is required just at the receiver. Transmitter DPD may use a wider bandwidth signal path in the entire transmitter TX which may be difficult to achieve. Existing techniques associated with non-linearity mitigation with high oversampling in the digital domain require oversampling and high dynamic range at the ADC. It may be expensive to increase the sampling rate and the ADC resolution for ultra-wideband terahertz bands.

Techniques disclosed herein use a joint equalizer and non-linearity mitigation architecture. More specifically, a non-linear block is integrated between a feed-forward equalizer (FFE) and a decision feedback equalizer (DFE) with mixed-signal processing. Adaptation with close-loop training and/or blind training may also be enabled within the architecture. In this regard, the disclosed architecture is associated with the following advantages: it does not require any processing (high-resolution DAC) at the transmitter; it performs signal processing at the Nyquist sampling rate; it performs signal processing in analog domain without any need for high-resolution ADC; it is adaptive so it adapts time-varying non-linearities, and it works in the ISI channel.

Figure 25:
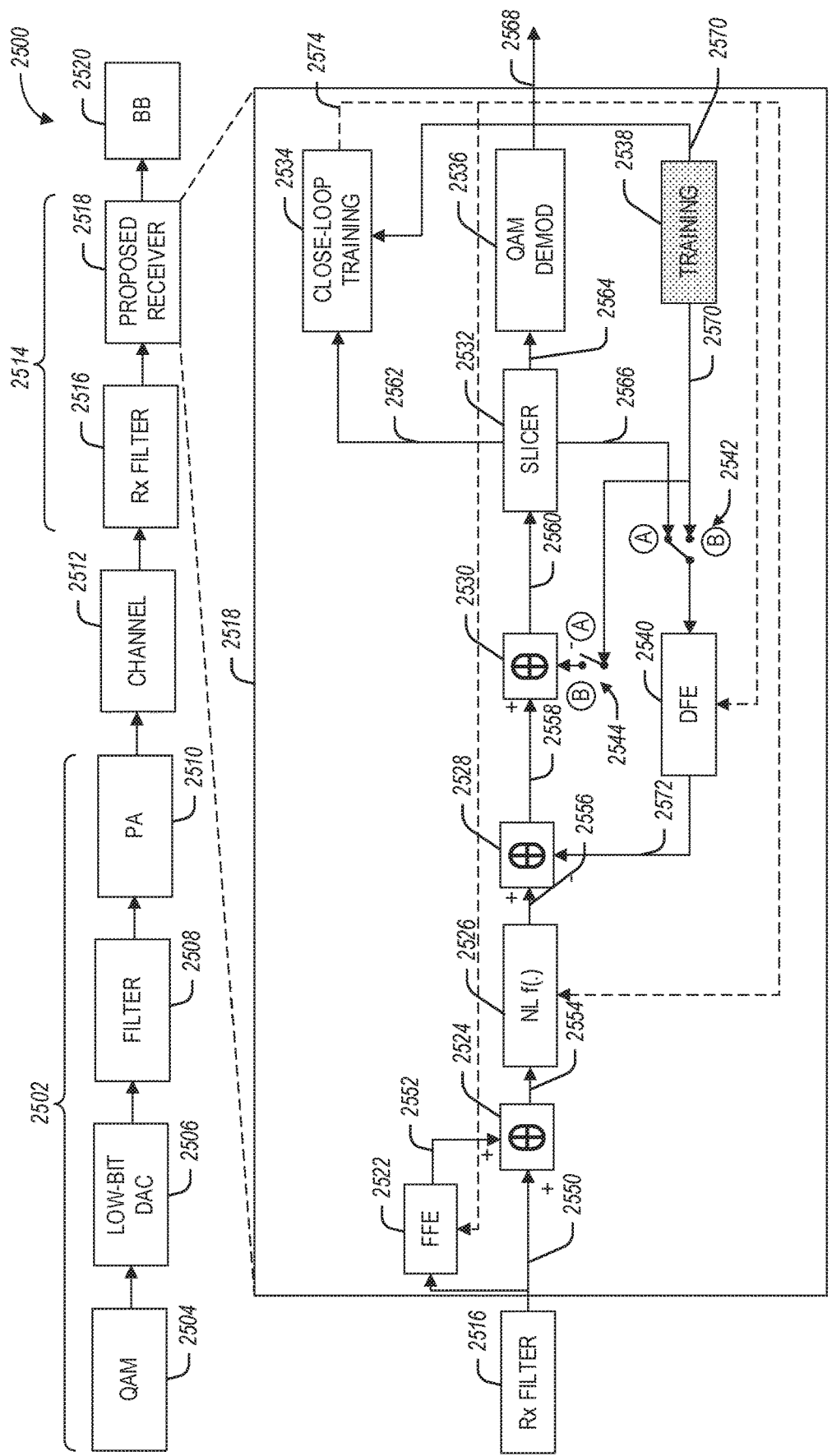
FIG. 25 is a block diagram of a receiver architecture using joint equalization and non-linearity mitigation with close-loop training, in accordance with some aspects.
Figure 26:
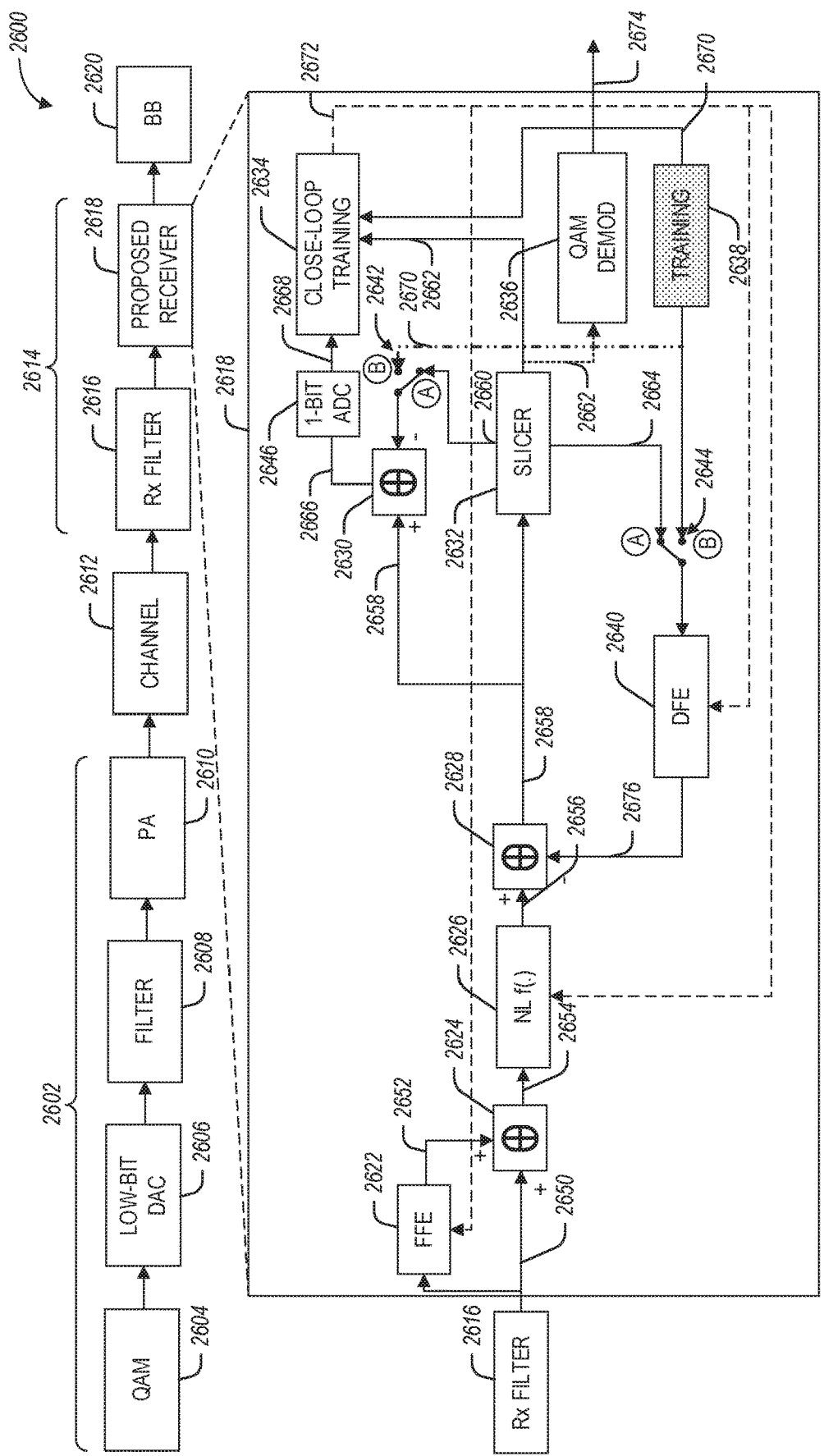
FIG. 26 is a block diagram of a receiver architecture using joint equalization and non-linearity mitigation with close-loop training and blind calibration, in accordance with some aspects.

In some aspects, a joint equalizer and non-linearity mitigation for chip-to-chip communications is used, as discussed in connection with FIG. 25, FIG. 26, and FIG. 27. Linearity constraints at the transceiver are relaxed to increase the power efficiency of the communication system. While relaxing the constraints, power consumption is maintained to mitigate the non-linearity for better EVM. Therefore, in some aspects, a mixed-signal and Nyquist rate non-linear block at the receiver may be used, as shown in FIG. 25 and FIG. 26. In wireless chip-to-chip (WC2C) communications, out of band emission may be assumed as minimal and, therefore, Tx-oversampled DPD may be replaced with Rx Nyquist non-linear (NL) function. In the communication architectures illustrated in FIG. 25 and FIG. 26, digital closed-loop training by quantizing error may be used. In the communication architecture illustrated in FIG. 27, mixed-signal close-loop training may be used.

FIG. 25 is a block diagram of a receiver architecture 2500 using joint equalization and non-linearity mitigation with close-loop training, in accordance with some aspects. Referring to FIG. 25, the receiver architecture includes RF front-end circuitry 2514 and baseband circuitry 2520. The RF front-end circuitry 2514 can receive signals via the channel 2512 from transmitter 2502. The transmitter 2502 can include a quadrature amplitude modulation (QAM) circuitry 2504, low bit digital-to-analog converter (DAC) circuitry 2506, filtering circuitry 2508, and power amplifier (PA) circuitry 2510.

The RF front-end circuitry 2514 includes filtering circuitry 2516 and an RF receiver 2518. The RF receiver 2518 includes a feed-forward equalizer (FFE) circuitry 2522, a non-linear (NL) compensation circuitry 2526, a decision feedback equalizer (DFE) circuitry 2540, slicer circuitry 2532, QAM demodulation circuitry 2536, close loop training circuitry 2534, training signal generator circuitry 2538, adders 2524, 2528, 2530, and switches 2544 and 2542.

The FFE circuitry 2522 is configured to receive a filtered RF signal 2550 and generate an equalized RF signal 2552. The FFE circuitry 2522 is configured to combine current and prior signal samples to cancel precursor multipath channels and to equalize the received signal.

The NL compensation circuitry 2526 is configured to apply a non-linear feature set to the equalized input signal 2554 and generate a compensated signal 2556. In some aspects, the non-linear feature set is configured by an includes a plurality of weights.

The slicer circuitry 2532 is configured to quantize the input signal into different levels of in-phase (I) and quadrature (Q) decisions and generate signal constellation points as outputs (e.g., 2562, 2564, and 2566).

The QAM demodulation circuitry 2536 is configured to generate a demodulated binary signal 2568 based on the signal constellation points 2564.

In operation, a data communication phase can be enabled by positioning switches 2542 and 2544 to position A. The signal constellation points 2566 from slicer 2532 are communicated via switch 2542 to DFE circuitry 2540 which generates a filtered representation 2572 of the signal constellation points 2566. Adder 2528 generates an error (or difference) signal 2558 using the compensated signal 2556 and the filtered representation 2572. The signal constellation points are generated based on the error (or difference) signal 2558 which passes through adder 2530 and is communicated as an input to slicer circuitry 2532.

In operation, a training phase can be enabled by positioning switches 2542 and 2544 to position B. The training signal generator 2538 generates training signals 2570 which are communicated to the close loop training circuit 2534, the switch 2544, and the switch 2542. In this regard, error signal 2560 at the output of adder 2530 is generated based on the training signal 2570 and a filtered representation of the training signal 2572. The signal constellation points 2562 generated by the slicer circuitry 2532 (based on the error/difference signal 2560 generated based on the training signal 2570) are communicated to the closed-loop training circuitry 2534, which compares it to the training signal 2570 to generate adjustment weights 2574. The adjustment weights 2574 are communicated to the FFE circuitry 2522, the NL compensation circuitry 2526, and the DFE circuitry 2540 to adjust one or more weights associated with signal processing by the circuits.

FIG. 26 is a block diagram of a receiver architecture 2600 using joint equalization and non-linearity mitigation with close-loop training and blind calibration, in accordance with some aspects. Referring to FIG. 26, the receiver architecture includes RF front-end circuitry 2614 and baseband circuitry 2620. The RF front-end circuitry 2614 can receive signals via the channel 2612 from transmitter 2602. The transmitter 2602 can include a quadrature amplitude modulation (QAM) circuitry 2604, low bit digital-to-analog converter (DAC) circuitry 2606, filtering circuitry 2608, and power amplifier (PA) circuitry 2610.

The RF front-end circuitry 2614 includes filtering circuitry 2616 and an RF receiver 2618. The RF receiver 2618 includes a feed-forward equalizer (FFE) circuitry 2622, a non-linear (NL) compensation circuitry 2626, a decision feedback equalizer (DFE) circuitry 2640, slicer circuitry 2632, QAM demodulation circuitry 2636, close loop training circuitry 2634, training signal generator circuitry 2638, 1-bit ADC circuitry 2646, adders 2624, 2628, 2630, and switches 2644 and 2642.

The FFE circuitry 2622 is configured to receive a filtered RF signal 2650 and generate an equalized RF signal 2652. The FFE circuitry 2622 is configured to combine current and prior signal samples to cancel precursor multipath channels and to equalize the received signal.

The NL compensation circuitry 2626 is configured to apply a non-linear feature set to the equalized input signal 2654 and generate a compensated signal 2656. In some aspects, the non-linear feature set is configured by an includes a plurality of weights.

The slicer circuitry 2632 is configured to quantize the input signal into different levels of in-phase (I) and quadrature (Q) decisions and generate signal constellation points as outputs (e.g., 2660, 2662, and 2664).

The QAM demodulation circuitry 2636 is configured to generate a demodulated binary signal 2674 based on the signal constellation points 2662.

In operation, a data communication phase can be enabled by positioning switches 2642 and 2644 to position A. The signal constellation points 2664 from slicer 2632 are communicated via switch 2644 to DFE circuitry 2640 which generates a filtered representation 2676 of the signal constellation points 2664. Adder 2628 generates an error (or difference) signal 2658 using the compensated signal 2656 and the filtered representation 2676. The signal constellation points are generated based on the error (or difference) signal 2658 which is communicated as an input to slicer circuitry 2632.

During the data processing phase, signal 2658 output from adder 2628 is also communicated to adder 2630 which generates differential signal 2666 by subtracting the signal constellation points 2660 from slicer 2632. Differential signal 2666 is communicated as input to the one bit ADC 2646 to generate a quantized signal 2668 as input to the closed-loop training circuitry 2634 which also receives the signal constellation points 2662. In this regard, adjustment weights 2672 may be generated while the architecture is operating in a data communication phase, using the signal constellation points output from slicer 2632 and the quantized output 2668 from the one bit ADC 2646.

In operation, a training phase can be enabled by positioning switches 2642 and 2644 to position B. The training signal generator 2638 generates training signals 2670 which are communicated to the close loop training circuit 2634, the switch 2642, and the switch 2644. In this regard, error (or difference) signal 2658 at the output of adder 2628 is generated based on the training signal 2670 and a filtered representation of the training signal 2672 as well as the output of the NL compensation circuitry 2626. Signal 2658 is communicated to adder 2630 which also receives and subtracts training signal 2670 to generate differential signal 2666. The differential signal 2666 is quantized by the one bit ADC 2646 generates a quantized output 2668 communicated as input to the close loop training 2634. The closed-loop training circuitry 2634 generates the adjustment weights 2672 based on the quantized output 2668 and the training signal 2670. The adjustment weights 2672 are communicated to the FFE circuitry 2622, the NL compensation circuitry 2626, and the DFE circuitry 2640 to adjust one or more weights associated with signal processing by the circuits.

Figure 27:
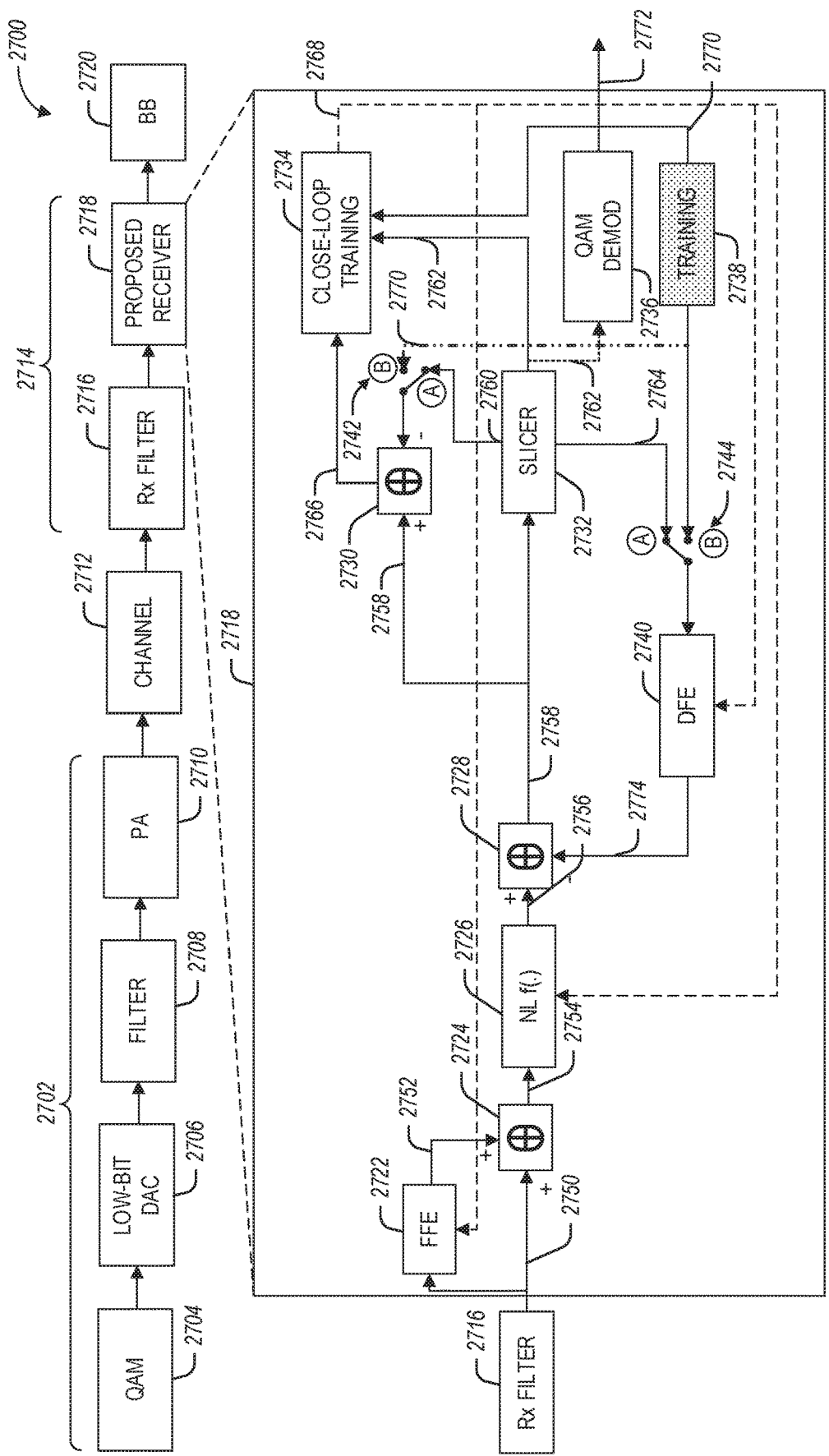
FIG. 27 is a block diagram of a receiver architecture using joint equalization and non-linearity mitigation with mixed-signal close-loop training and blind calibration, in accordance with some aspects.

FIG. 27 is a block diagram of a receiver architecture 2700 using joint equalization and non-linearity mitigation with mixed-signal close-loop training and blind calibration, in accordance with some aspects. Referring to FIG. 27, the receiver architecture includes RF front-end circuitry 2714 and baseband circuitry 2720. The RF front-end circuitry 2714 can receive signals via the channel 2712 from transmitter 2702. The transmitter 2702 can include a quadrature amplitude modulation (QAM) circuitry 2704, low bit digital-to-analog converter (DAC) circuitry 2706, filtering circuitry 2708, and power amplifier (PA) circuitry 2710.

The RF front-end circuitry 2714 includes filtering circuitry 2716 and an RF receiver 2718. The RF receiver 2718 includes a feed-forward equalizer (FFE) circuitry 2722, a non-linear (NL) compensation circuitry 2726, a decision feedback equalizer (DFE) circuitry 2740, slicer circuitry 2732, QAM demodulation circuitry 2736, close loop training circuitry 2734, training signal generator circuitry 2738, adders 2724, 2728, 2730, and switches 2744 and 2742.

The FEE circuitry 2722 is configured to receive a filtered RF signal 2750 and generate an equalized RF signal 2752. The FEE circuitry 2722 is configured to combine current and prior signal samples to cancel precursor multipath channels and to equalize the received signal.

The NL compensation circuitry 2726 is configured to apply a non-linear feature set to the equalized input signal 2754 and generate a compensated signal 2756. In some aspects, the non-linear feature set is configured by an includes a plurality of weights.

The slicer circuitry 2732 is configured to quantize the input signal into different levels of in-phase (I) and quadrature (Q) decisions and generate signal constellation points as outputs (e.g., 2760, 2762, and 2764).

The QAM demodulation circuitry 2736 is configured to generate a demodulated binary signal 2772 based on the signal constellation points 2762.

In operation, a data communication phase can be enabled by positioning switches 2742 and 2744 to position A. The signal constellation points 2764 from slicer 2732 are communicated via switch 2744 to DFE circuitry 2740 which generates a filtered representation 2774 of the signal constellation points 2764. Adder 2728 generates an error (or difference) signal 2758 using the compensated signal 2756 and the filtered representation 2774. The signal constellation points are generated based on the error (or difference) signal 2758 which is communicated as an input to slicer circuitry 2732.

During the data processing phase, signal 2758 output from adder 2728 is also communicated to adder 2730 which generates differential signal 2766 by subtracting the signal constellation points 2760 from slicer 2732. Differential signal 2766 is communicated as input to the closed-loop training circuitry 2734, which also receives the signal constellation points 2762. In this regard, adjustment weights 2768 may be generated while the architecture is operating in a data communication phase, using the signal constellation points output from slicer 2732 and the differential output 2766 from the adder 2730.

In operation, a training phase can be enabled by positioning switches 2742 and 2744 to position B. The training signal generator 2738 generates training signals 2770 which are communicated to the close loop training circuit 2734, the switch 2742, and the switch 2744. In this regard, error (or difference) signal 2758 at the output of adder 2728 is generated based on the training signal 2770 and a filtered representation of the training signal 2774 as well as the output of the NL compensation circuitry 2726. Signal 2758 is communicated to adder 2730 which also receives and subtracts training signal 2770 to generate differential signal 2766. The differential signal 2766 is communicated as input to the close loop training 2734. The closed-loop training circuitry 2734 generates the adjustment weights 2768 based on the differential signal 2766 and the training signal 2770. The adjustment weights 2768 are communicated to the FFE circuitry 2722, the NL compensation circuitry 2726, and the DFE circuitry 2740 to adjust one or more weights associated with signal processing by the circuits.

In some aspects, an AWGN channel (e.g., 2512, 2612, 2712) without inter symbol interference. The transmitted signal is denoted by x(t). The received signal may be denoted by r(t)=g(x(t)+n(t)), which may be heavily distorted by non-linearity g(.) at the transmitter and the receiver. n(t) denotes Gaussian noise. The NL function may be denoted as $f(x)$ as follows:

$f(x)=w_0\phi_0(x)+w_1\phi_1(x)+w_2\phi_2(x)+ \ldots +w_{N-1}\phi_{N-1}(x)$, where $\phi_i(.)$, i=0, ..., N-1, is a non-linear feature set of inputs, which are linearly combined with weights $w_i$, i=0, ..., N-1. For example, $\phi_i(.)=x|x|^i$ for PA nonlinearity mitigation.

In some aspects, $f(x)$ can be a neural network, for which neural network weights may be trained with backpropagation, and supervised learning using training symbols and backpropagation of error. Unlike previous (conventional) non-linear functions, for neural networks, only the number of layers, nodes per layer, and activation functions may be specified instead of hand-crafted feature sets. Therefore, using a neural network may bring the advantage of compensating more complex non-linearity and adapt various non-linearities.

Training

In some aspects, a feature set is designed by a priori knowledge on a characteristic of the transceiver. However, there may be limited (or no) knowledge about the weights $w_i$. Therefore, optimal weights may be determined by training (e.g., close-loop training as discussed in connection with FIGS. 25-27). For example, LMS training with known pilot sequence may be used as follows:

$e(t)=f(r(t))-x_{training}(t)$; and $w_i \leftarrow w_i + \eta e^*(t)\phi_i(r(t))$, i=0, ..., N-1. The weights may be continuously updated while training until convergence.

Blind Calibration

After training, the transceiver non-linearity may change over time. Therefore, calibration can be important to maintain low BER. In some aspects, blind calibration using data symbols may be used to avoid any overhead due to training. In some aspects, close-loop training may be used. For example, LMS training may be used. LMS training with data symbols is considered as follows:

$f_q(r(t))=\text{slicer}[f(r(t))]$;

$e(t)=f(r(t))-f_q(r(t))$; and $w_i \leftarrow w_i + \eta e^*(t)\phi_1(r(t)), i=0, \ldots, N-1$.

Figure 28:
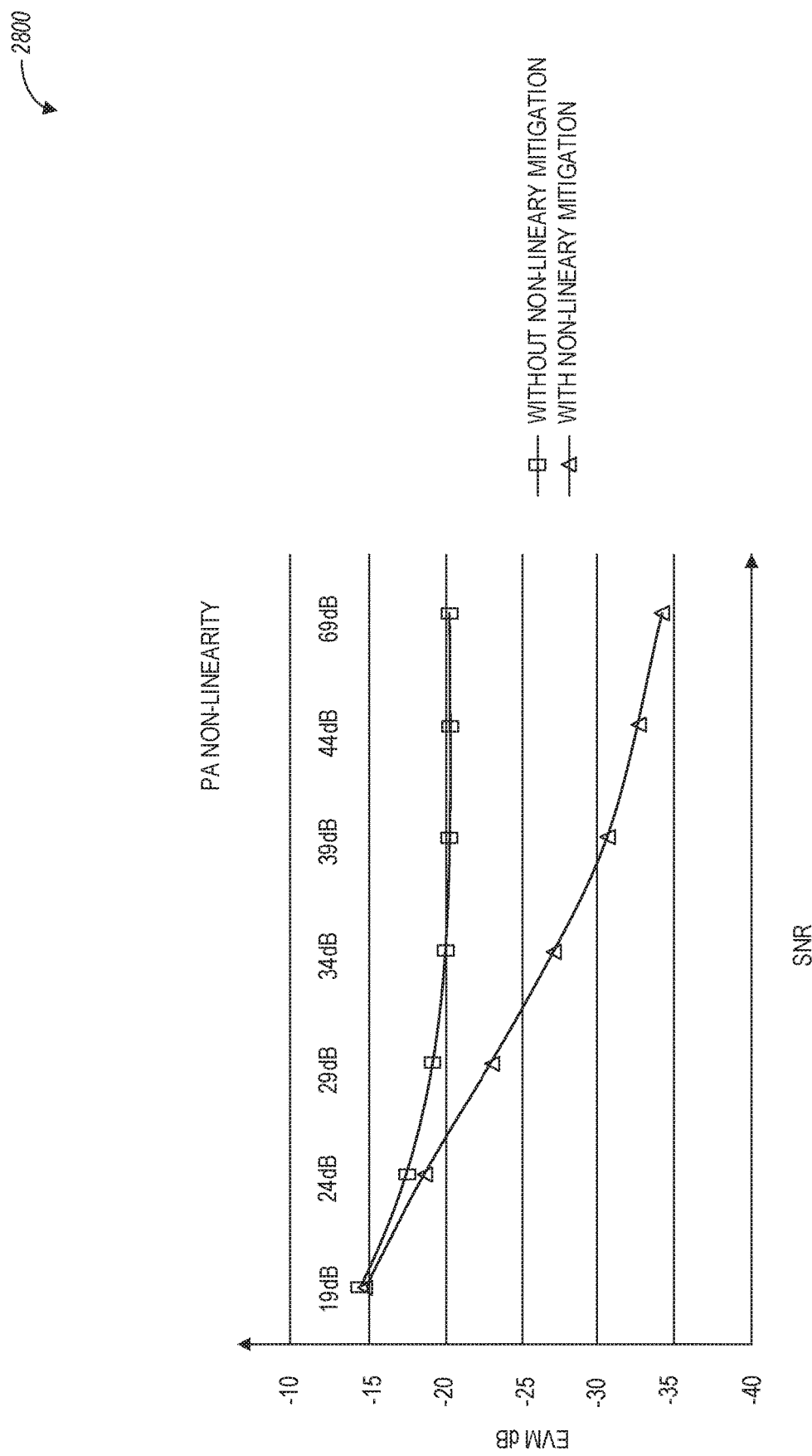
FIG. 28 illustrates a graphical representation of error vector magnitude (EVM) in connection with non-linear mitigation, in accordance with some aspects.

FIG. 28 illustrates a graphical representation 2800 of error vector magnitude (EVM) in connection with non-linear mitigation, in accordance with some aspects. In some aspects, PA non-linearity operating close to saturation point with 16QAM modulation may be considered in connection with the results in FIG. 28. FIG. 28 may also be associated with the use of a 2-bit slicer and a non-linear function with the following features (initially, the receiver may not know the weights: $f(x)=w_0x|x|^0+w_1x|x|^1+w_1x|x|^2+w_1x|x|^3$.

The simulation results in FIG. 28 are associated with an AWGN channel. As shown in FIG. 28, when there is no non-linear mitigation received, signal EVM may be saturated at −20 dB. However, with non-linear function with LMS training, 14 dB EVM improvement may be achieved over the case without nonlinearity mitigation. In the example simulation associated with FIG. 28, Tx signal back-off may be set at 5 dB-back-off from PA saturation. The simulation results in FIG. 28 further illustrate that if ISI channel with FFE and DFE equalizer is considered, 9 dB gain may still be achieved over the case without nonlinearity mitigation.

In some aspects, joint equalizer and non-linearity mitigation at the receiver include non-linearity mitigation with Nyquist rate processing. In some aspects, joint equalizer and non-linearity mitigation at the receiver include mixed-signal processing. In some aspects, joint equalizer and non-linearity mitigation at the receiver include closed-loop training. In some aspects, joint equalizer and non-linearity mitigation at the receiver include closed-loop training in the analog domain. In some aspects, joint equalizer and non-linearity mitigation at the receiver include closed-loop training in the digital domain. In some aspects, joint equalizer and non-linearity mitigation at the receiver include weight adaptation with training sequence. In some aspects, joint equalizer and non-linearity mitigation at the receiver include weight adaptation with blind adaptation. In some aspects, joint equalizer and non-linearity mitigation at the receiver include a neural network that can be used to compensate non-linearity.

In some aspects, single carrier (SC) waveform, in general, and block-wise single carrier (BWSC) waveform, in particular, have an advantage over multicarrier waveforms (e.g. OFDM) in terms of a peak-to-average power ratio (PAPR). Low PAPR of BWSC is an important factor for some autonomous applications, such as drone and vehicular communications on mmWave bands. Technological limitations of RF hardware on mmWave bands dictate a lower dynamic range of analog transmit signals (low PAPR) to limit the operating range of the signal within the linear operating region of RF chains.

BWSC waveform, however, spreads the power of single data symbol (e.g. QAM symbols) over the entire system bandwidth including DC frequency of baseband signals. In some aspects, it may be desired to not carry information over the DC frequency of a signal due to RF circuit limitations. Techniques discussed herein provide three methods (method A, method B, and method C) to apply lossless (or low loss) baseband processing algorithms to null out DC power of BWSC or any other forms of SC waveform.

In conventional solutions (e.g., in OFDM waveforms), a DC tone is simply muted (with zero power). In BWSC, however, filtering out the DC power (e.g., by using high-pass filtering) degrades performance and increases EVM of the BWSC waveform.

Additionally, the DC frequency of a baseband signal can be filtered out by using a digital or analog filter. Such processing, however, (a) degrades performance; (b) may increase PAPR after filtering; (c) complexity overhead of filter might be high, and (d) effective length of the cyclic prefix (CP) reduces due to delay spread of the filter. With the proposed baseband algorithms, PAPR and performance are under-controlled and are not impacted significantly, and CP length is not reduced.

In some aspects, in a BWSC waveform, a time data/pilot domain symbol occupies the whole system bandwidth including the DC frequency (of baseband signal or carrier frequency of RF signal), which is not desirable for RF circuits. The disclosed techniques (e.g., Methods A, B, and C) are developed to null out DC with baseband processing of a block of BWSC waveform. The process is lossless (or with minor loss) for data considering some data-dependent or predefined redundancy in the time-domain of the BWSC waveform.

The discussed techniques address baseband processing methods to null out power around DC for single carrier (SC) waveforms in general and block-wise SC (BWSC) in particular.

A BWSC symbol is similar to an OFDM symbol in terms of structure. A BWSC symbol contains a cyclic prefix and then the main data part. In BWSC, QAM (data) symbols are pulse-shaped as in SC waveforms. There are three techniques (methods) discussed herein to address the above-mentioned issues with DC nulling.

Method A

Predefined (fixed) samples are inserted within data samples of a BWSC symbol in the time domain. The time-domain fixed samples are assumed as redundant samples to facilitate DC nulling in frequency. The BWSC block is transferred to the frequency domain using DFT or FFT. In some aspects, a DC tone or multiple tones around DC are nulled out (set to zero). As a result, the original data and the fixed samples are corrupted in the time domain. In some aspects, a processing method may be used to reconstruct original data at the receiver, assuming the receiver knows the fixed/redundant samples and their time locations within a BWSC block. Furthermore, the receiver processing may be approximated for some implementation scenarios.

Method B

In some aspects, redundant samples are inserted within original data samples of a BWSC block, where the redundant samples are a function of the data samples. In some aspects, the time locations of the redundant samples are known to the receiver. The redundant samples force the BWSC spectrum to be zero around DC. In some aspects, the PAPR of redundant samples might be higher than the original BWSC waveform, and some processing techniques may be applied to reduce PAPR while the DC nulling is performed.

Method C

In some aspects, border points in QAM constellations are shifted dynamically to enforce the nulling around DC. The shifting values may depend on the original data samples within a BWSC block. In some aspects, the shifting values are not known to the receiver (the Method C processing may be transparent to the receiver). In some aspects, the receiver processes the signal based on the original (un-shifted) constellation points. In some aspects, a capacity approach (mismatch capacity) may be conducted to evaluate the impact of constellation shifting on the performance. The reasonable operating region and parameter settings may be recommended as the outcome of the evaluation. In some aspects, Method C may be combined with Method B to combat PAPR increases caused by method B.

Block-Wise Single Carrier (BWSC) is a type of single-carrier processing. A block of data symbols is processed in order to form a BWSC symbol with the attached data-based cyclic prefix (CP). The BWSC structure with data-CP enables frequency domain equalization capability at the receiver. In a BWSC modulator, a data symbol occupies the entire system bandwidth including the DC band. DC power may be undesirable for RF circuitry. Therefore, it is preferable not to transmit any power around the DC frequency. A notch filter can be used to filter out DC but it distorts the signal and reduces the effective CP length of a BWSC symbol. The discussed techniques include the following:

Time-Domain Predefined Redundancy Plus Frequency Domain Puncturing (Method A)

Time-domain samples of a BWSC block may be allocated to redundant and predefined symbols ($N_r$ symbols). In some aspects, the same number of tones around DC are punctured (and thus ignored at Rx) in the frequency domain. In some aspects, data symbols can be fully recovered even after puncturing with no or negligible loss.

Time-Domain Data-Depended Redundancy to Mute Around DC Frequency (Method B and/or Method C)

Time-domain samples of a BWSC block may be allocated to redundant and data-dependent symbols ($N_r$ symbols). In some aspects, the redundant symbols null out a set of tones ($N_r$ tones or less) around DC. In this regard, the process is lossless or with negligible loss.

Figure 29:
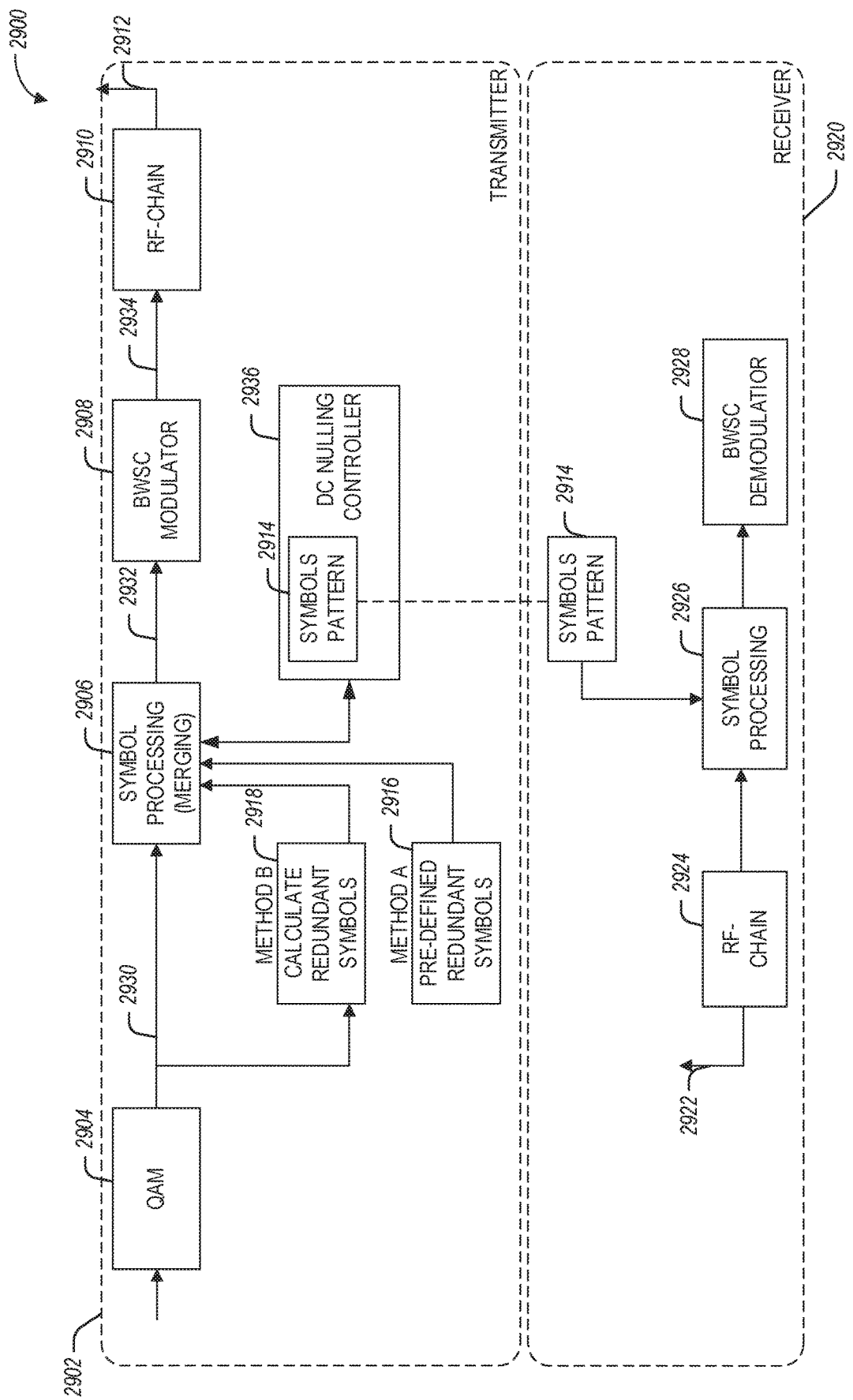
FIG. 29 is a block diagram of a transmitter architecture using techniques for DC nulling with shared symbol pattern, in accordance with some aspects.

FIG. 29 is a block diagram of a transmitter architecture using techniques for DC nulling with shared symbol pattern, in accordance with some aspects. Referring to FIG. 29, the architecture 2900 can include a transmitter 2902 and a receiver 2920 which are configured to implement the techniques discussed in connection with method A and method B. More specifically, transmitter 2902 includes QAM circuitry 2904, symbol processing (e.g., merging) circuitry 2906, BWSC modulator circuitry 2908, RF processing circuitry 2910, one or more antennas 2912, and a DC nulling controller 2936. The DC nulling controller 2936 can include processing circuitry configured to perform the discussed techniques in connection with DC nulling. As illustrated in FIG. 29, in accordance with method A, predefined redundant symbols 2916 are inserted by the symbol processing circuitry 2906 (in the time domain) with signal 2930 to generate signal 2932 that is communicated to the BWSC modulator 2908. The modulated signal 2934 is communicated to the RF processing circuitry 2910 for final processing and transmission via the antennas 2912.

The DC nulling controller 2936 may calculate redundant symbols 2918 based on signal 2930 and use the symbol processing circuitry 2906 to merge the calculated redundant symbols with signal 2930 in the time domain.

In some aspects, the symbol patterns 2914 (e.g., positions where the symbols were inserted) associated with the calculated redundant symbols 2918 or the predefined redundant symbols 2916, as well as the calculated or predefined symbols may be shared with the receiver 2920.

The receiver 2920 includes receiving antennas 2912, RF processing circuitry 2924, symbol processing circuitry 2926, and BWSC demodulator circuitry 2928. The symbol processing circuitry 2926 may use the symbol patterns 2914 for proper demodulation of the received signal.

Predefined Redundancy (Method A)

In connection with a multiple-bin scenario, multiple frequency bins can be nulled out by predefined redundancy techniques. The Tx process is as follows.

d is data vector of size $N_d$: Samples of d are located at time indexes $t \in \mathcal{t}_d$ where $0 \leq t < N$. r is a predefined redundancy vector of size $N_r$. Samples of r are located at time indexes $t \in \mathcal{t}_r$ such that $\mathcal{t}_r \cap \mathcal{t}_d = \emptyset$ and $\mathcal{t}_r \cup \mathcal{t}_d = [0, N)$.

Frequency puncturing pattern: $f \in \mathcal{f}_n$ is the set of (null) punctured frequency tones. $f \in \mathcal{f}_p$ is the set of remaining frequency tones with power such that $\mathcal{f}_n \cap \mathcal{f}_p = \emptyset$ and $\mathcal{f}_n \cup \mathcal{f}_p = [0, N)$. 'Permuted' DFT of time samples can be defined as follows:

$$\begin{bmatrix} y_p \\ y_n \end{bmatrix} = \begin{bmatrix} F_{pd} & F_{pr} \\ F_{nd} & F_{nr} \end{bmatrix} \begin{bmatrix} d \\ r \end{bmatrix}, \text{ where } F_{ab} = \left[\exp\left(-j\frac{2\pi ft}{N}\right)\right] / \sqrt{N}$$

where $f \in \mathcal{f}_a$ and $t \in \mathcal{t}_b$. The target is to puncture tones at $\mathcal{f}_n$ and hence replace $y_n$ with $0_{N_r \times 1}$ which is an all-zero vector of size $N_r$.

The data recovery at the receiver may be described as follows. Data recovery at Rx while only $y_p$ is available:

$$\begin{bmatrix} \check{d} \\ \check{r} \end{bmatrix} = perm_{t_d, t_r}\left(IFFT_N\left(y_p|_{\mathcal{t}_{f_p}}\right)\right) = \begin{bmatrix} F_{pd}^H & F_{nd}^H \\ F_{pr}^H & F_{nr}^H \end{bmatrix} \begin{bmatrix} y_p \\ 0_{N_r \times 1} \end{bmatrix},$$

where $y_n$ is replaced by 0. Additionally, $$\begin{cases} \check{d} = F_{pd}^H y_p = F_{pd}^H F_{pd} d + F_{pd}^H F_{pr} r & (1) \\ \check{r} = F_{pr}^H y_p = F_{pr}^H F_{pd} d + F_{pr}^H F_{pr} r & (2) \end{cases}$$

From (1):

$$d = \left(F_{pd}^H F_{pd}\right)^{-1} \check{d} - \left(F_{pd}^H F_{pd}\right)^{-1} \left(F_{pd}^H F_{pr}\right) r = \quad (3)$$

$$\underbrace{\left(F_{pd}^H F_{pd}\right)^{-1}}_{D, \text{ pre-calculated}} \check{d} + \underbrace{-\left(F_{pd}^{-1} F_{pr}\right)}_{R} r = D\check{d} + \underbrace{Rr}_{\text{pre-calulated}}$$

Matrix D is not unitary and may lead to noise boosting. On the other hand, matrix multiplexing after IFFT increases numerical complexity.

Inserting (3) in (2):

$$\check{r} = \left(F_{pr}^H F_{pd}\right)\left(F_{pd}^H F_{pd}\right)^{-1}\check{d} + \underbrace{\{\left(F_{pr}^H F_{pr}\right) - \left(F_{pr}^H F_{pd}\right)\left(F_{pd}^{-1} F_{pr}\right)\}}_{0} r =$$

$$\left(F_{pd}^{-1} F_{pr}\right)^H \check{d} = -R^H \check{d}.$$

Two parts of IFFT are linearly related.

In a single-bin scenario, only DC tone may be muted and with zero DC tone, the nulling bandwidth is $1/T$, where $T=NT_s$ is BWSC time duration and $T_s$ is symbol clock period:

$$\mathcal{f}_n = \{0\}, \mathcal{f}_p = \{1, 2, \ldots, N-1\}, \mathcal{t}_r = \{0\}, N_r = 1, r = [r],$$
$$\mathcal{t}_d = \{1, 2, \ldots, N-1\}, N_d = N-1;$$

$$D = I_{N_d} + 1_{N_d \times N_d}, R = 1_{N_d \times 1}, d = D\check{d} + Rr \Rightarrow d = \check{d} + \sum_{n=0}^{N_d-1} \check{d}_n + r;$$

and $$\check{r} = \check{r} = -R^H \check{d} = \sum_{n=0}^{N_d-1} \check{d}_n.$$

From the above equations: $\check{d} = \check{d} + (r - \check{r})$. Since $\check{r}$ and $\check{d}$ are noisy, this process increases the noise power of $\check{d}$ by 3 dB.

Approximation for the single-bin scenario. If a large number of independent data symbols are modulated in a BWSC block, then it can be approximately assume $$\bar{d} = ave(d) = \frac{1}{N_d} \sum_{n=0}^{N_d-1} d_n \cong 0$$

for large $N_d$, where the margin of error is $var(\bar{d}) = p/N_d$, where $p = E\{|d|^2\}$. Therefore, data recovery at Rx can be approximated as $\check{d} = \check{d} + (r - \check{r}) \cong \check{d} - ave(\check{d}) = \check{d} + \check{r}/N$. Impact of approximation may be quantified by signal-to-error-plus-noise $$\text{ratio} = SENR = \frac{p}{N_0 + \frac{N_0}{N^2} + \text{var}(\bar{d})} \cong \frac{p}{N_o + p/N_d} = \frac{1}{\frac{1}{SNR} + \frac{1}{N_d}}.$$

According to the figure below, the SNR loss is negligible for the practical range of operation.

Figure 30:
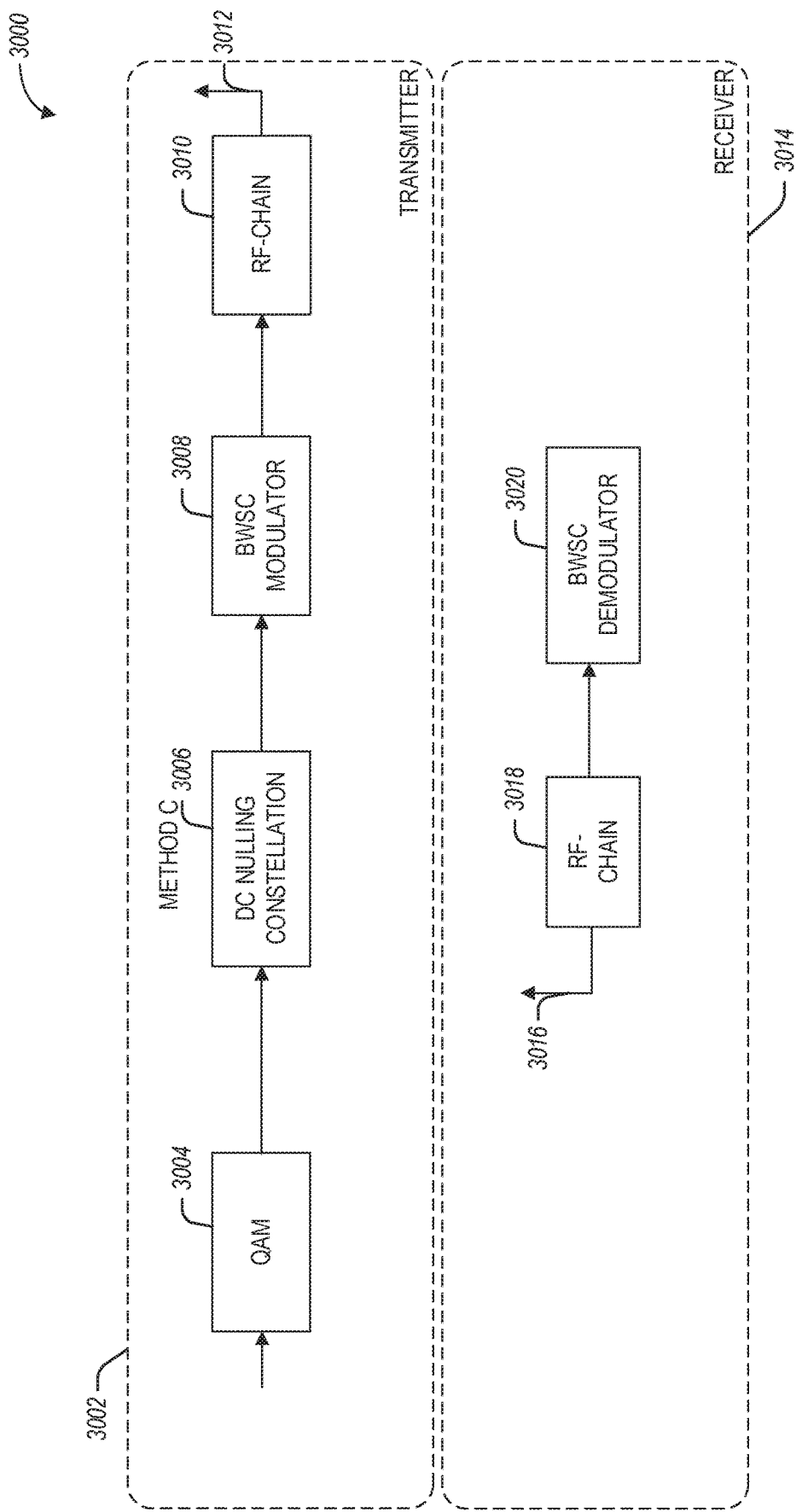
FIG. 30 is a block diagram of a transmitter architecture using techniques for DC nulling based on QAM constellation shifting, in accordance with some aspects.

FIG. 30 is a block diagram of a transmitter architecture 3000 using techniques for DC nulling based on QAM constellation shifting, in accordance with some aspects. Referring to FIG. 30, the architecture 3000 includes a transmitter 3002 and a receiver 3014. The transmitter 3002 includes a QAM circuitry 3004, DC nulling constellation circuitry 3006, BWSC modulator circuitry 3008, an RF chain circuitry 3010 coupled to antennas 3012. The receiver 3014 includes antennas 3016, RF chain circuitry 3018 and a BWSC demodulator 3020.

In some aspects, a DC nulling controller (e.g., 2936) may use the DC nulling constellation circuitry 3006 to perform DC nulling techniques in connection with method C (e.g., constellation shifting). As seen in FIG. 30, the functionality is performed by the DC nulling constellation circuitry 3006 and is transparent to the receiver 3014.

Data-Dependent Redundancy (Method B and/or C)

In some aspects, the single-bin scenario may be used to null out a single tone with data-dependent redundancy using one or more of the following steps: A BWSC block contains N samples. $d=[d_n]$ is a block of data of length $N_d=N-1$. A redundant sample is defined as $$r = -\sum_{n=0}^{N_d-1} d_n.$$

The transmit block of size N is formed as x=[d r] (elements of x can be permuted in time; in other words, the location of r within x is not important). DC value may be defined as $$\bar{x} = \sum_{n=0}^{N-1} x_n = r + \sum_{n=0}^{N_d-1} d_n = 0.$$

With zero DC tone, the nulling baseband bandwidth is 1/T, where $T=NT_s$ is BWSC time duration and $T_s$ is a symbol clock period.

In some aspects, the data-dependent samples are a combination of independent data symbols and hence their dynamic range might be high (which may result in high PAPR of BWSC). To address the issue of high PAPR, a solution may be to add extra overhead using the following techniques:

A high average power of $$r = -\sum_{n=0}^{N_d-1} d_n \big( E|d|^2 = p; E|r|^2 = N_d p \big)$$

assuming independent data symbols; large peak power of r→high PAPR). Extra redundant samples to reduce PAPR (samples of BWSC block: x=[d, r], where x can be permuted; d is data vector of size $N_d=N-N_r$; redundancy vector is $r=1_{N_r} r/N_r$; Zero DC, $$\bar{x} = \sum_{n=0}^{N-1} x_n = \sum_{n=0}^{N_r-1} r_n + \sum_{n=0}^{N_d-1} d_n = N_r\left(\frac{r}{N_r}\right) - r = 0; E\left|\frac{r}{N_r}\right|^2 = \frac{N_d}{N_r^2} p;$$

in general, $r=[r_n]$ can be any sequence subject to $$\sum_{n=0}^{N_r-1} r_n = r).$$

Figure 31:
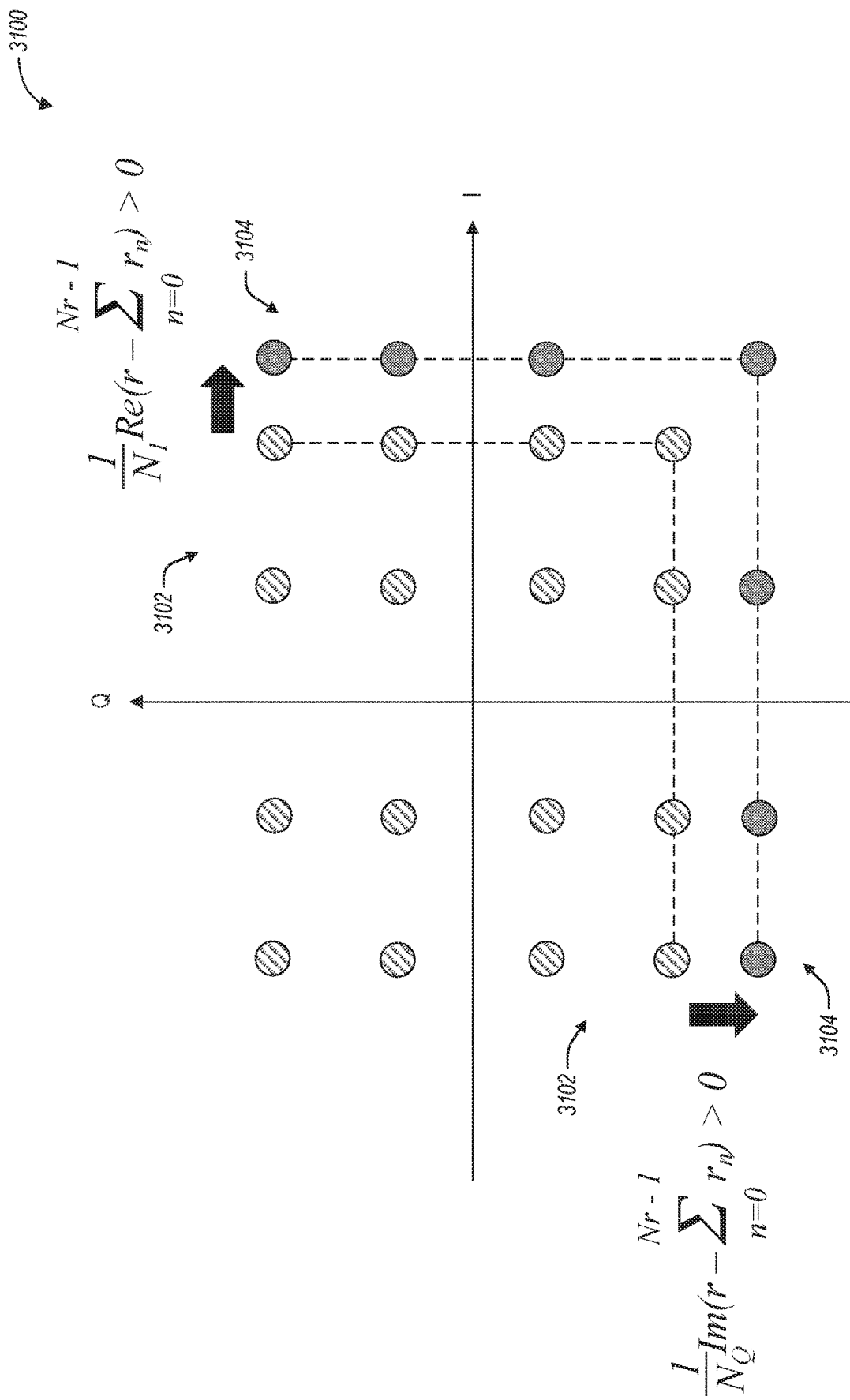
FIG. 31 illustrates a graphical representation of a QAM constellation shifting which can be used for DC nulling, in accordance with some aspects.

An example of asymmetric 16QAM constellation is shown in FIG. 31. FIG. 31 illustrates a graphical representation 3100 of a QAM constellation shifting, which can be used for DC nulling, in accordance with some aspects. As seen in FIG. 30, some constellation border points (e.g., 3102) are shifted (e.g., to 3104) depending on average of symbols after adding of redundant symbols.

In some aspects, asymmetric constellation may be used to reduce PAPR with a low overhead as follows:

Input: $d=[d_n]$ represents the original data vector of size $N_d=N-N_r$. Data points are from a QAM constellation $\mathcal{C}$;

$$r = -\sum_{n=0}^{N_d-1} d_n;$$

redundancy vector is $r=[r_n]$ with size $N_r$: $r_n$=closet point in $\mathcal{C}$ to $$r - \sum_{k=0}^{n-1} r_k;$$

x=[d, r] with size $N=N_d+N_r$; Number of points to be adjusted:

$N_I$=number of points in x that $$\text{sign}(\text{Re}(x_n)) = \text{sign}\left(\text{Re}\left(r - \sum_{k=0}^{N_r-1} r_k\right)\right)$$

and $x_n$ is a constellation point belongs to the outer border of $\mathcal{C}$;

$N_Q$=number of points in x that $$\text{sign}(\text{Im}(x_n)) = \text{sign}\left(\text{Im}\left(r - \sum_{k=0}^{N_r-1} r_k\right)\right)$$

and $x_n$ is a constellation point that belongs to the outer border of $\mathcal{C}$.

Data point adjustment includes $$\text{Re}(x_n) \leftarrow \text{Re}(x_n) + \text{Re}\left(r - \sum_{k=0}^{N_r-1} r_k\right)/N_I$$

if $$\text{sign}(\text{Re}(x_n)) = \text{sign}\left(\text{Re}\left(r - \sum_{k=0}^{N_r-1} r_k\right)\right)$$

and $x_n$ is a constellation point belongs to the outer border of $\mathcal{C}$; and $$\text{Im}(x_n) \leftarrow \text{Im}(x_n) + \text{Im}\left(r - \sum_{k=0}^{N_r-1} r_k\right)/N_Q$$

if $$\text{sign}(\text{Im}(x_n)) = \text{sign}\left(\text{Im}\left(r - \sum_{k=0}^{N_r-1} r_k\right)\right)$$

and $x_n$ is a constellation point that belongs to the outer border of $\mathcal{C}$. Output: vector x with zero DC, $\delta$ is a shift on x.

In some aspects, the multiple-bin scenario for data-dependent redundancy may be configured as follows: d is a data vector of size $N_d$ (samples of d are located at time indexes t∈ $t_d$ where 0≤t<N); r is predefined redundancy vector of size $N_r$ (sample of r are located at time indexes t∈ $t_r$ such that $t_r \cap t_d = \emptyset$ and $t_r \cup t_d = [0, N)$); frequency puncturing pattern (f∈ $f_n$ is the set of muted frequency tones; f∈ $f_p$ is the set of remaining frequency tones with power such that $f_n \cap f_p = \emptyset$ and $f_n \cup f_p = [0, N)$); DFT of time samples $$\left(\begin{bmatrix} y_p \\ y_n \end{bmatrix} = \begin{bmatrix} F_{pd} & F_{pr} \\ F_{nd} & F_{nr} \end{bmatrix} \begin{bmatrix} d \\ r \end{bmatrix}\right),$$

where $F_{ab} = \left[\exp\left(-j\frac{2\pi ft}{N}\right)\middle/ \sqrt{N}\right]$ where f∈ $f_a$ and t∈ $t_b$).

A target may be to set r such that tones at $f_n$ are muted and hence $y_n = 0_{N_r}$, $0_{N_r} = F_{nd} + F_{nr} r \Rightarrow r = Rd$ where $R = -F_{nr}^{-1} F_{nd}$. The desired set of frequency and time allocations: $f_n = \{-f_0, -f_0+1, \ldots, 0, 1, \ldots, f_0-1\}$ where $0 < f_0 < N$ and hence $N_n = 2f_0$ and $t_d = \{0, \Delta t, 2\Delta t, \ldots, (N_r-1)\Delta t\}$ where $\Delta t = N/N_r$ and $N_r \geq N_n$.

In some aspects, a method of baseband DC nulling for SC waveform includes adding a predefined redundant sequence in time domain among a set of data symbols and then recovery of original data symbols at the receiver assuming some frequency bin around DC are filtered out. In some aspects, only a single DC tone is nulled out (a simple method of recovery for this scenario is adopted). In some aspects, an approximated method is used for data recovery. In some aspects, baseband DC nulling for SC waveform includes adding a data-dependent redundant sequence in time domain among a set of data symbols. In some aspects, a number of nulled tones is equal to a number of redundant time-domain samples. In some aspects, a number of nulled tones is less than a number of redundant time-domain samples. In some aspects, extra redundant samples are used to reduce PAPR of data-dependent samples. In some aspects, baseband DC nulling for SC waveform uses an asymmetric constellation. In some aspects, baseband DC nulling uses a combination of the above techniques. In some aspects, the discussed techniques are performed over a block of BWSC symbols.

Figure 32:
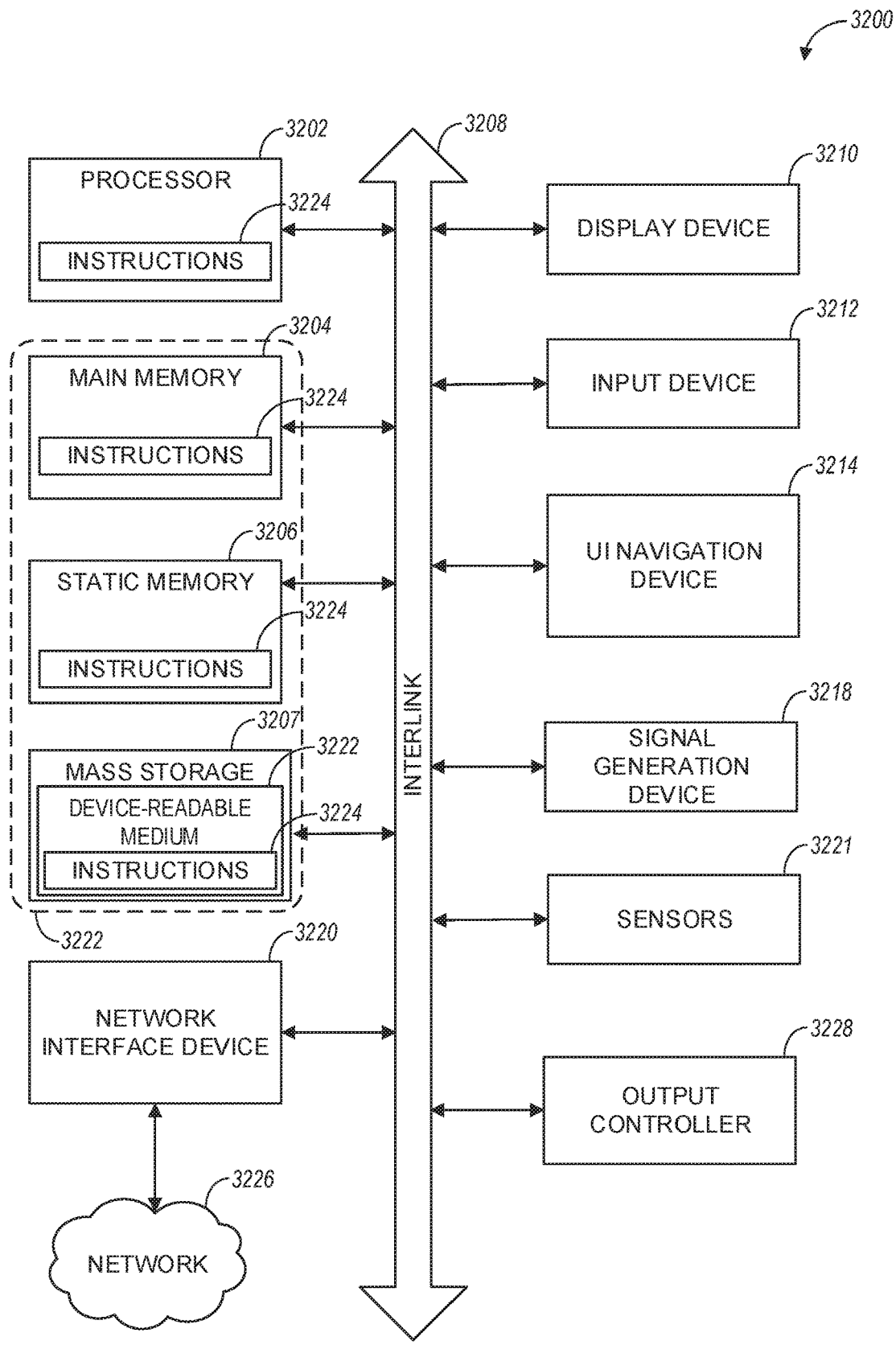
FIG. 32 illustrates a block diagram of a communication device such as an evolved Node-B (eNB), a new generation Node-B (gNB), an access point (AP), a wireless station (STA), a mobile station (MS), or a user equipment (UE), in accordance with some aspects.

FIG. 32 illustrates a block diagram of a communication device such as an evolved Node-B (eNB), a next generation Node-B (gNB), an access point (AP), a wireless station (STA), a mobile station (MS), or a user equipment (UE), in accordance with some aspects and to perform one or more of the techniques disclosed herein. In alternative aspects, the communication device 3200 may operate as a standalone device or may be connected (e.g., networked) to other communication devices.

Circuitry (e.g., processing circuitry) is a collection of circuits implemented in tangible entities of the device 3200 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. For example, any of the physical components may be used in more than one member of more than one circuitry. For example, under operation, execution units may be used in the first circuit of a first circuitry at one point in time and reused by a second circuit in the first circuitry, or by a third circuit in a second circuitry at a different time. Additional examples of these components with respect to the device 3200 follow.

In some aspects, the device 3200 may operate as a standalone device or may be connected (e.g., networked) to other devices. In a networked deployment, the communication device 3200 may operate in the capacity of a server communication device, a client communication device, or both in server-client network environments. In an example, the communication device 3200 may act as a peer communication device in peer-to-peer (P2P) (or other distributed) network environment. The communication device 3200 may be a UE, eNB, PC, a tablet PC, a STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. For example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

Communication device (e.g., UE) 3200 may include a hardware processor 3202 (e.g., a central processing unit (CPU), a graphics processing unit (GPU), a hardware processor core, or any combination thereof), a main memory 3204, a static memory 3206, and mass storage 3207 (e.g., hard drive, tape drive, flash storage, or other block or storage devices), some or all of which may communicate with each other via an interlink (e.g., bus) 3208.

The communication device 3200 may further include a display device 3210, an alphanumeric input device 3212 (e.g., a keyboard), and a user interface (UI) navigation device 3214 (e.g., a mouse). In an example, the display device 3210, input device 3212 and UI navigation device 3214 may be a touchscreen display. The communication device 3200 may additionally include a signal generation device 3218 (e.g., a speaker), a network interface device 3220, and one or more sensors 3221, such as a global positioning system (GPS) sensor, compass, accelerometer, or another sensor. The communication device 3200 may include an output controller 3228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 3207 may include a communication device-readable medium 3222, on which is stored one or more sets of data structures or instructions 3224 (e.g., software) embodying or utilized by any one or more of the techniques or functions described herein. In some aspects, registers of the processor 3202, the main memory 3204, the static memory 3206, and/or the mass storage 3207 may be, or include (completely or at least partially), the device-readable medium 3222, on which is stored the one or more sets of data structures or instructions 3224, embodying or utilized by any one or more of the techniques or functions described herein. In an example, one or any combination of the hardware processor 3202, the main memory 3204, the static memory 3206, or the mass storage 3216 may constitute the device-readable medium 3222.

As used herein, the term "device-readable medium" is interchangeable with "computer-readable medium" or "machine-readable medium". While the communication device-readable medium 3222 is illustrated as a single medium, the term "communication device-readable medium" may include a single medium or multiple media (e.g., a centralized or distributed database, and/or associated caches and servers) configured to store the one or more instructions 3224. The term "communication device-readable medium" is inclusive of the terms "machine-readable medium" or "computer-readable medium", and may include any medium that is capable of storing, encoding, or carrying instructions (e.g., instructions 3224) for execution by the communication device 3200 and that cause the communication device 3200 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 3224 may further be transmitted or received over a communications network 3226 using a transmission medium via the network interface device 3220 utilizing any one of a number of transfer protocols. In an example, the network interface device 3220 may include one or more physical jacks (e.g., Ethernet, coaxial, or phone jacks) or one or more antennas to connect to the communications network 3226. In an example, the network interface device 3220 may include a plurality of antennas to wirelessly communicate using at least one of single-input-multiple-output (SIMO), MIMO, or multiple-input-single-output (MISO) techniques. In some examples, the network interface device 3220 may wirelessly communicate using Multiple User MIMO techniques.

The term "transmission medium" shall be taken to include any intangible medium that is capable of storing, encoding or carrying instructions for execution by the communication device 3200, and includes digital or analog communications signals or another intangible medium to facilitate communication of such software. In this regard, a transmission medium in the context of this disclosure is a device-readable medium.

Implementation of the preceding techniques may be accomplished through any number of specifications, configurations, or example deployments of hardware and software. It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field-programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

ADDITIONAL NOTES & EXAMPLES

Additional examples of the presently described method, system, and device embodiments include the following, non-limiting configurations. Each of the non-limiting examples may stand on its own or may be combined in any permutation or combination with any one or more of the other examples provided below or throughout the present disclosure.

Example 1 is an apparatus of a communication device, comprising: one or more antennas configured to receive a radio frequency (RF) signal: and an analog-to-digital converter (ADC) system coupled to the one or more antennas, the ADC system comprising: a 1-bit ADC configured to receive the RF signal; and an ADC controller circuitry coupled to the 1-bit ADC, the ADC controller circuitry configured to measure a number of positive samples in the received RF signal for a plurality of thresholds of the 1-bit ADC; estimate receive signal power associated with the received RF signal based on the measured number of positive samples; determine a direct current (DC) offset in the received RF signal using the estimated received signal power, and adjust the received RF signal based on the determined DC offset.

In Example 2, the subject matter of Example 1 includes subject matter where the ADC controller circuitry is further configured to select a first threshold of the plurality of thresholds; and determine a first probability of a positive signal at an input of the 1-bit ADC using a subset of the number of positive samples detected by the 1-bit ADC using the first threshold.

In Example 3, the subject matter of Example 2 includes, where the ADC controller circuitry is further configured to select a second threshold of the plurality of thresholds; and determine a second probability of a positive signal at the input of the 1-bit ADC using a second subset of the number of positive samples detected by the 1-bit ADC using the second threshold.

In Example 4, the subject matter of Example 3 includes, where the ADC controller circuitry is further configured to estimate the receive signal power using an inverse Q-function of a standard normal distribution of the first probability and the second probability.

In Example 5, the subject matter of Examples 3-4 includes, where the ADC controller circuitry is further configured to determine a third probability of a positive signal at the input of the 1-bit ADC using a number of positive samples and a number of total samples detected by the 1-bit ADC using a zero threshold.

In Example 6, the subject matter of Example 5 includes, where the ADC controller circuitry is further configured to determine the DC offset using an inverse Q-function of a standard normal distribution of the third probability and the estimated receive signal power.

Example 7 is an apparatus of a communication device, the apparatus including a receiver including equalization circuitry configured to receive a filtered radio frequency (RF) signal and generate an equalized RF signal; non-linearity compensation circuitry configured to apply a non-linear feature set to the equalized RF signal to generate a compensated signal, the non-linear feature set including a plurality of weights; and closed-loop training circuitry configured to compare, in a digital domain of the receiver, a plurality of signal constellation points corresponding to the compensated signal with a plurality of training samples to determine an error signal associated with the plurality of signal constellation points, and adjust the plurality of weights of the non-linear feature set based on the determined error signal.

In Example 8, the subject matter of Example 7 includes subject matter where the receiver further comprises slicer circuitry coupled to the closed-loop training circuitry, the slicer configured to generate the plurality of signal constellation points based on the compensated signal.

In Example 9, the subject matter of Example 8 includes, the receiver further includes second equalization circuitry coupled to an output of the non-linearity compensation circuitry via an adder; wherein the second equalization circuitry receives a plurality of prior signal constellation points from the slicer circuitry and generates a filtered representation of the prior signal constellation points; and wherein the adder is configured to generate a differential signal between the compensated signal and the filtered representation of the prior signal constellation points.

In Example 10, the subject matter of Example 9 includes, where the slicer generates the plurality of signal constellation points using the differential signal.

In Example 11, the subject matter of Examples 9-10 includes, where the equalization circuitry is a feed-forward equalizer (FFE) circuit and the second equalization circuitry is a decision feedback equalizer (DFE) circuit.

In Example 12, the subject matter of Examples 8-11 includes, where the receiver is configured to operate in one of a training mode and a data processing mode, and wherein during the training mode, the closed-loop training circuitry is configured to receive the plurality of training samples from a training signal generator; and determine the error signal using a quantized representation of a differential signal corresponding to the plurality of training samples.

In Example 13, the subject matter of Example 12 includes, the receiver further includes a 1-bit analog-to-digital-converter (ADC) circuit configured to receive the differential signal corresponding to the plurality of training samples and generate the quantized representation.

In Example 14, the subject matter of Examples 12-13 includes, where the receiver includes a demodulator coupled to the slicer circuitry, the demodulator configured to generate, during the data processing mode, a demodulated binary signal corresponding to the filtered RF signal based on the plurality of signal constellation points.

In Example 15, the subject matter of Examples 12-14 includes, where during the data processing mode, the closed-loop training circuitry is configured to receive a quantized representation of a differential signal corresponding to the compensated signal; determine, in the digital domain of the receiver, the error signal using the quantized representation of the differential signal corresponding to the compensated signal and a plurality of signal constellation points associated with the differential signal corresponding to the compensated signal; and adjust the plurality of weights of the non-linear feature set based on the determined error signal.

In Example 16, the subject matter of Examples 12-15 includes, where during the data processing mode, the closed-loop training circuitry is configured to receive a representation of a differential signal corresponding to the compensated signal; determine, in an analog domain of the receiver, the error signal using the representation of the differential signal corresponding to the compensated signal and a plurality of signal constellation points associated with the differential signal corresponding to the compensated signal; and adjust the plurality of weights of the non-linear feature set based on the determined error signal.

Example 17 is an apparatus of a communication device, including receiver circuitry comprising: a plurality of radio frequency (RF) front-end modules (RFEMs) coupled to a corresponding plurality of antennas, the plurality of RFEMs configured to filter RF signals received by the plurality of antennas via a communication channel, to generate a plurality of filtered RF signals; a processor configured to determine a channel frequency offset (CFO) candidate set of the receiver circuitry, the CFO candidate set including a plurality of candidate CFOs; determine a narrowband channel estimate of the communication channel for each of the plurality of candidate CFOs using a pilot signal received via the plurality of antennas, and select a CFO from the plurality of candidate CFOs of the CFO candidate set based on maximizing a maximum likelihood function of the narrowband channel estimate; and quantization circuitry coupled to the plurality of RFEMs, the quantization circuitry configured to apply a quantization function to the plurality of filtered signals based on the selected CFO, to generate a plurality of quantized signals.

In Example 18, the subject matter of Example 17 includes, where the pilot signal comprises a first subset of pilot signals characterized by the same phase and a second subset of pilot signals characterized by different phases.

In Example 19, the subject matter of Example 18 includes, where the processor is further configured to determine the narrowband channel estimate using the first subset of the pilot signals.

In Example 20, the subject matter of Examples 18-19 includes, where the processor is further configured to determine a conjugate transpose of the CFO candidate set; and determine the narrowband channel estimate using the conjugate transpose and the first subset of the pilot signals.

In Example 21, the subject matter of Examples 17-20 includes, where the processor is further configured to: update the CFO candidate set to include CFOs within a pre-determined threshold from the selected CFO, to generate an updated CFO candidate set; perform a new narrowband channel estimate of the communication channel for each of the plurality of candidate CFOs in the updated CFO candidate set using the pilot signal, and select an updated CFO from the plurality of candidate CFOs of the updated CFO candidate set based on maximizing a maximum likelihood function of the new narrowband channel estimate.

In Example 22, the subject matter of Examples 18-21 includes, where the processor is further configured to determine a wideband channel estimate of the communication channel using the selected CFO and a matrix with the first subset and the second subset of pilot signals.

In Example 23, the subject matter of Example 22 includes, where the receiver circuitry further comprises: baseband circuitry coupled to the quantization circuitry, the baseband circuitry configured to downconvert the plurality of quantized signals based on the wideband channel estimate.

In Example 24, the subject matter of Examples 17-23 includes, wherein the quantization circuitry comprises a plurality of low-bit analog-to-digital converters (ADCs).

Example 25 is an apparatus of a communication device, the apparatus including transmitter circuitry that includes: a first modulation circuit configured to generate a first modulated signal corresponding to a data signal; a direct current (DC) nulling controller configured to retrieve a plurality of pre-defined data samples corresponding to the data signal; and insert in time-domain of the transmitter circuitry, the retrieved pre-defined data samples within data samples of a block-wise single carrier (BWSC) symbol of the first modulated signal, to generate a merged signal; and a radio frequency (RF) processing circuit configured to generate a frequency-domain analog transmit signal based on the merged signal, the frequency domain analog transmit signal having a null DC tone at a DC frequency.

In Example 26, the subject matter of Example 25 includes, where the pre-defined data samples are redundant with one or more of the data samples of the BWSC symbol.

In Example 27, the subject matter of Examples 25-26 includes, where the DC nulling controller is further configured to generate redundant samples based on the data samples of the BWSC symbol; and insert in time-domain of the transmitter circuitry, the generated redundant samples within the data samples of a block-wise single carrier (BWSC) block of symbols of the first modulated signal, to generate a second merged signal.

In Example 28, the subject matter of Example 27 includes, where the RF processing circuitry is further configured to generate a second frequency-domain analog transmit signal based on the second merged signal, the second frequency domain analog transmit signal having the null DC tone at the DC frequency; and transmit the second frequency-domain analog transmit signal to receiver circuitry.

In Example 29, the subject matter of Example 28 includes, where the pre-defined data samples and the generated redundant samples are shared between the transmitter circuitry and the receiver circuitry.

In Example 30, the subject matter of Examples 25-29 includes, where the first modulator circuit is a quadrature amplitude modulator (QAM), and the DC nulling controller is further configured to shift one or more border constellation points within a QAM constellation used by the QAM modulator using a shifting value, the shifting value based on the data samples of the BWSC symbol of the first modulated signal.

In Example 31, the subject matter of Examples 25-30 includes, a second modulation circuit configured to generate a BWSC modulated signal using the merged signal, where the frequency domain analog transmit signal is generated using the BWSC modulated signal.

Example 32 is at least one machine-readable medium including instructions that, when executed by processing circuitry, cause the processing circuitry to perform operations to implement of any of Examples 1-31.

Example 33 is an apparatus comprising means to implement of any of Examples 1-31.

Example 34 is a system to implement of any of Examples 1-31.

Example 35 is a method to implement of any of Examples 1-31.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

The above description is intended to be illustrative, and not restrictive. For example, the above-described examples (or one or more aspects thereof) may be used in combination with others. Other aspects may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as aspects may feature a subset of said features. Further, aspects may include fewer features than those disclosed in a particular example. Thus, the following claims are hereby incorporated into the Detailed Description, with a claim standing on its own as a separate aspect. The scope of the aspects disclosed herein is to be determined with reference to the appended claims, along with the full scope of equivalents to which such claims are entitled.

What is claimed is:

1. An apparatus of a communication device, the apparatus comprising:
   a receiver comprising:
      equalization circuitry configured to receive a filtered radio frequency (RF) signal and generate an equalized RF signal;
      non-linearity compensation circuitry configured to apply a non-linear feature set to the equalized RF signal to generate a compensated signal, the non-linear feature set including a plurality of weights; and
      closed-loop training circuitry configured to:
         compare, in a digital domain of the receiver, a plurality of signal constellation points corresponding to the compensated signal with a plurality of training samples to determine an error signal associated with the plurality of signal constellation points, the plurality of training samples generated internally within the receiver; and
         adjust the plurality of weights of the non-linear feature set based on the determined error signal.

2. The apparatus of claim 1, the receiver further comprising:
   slicer circuitry coupled to the closed-loop training circuitry, the slicer configured to generate the plurality of signal constellation points based on the compensated signal.

3. The apparatus of claim 2, the receiver further comprising:
   second equalization circuitry coupled to an output of the non-linearity compensation circuitry via an adder;
   wherein the second equalization circuitry receives a plurality of prior signal constellation points from the slicer circuitry and generates a filtered representation of the prior signal constellation points; and
   wherein the adder is configured to generate a differential signal between the compensated signal and the filtered representation of the prior signal constellation points.

4. The apparatus of claim 3, wherein the slicer generates the plurality of signal constellation points using the differential signal.

5. The apparatus of claim 3, wherein the equalization circuitry is a feed forward equalizer (FFE) circuit and the second equalization circuitry is a decision feedback equalizer (DFE) circuit.

6. The apparatus of claim 2, wherein the receiver is configured to operate in one of a training mode and a data processing mode, and wherein during the training mode, the closed-loop training circuitry is configured to:
   receive the plurality of training samples from a training signal generator; and
   determine the error signal using a quantized representation of a differential signal corresponding to the plurality of training samples.

7. The apparatus of claim 6, the receiver further comprising:
   a 1-bit analog-to-digital-converter (ADC) circuit configured to receive the differential signal corresponding to the plurality of training samples and generate the quantized representation.

8. The apparatus of claim 6, wherein the receiver comprises:
   a demodulator coupled to the slicer circuitry, the demodulator configured to generate, during the data processing mode, a demodulated binary signal corresponding to the filtered RF signal based on the plurality of signal constellation points.

9. The apparatus of claim 6, wherein during the data processing mode, the closed-loop training circuitry is configured to:
   receive a quantized representation of a differential signal corresponding to the compensated signal;
   determine, in the digital domain of the receiver, the error signal using the quantized representation of the differential signal corresponding to the compensated signal and a plurality of signal constellation points associated with the differential signal corresponding to the compensated signal; and
   adjust the plurality of weights of the non-linear feature set based on the determined error signal.

10. The apparatus of claim 6, wherein during the data processing mode, the closed-loop training circuitry is configured to:
    receive a representation of a differential signal corresponding to the compensated signal;
    determine, in an analog domain of the receiver, the error signal using the representation of the differential signal corresponding to the compensated signal and a plurality of signal constellation points associated with the differential signal corresponding to the compensated signal; and
    adjust the plurality of weights of the non-linear feature set based on the determined error signal.

11. An method of a communication device, the method comprising:
    receiving a filtered radio frequency (RF) signal at a receiver;
    generating an equalized RF signal based on the filtered RF signal;
    applying a non-linear feature set to the equalized RF signal to generate a compensated signal, the non-linear feature set including a plurality of weights;

comparing a plurality of signal constellation points corresponding to the compensated signal with a plurality of training samples to determine an error signal associated with the plurality of signal constellation points, the plurality of training samples generated internally within the receiver; and adjusting the plurality of weights of the non-linear feature set based on the determined error signal.

12. The method of claim 11, further comprising:
generating the plurality of signal constellation points based on the compensated signal.

13. The method of claim 12, further comprising:
receiving a plurality of prior signal constellation points from slicer circuitry;
generating a filtered representation of the prior signal constellation points; and
generating a differential signal between the compensated signal and the filtered representation of the prior signal constellation points.

14. The method of claim 13, further comprising:
generating the plurality of signal constellation points using the differential signal.

15. The method of claim 12, further comprising:
receiving the plurality of training samples from a training signal generator.

16. The method of claim 15, further comprising:
determining the error signal using a quantized representation of a differential signal corresponding to the plurality of training samples.

17. The method of claim 16, further comprising:
receiving the differential signal corresponding to the plurality of training samples and generate the quantized representation.

18. The method of claim 15, further comprising:
generating a demodulated binary signal corresponding to the filtered RF signal based on the plurality of signal constellation points.

19. The method of claim 15, further comprising:
receiving a quantized representation of a differential signal corresponding to the compensated signal;
determining the error signal using the quantized representation of the differential signal corresponding to the compensated signal and a plurality of signal constellation points associated with the differential signal corresponding to the compensated signal; and
adjusting the plurality of weights of the non-linear feature set based on the determined error signal.

20. The method of claim 15, further comprising:
receiving a representation of a differential signal corresponding to the compensated signal;
determining the error signal using the representation of the differential signal corresponding to the compensated signal and a plurality of signal constellation points associated with the differential signal corresponding to the compensated signal; and
adjusting the plurality of weights of the non-linear feature set based on the determined error signal.

21. An apparatus comprising:
means for receiving a filtered radio frequency (RF) signal;
means for generating an equalized RF signal based on the filtered RF signal;
means for applying a non-linear feature set to the equalized RF signal to generate a compensated signal, the non-linear feature set including a plurality of weights;
means for comparing a plurality of signal constellation points corresponding to the compensated signal with a plurality of training samples to determine an error signal associated with the plurality of signal constellation points, the plurality of training samples generated internally within the means for receiving; and
means for adjusting the plurality of weights of the non-linear feature set based on the determined error signal.

22. The apparatus of claim 21, further comprising:
means for generating the plurality of signal constellation points based on the compensated signal.

23. The apparatus of claim 22, further comprising:
means for receiving a plurality of prior signal constellation points from slicer circuitry;
means for generating a filtered representation of the prior signal constellation points; and
means for generating a differential signal between the compensated signal and the filtered representation of the prior signal constellation points.

24. The apparatus of claim 23, further comprising:
means for generating the plurality of signal constellation points using the differential signal.

* * * * *